United States Patent
Tsai

(10) Patent No.: US 11,029,799 B1
(45) Date of Patent: Jun. 8, 2021

(54) VISUALIZED ITEM BASED SYSTEMS

(71) Applicant: Daniel E. Tsai, Atkinson, NH (US)

(72) Inventor: Daniel E. Tsai, Atkinson, NH (US)

(*) Notice: Subject to any disclaimer, the term of this patent is extended or adjusted under 35 U.S.C. 154(b) by 1707 days.

(21) Appl. No.: 13/798,282

(22) Filed: Mar. 13, 2013

Related U.S. Application Data

(60) Provisional application No. 61/715,951, filed on Oct. 19, 2012.

(51) Int. Cl.
*G06F 3/0481* (2013.01)
*G06F 3/0488* (2013.01)

(52) U.S. Cl.
CPC .......... *G06F 3/0481* (2013.01); *G06F 3/0488* (2013.01)

(58) Field of Classification Search
CPC ..... G06F 3/0481; G06F 3/0488; G06F 3/0638
See application file for complete search history.

(56) References Cited

U.S. PATENT DOCUMENTS

| 8,631,029 B1* | 1/2014 | Amacker | G06F 17/30554 707/766 |
| 2003/0020671 A1* | 1/2003 | Santoro | G06F 3/0481 345/1.3 |
| 2010/0251305 A1* | 9/2010 | Kimble | H04N 7/17318 725/46 |
| 2011/0164056 A1* | 7/2011 | Ording | G06F 1/1694 345/649 |

\* cited by examiner

*Primary Examiner* — Jeanette J Parker
(74) *Attorney, Agent, or Firm* — Fish & Richardson P.C.

(57) ABSTRACT

Techniques for dynamic display of visualized units received from plural sources are described. Visualized units are scheduled for display for a time period and rendered on the display for the time period. The visualized units can be shared according to user preferences, picked according to a user selection into personal, shareable sets of visualized units. The visualized units can be annotated, mixed from different sources and focused.

11 Claims, 42 Drawing Sheets

Retrieve personal preferences for display of TOC, 762

↓

Select visualized units from array for playback, based on personal preferences for getting next visualized units, 764

↓

Assign scheduled visualized units to rows and cells according to preferences, 766

↓

Retrieve visualized units scheduled for playback from array, 768

↓

Populate for display scheduled visualized units into assigned rows/cells, 770

FIG. 28

VISUALIZED ITEM BASED SYSTEMS

This application claims priority under 35 U.S.C. § 119 to U.S. Provisional Patent Application Ser. No. 61/715,951, filed Oct. 19, 2012, and entitled "Visualized Item Based Systems", the entire contents of which are hereby incorporated by reference.

BACKGROUND

This invention relates to techniques for accessing and interacting with information content.

Web-based social media have blossomed recently, turning communication into an interactive exchange among entities. The Internet is one mechanism that makes available content, most often presented as web pages, a page-sized formatted document with text, images, other media, and hyperlinks. Browsing the Internet usually involves accessing a web page and clicking on hyperlinks to arrive at a linked web page. Information is presented to the user in chunks of "pages" that require typing of search terms or addresses (URLs) and clicking on hyperlinks. Content is also available as other types such as feeds, e.g., is a dataset, not inherently formatted, provided by web sites.

SUMMARY

Navigation of content on the web typically involves starting at a web page and moving to other content by clicking on hyperlinks to open other web resources. As with web-based social media, these ways of obtaining, exchanging and viewing of content may not always be suitable because these approaches require explicit user involvement and attention. Moreover, these approaches may not always be best for such new devices being produced. For example, small devices such as smart phones and person digital assistants (PDA's) that are now able to browse the web are not well suited for this type of navigation, because, control of small devices, including clicking and typing is limited and difficult for many users.

In addition, large public displays such as kiosks and large flat panel displays can be hooked up to the web but often cannot or do not allow browsing input by the user. Further, desktop and laptop computer users may want to see a large assortment of information but do not have the time or desire to click to various pages to see this information, especially if the information changes often, thus needing re-visiting.

According to an aspect of the invention a system includes a processor, a display, and a memory executing a computer program for dynamic display of visualized units, the computer program product configuring the system to receive sets of visualized units from plural sources of visualized units, schedule a set of the visualized units for display on the display, with the schedule for display being for a time period, render the set of visualized units on the display device for the time period, with the system further configured to cause the visualized units to be shared according to user preferences and cause the visualized units to be picked according to a user selection.

According to an additional aspect of the invention a computer program product is tangibly stored on a computer readable storage device for dynamic display of visualized units, the computer program product configuring a processor to receive sets of visualized units from plural sources of visualized units, schedule a set of the visualized units for display on a display device, with the schedule for display being for a time period, render the set of visualized units on the display device for the time period, and to cause the visualized units to be shared according to user preferences and cause the visualized units to be picked according to a user selection.

According to an aspect of the invention a computer implemented method includes dynamically displaying visualized units by receiving sets of visualized units from plural sources of visualized units, scheduling a set of the visualized units for display on a display device, with the schedule for display being for a time period, rendering the set of visualized units on the display device for the time period, and causing the visualized units to be shared according to user preferences and causing the visualized units to be picked according to a user selection.

The following are some of the features within the scope of the above aspects.

The visualized units can be picked into personal, shareable sets of visualized units. The visualized units can be annotated according to at least one of a user discussion, voting, attribution, purchasing, sharing, picking. The visualized units can be mixed from different ones of the plural sources for the set of visualized units. The aspect receives a user selection of a visualized unit from the set of visualized units, renders an image of the visualized unit in a zoom window on the display, and displays additional information associated with the user selected visualized unit. The aspects can schedule a second, different set of the visualized units for display in the window on the display, with the schedule for display of the second set being for a second time period and render the second set of visualized units on the display device for the second time period. The aspects can mix visualized units from different ones of the plural sources for the set of visualized units and with the visualized units and sets of visualized units being picked, mixed and shared according to user specified visibility and permission attributes.

According to an aspect of the invention a system includes a processor, a display, and a memory executing a computer program for dynamic display of visualized units, the computer program product comprises instructions to cause the processor to schedule a set of visualized units for display in a window, with the schedule for display being for a time period, retrieve the scheduled visualized units, and render the window on the display device for the time period.

Additional aspects include a computer program product and computer implemented method.

The following are some of the features within the scope of the above aspects.

Thumbnail images representing the visualized units are displayed, and wherein the window comprises a matrix of cells and the system is further configured to assign the visualized units to the cells in the matrix to display the thumbnail images. The items represented by the visualized units include images, combinations of text and image, text, and video. The matrix is organized as a group of cells with the number and arrangement of cells being selected by the system based on the size of the display. The matrix is a time-changing matrix of the visualized units juxtaposed each other. A display order of the visualized units is based on at least one of relevance of a visualized unit to other visualized units, a date of the visualized unit, a source of the visualized unit and visual properties of the visualized unit. The system queries sources of visualized units and requeries the sources at a second, different time to retrieve new visualized units. The instructions to schedule further includes instructions to remove one displayed visualized unit in the set, add a different visualized unit to the set to provide a new, second set and schedule the second set for display in the window for a second, different time period. The instructions to schedule further comprises instructions to receive a user focus selection and add new related one or more visualized units to the display with the new related visualized unit determined according to the received user focus selection.

According to an aspect of the invention, a system includes a processor, a display, and a memory executing a computer program for producing visualized units for visual display by an application on a display device, the computer program product comprises instructions to cause the processor to receive items from one or more sources, convert items into visualized units by instructions that format the items to be playable by the application, and produce plural media to represent the items, with the plural media representing different aspects of the item, apply user-selected attributes to the item, record information about the item including a unique identifier, and produce a record of the visualized unit from the reformatted item, the plural media and the unique identifier.

Additional aspects include a computer program product and computer implemented method.

The following are some of the features within the scope of the above aspects.

The visualized units are produced from items in a feeds, images, video, images, web pages, three dimensional models and text by instructions that parse the item and read tags or elements associated with the item. The visualized units are produced of physical items, by sensing a code or providing a scanned data file of the physical item. The visualized units are produced of physical items, by instructions to recognize features of the physical item. The system records information about the item including an author and date-time of production and record user-preferred privacy and sharing settings. The user selectable attributes are privacy and sharing settings determine how the visualized units are playable, mixable, viewable, pickable, and shareable. The system uploads the visualized units to a server. Metadata regarding the visualized units are produced from the items and the item metadata and updates to the metadata are saved with visualized units. The visualized units are based on personal situation. The situation is specified by at least one of environment, social, and activity information. The computer program personalizes display of the visualized units by applying a visualization to one or more aspects of the visualized unit. The system applies feature recognition to identify items within the (visual) data for storage in meta data. The visualized unit is a composite of a plurality of representational inputs. The visualized unit is represented as a data structure.

According to an aspect of the invention, a system includes a processor, a display, and a memory executing a computer program for dynamic display of visualized units, the computer program product comprises instructions to configure the processor to render on the display device for a time period an arrangement of retrieved visualized units, receive a user selection of one of the visualized units, place a miniature thumbnail of the visualized unit in a pick bar of the display, and assign an identifier associated with the selected visualized unit to a set.

Additional aspects include a computer program product and computer implemented method.

The following are some of the features within the scope of the above aspects.

The processor schedules the set of visualized units for display, with the schedule for display being for a time period, and renders the arrangement of the visualized units as a matrix configuration of cells with the set of visualized units assigned to the cells in the matrix. The visualized units are represented on the display as thumbnail images. The items represented by the visualized units include images, combinations of text and image, text, and video. The matrix is organized as a group of cells with the number and arrangement of cells being selected by the system based on the size of the display. The matrix is a time-changing matrix of the visualized units juxtaposed each other. The computer is further configured to accept a user entered name of the set or assign a default name to the set.

According to an aspect of the invention, a system includes a processor, a display, and a memory executing a computer program for dynamic display of visualized units, the computer program product comprises instructions to configure the processor to render a window on the display device for a time period, the window including a matrix of retrieved visualized units assigned to cells in the matrix, receive a user selection of one of the visualized units in the matrix to share with other users, receive a selection of an audience to share the visualized units with.

Additional aspects include a computer program product and computer implemented method.

The following are some of the features within the scope of the above aspects.

The processor is further configured to schedule a set of visualized units for display in the cells of matrix, with the schedule for display being for a time period, retrieve the scheduled visualized units, assign visualized units to the cells in the matrix. The instructions validate that the visualized units are share-able to the selected audience. The instructions add a message to the shareable visualized units. The system produces a packaged shareable message. The matrix is a time-changing matrix of the visualized units juxtaposed each other and the system notifies the audience.

According to an aspect of the invention, a system includes a processor, a display, and a memory executing a computer program for dynamic display of visualized units, the computer program product comprises instructions to configure the processor to render a window on the display device for a time period, the window including a matrix of retrieved thumbnails representing the visualized units, the thumbnails assigned to cells in the matrix, receive a user selection of one of the visualized units in the matrix, receive a user selection of a zoom mode, place an image larger than the thumbnail or other media associated with the visualized unit in a zoom window on the display, and display additional information associated with the user selected visualized unit.

Additional aspects include a computer program product and computer implemented method.

The following are some of the features within the scope of the above aspects.

The processor schedules a set of visualized units for display in the cells of matrix with the schedule for display being for a time period, retrieves the scheduled visualized units, and assign visualized units to the cells in the matrix. The visualized units are represented as thumbnail images that represent a collected item. The collected items represented by the visualized units include images, combinations of text and image, text, and video. The matrix is organized as a group of cells with the number and arrangement of cells being selected by the system based on the size of the display. The matrix is a time-changing matrix of the visualized units juxtaposed each other. The system forms zoom bubbles that render related visualized units.

According to an aspect of the invention, a system includes a processor, a display, and a memory executing a computer program for dynamic display of visualized units, the computer program product comprises instructions to configure the processor to render a window on the display device for a time period, the window including a matrix of retrieved thumbnails representing the visualized units, the thumbnails assigned to cells in the matrix, receive a user selection of one of the visualized units in the matrix, assign the user selected visualized units to set of visualized units, share the set of visualized units based on share-ability settings, receive messages and updated content in response to sharing the set of visualized units, display the update content, and initiate execution of a transaction.

Additional aspects include a computer program product and computer implemented method.

The following are some of the features within the scope of the above aspects.

The processor schedules for display over a time period a set of visualized units for display in the cells of matrix, retrieves the scheduled visualized units and assigns the retrieved scheduled visualized units to the cells in the matrix. The visualized units are represented as thumbnail images in the matrix. The items represented by the visualized units include images, combinations of text and image, text, and video. The matrix is organized as a group of cells with the number and arrangement of cells being selected by the system based on the size of the display. The matrix is a time-changing matrix of the visualized units. The system collects visualized units related to other visualized units based on user picks. The computer adjusts the display to display the collection of visualized units.

According to an aspect of the invention, a system includes a processor, a display, and a memory executing a computer program for dynamic display of visualized units, the computer program product comprises instructions to configure the processor to render on the display device for a time period, an arrangement of retrieved thumbnails representing the visualized units, receive a user selection of one of the displayed visualized units, produce an associative set of visualized units that are related to the user selected visualized unit by execution of sets of rules to find related visualized units, and display the associated set of visualized units.

Additional aspects include a computer program product and computer implemented method.

The following are some of the features within the scope of the above aspects.

The system schedules for display over a time period a set of visualized units for display in the window in cells of a matrix, retrieves the scheduled visualized units and assigns the retrieved scheduled visualized units to the cells in the matrix. The visualized units are represented as thumbnail images in the matrix. The items represented by the visualized units include images, combinations of text and image, text, and video. The matrix is organized as a group of cells with the number and arrangement of cells being selected by the system based on the size of the display. The matrix is a time-changing matrix of the visualized units. The instructions to produce associative sets of visualized units further include instructions to execute a rule that determines common discussions about items, topics and interactions among visualized units. The instructions to produce associative sets of visualized units further include instructions to produce the associative sets without keyword tags. The instructions to produce associative sets of visualized units further include instructions to determine selection space according to user defined limitations. The instructions to produce associative sets of visualized units further comprise instructions to determine group memberships of a first visualized unit and produce the associative set from selecting of other visualized units from groups of visualized units having a common group membership with the first visualized unit. The groups are produced by user interactions of picking and/or sharing. The instructions to produce associative sets of visualized units further comprise instructions to apply feature processing to determine common features among visualized units, include those visualized units having common features in the associative set.

According to an aspect of the invention, a system includes a processor, a display, and a memory executing a computer program for dynamic display of visualized units, the computer program product comprises instructions to configure the processor to render a window on the display device for a time period, the window including a matrix of retrieved thumbnails representing the visualized units, the thumbnails assigned to cells in the matrix, receive a user selection of one of the visualized units in the matrix, produce an associative set of visualized units related to the user selected visualized unit by execution of sets of rules to find related visualized units, and display the associated set of items with the user selected visualized unit in the matrix.

Additional aspects include a computer program product and computer implemented method.

The following are some of the features within the scope of the above aspects.

The processor is further configured to schedule for display over a time period a set of visualized units for display in the cells of matrix, retrieve the scheduled visualized units, assign the retrieved scheduled visualized units to the cells in the matrix, and assign associative set of items related to the user selected visualized unit to cells in the matrix that are juxtaposed the user selected item. The visualized units are represented as thumbnail images in the matrix. The items represented by the visualized units include images, combinations of text and image, text, and video. The matrix is organized as a group of cells with the number and arrangement of cells being selected by the system based on the size of the display. The matrix is a time-changing matrix of the visualized units.

According to an aspect of the invention, a system includes a processor, a display, and a memory executing a computer program for dynamic display of visualized units, the computer program product comprises instructions to configure the processor to retrieve stored situational records, compare the stored situational records to current situational parameters by execution of rules to find relevant stored situational records, and produce an action based on the relevant situational records.

Additional aspects include a computer program product and computer implemented method.

The following are some of the features within the scope of the above aspects.

The processor is further configured to render a window on the display device for a time period, the window including a matrix of retrieved thumbnails representing the visualized units, the thumbnails assigned to cells in the matrix, schedule for display over a time period a set of visualized units for display in the cells of matrix, retrieve the scheduled visualized units, assign the retrieved scheduled visualized units to the cells in the matrix, and assign associative set of items related to the user selected visualized unit to cells in the matrix that are juxtaposed the user selected item. The visualized units are represented as thumbnail images in the matrix. The items represented by the visualized units include images, combinations of text and image, text, and video. The matrix is organized as a group of cells with the number and arrangement of cells being selected by the system based on the size of the display. The matrix is a time-changing matrix of the visualized units. The system displays the associated set of visualized units with the user selected visualized unit in the matrix. The situational records are specified by at least one of environment, social, and activity criteria.

According to an aspect of the invention, a system includes a processor, a display, and a memory executing a computer program for dynamic display of visualized units, the computer program product comprises instructions to configure the processor to render a window on the display device for a time period, the window including a matrix of retrieved thumbnails representing the visualized units, the thumbnails assigned to cells in the matrix, receive a user selection of one of the visualized units in the matrix, receive data that describes a current situation of the display device where the current situation is defined by one or more of environment, social and activity related parameters, produce an associative set of visualized units related to the user selected visualized unit by execution of sets of rules to find related visualized units according to situational data common in the related visualized units and current situation, and display the associated set of items with the user selected visualized unit in the matrix.

Additional aspects include a computer program product and computer implemented method.

The following are some of the features within the scope of the above aspects.

The processor is further configured to render a window on the display device for a time period, the window including a matrix of retrieved thumbnails representing the visualized units, the thumbnails assigned to cells in the matrix, schedule for display over a time period a set of visualized units for display in the cells of matrix, retrieve the scheduled visualized units, assign the retrieved scheduled visualized units to the cells in the matrix, and assign associative set of items related to the user selected visualized unit to cells in the matrix that are juxtaposed the user selected item. The visualized units are represented as thumbnail images in the matrix. The items represented by the visualized units include images, combinations of text and image, text, and video. The matrix is organized as a group of cells with the number and arrangement of cells being selected by the system based on the size of the display. The matrix is a time-changing matrix of the visualized units.

According to an aspect of the invention, a system includes a processor, a display, and a memory executing a computer program for dynamic display of visualized units, the computer program product comprises instructions to configure the processor to render on a user interface visualized units, with the visualized units arranged by a first one of rows or columns according to an attribute of the visualized units and generate updates of the interface that are responsive to user initiated gestures on the interface.

Additional aspects include a computer program product and computer implemented method.

The following are some of the features within the scope of the above aspects.

The interface displays the visualized units in a static matrix arrangement of the visualized units. The interface displays the visualized units as a time-changing matrix of the visualized units. The time-changing matrix of the visualized units has plural rows, with each row assigned to visualized units according to different values of the attribute by which the visualized units are arranged. At least some of the plural rows of the interface are individually swipeable to allow a user to change displayed content only in the at least some rows that the user swipes. At least one column of the interface is a fixed column that displays a label corresponding to the values of the attribute, while at least some of remaining columns change content according to individually swiping of corresponding rows. The update is caused by a user-initiated interactive sharing action. The update is caused by a user-initiated action to pick a visualized unit in one of the rows to deposit in a second one of the rows. The update is caused by a user-initiated action to make new content. Sharing is governed by mutual privacy and sharing settings. Sharing is governed by mutual privacy and sharing settings. The attribute of the visualized units by which the visualized units are organized is a first one source, owner, location, topic, date, and a situational parameter. The program further comprises instructions to cause the processor to render the user interface including a band that scrolls controls, messages, comments, menus, and other information annotated to the visualized unit. Messages in a first mode are rendered linearly and in a second mode messages in the band get formed into a wave that piles to show more information as the band is scrolled.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 7B is a block diagram depicting structures.

FIGS. 28 and 29 are flow charts depicting processing of a table of contents screen.

DETAILED DESCRIPTION

Described is an arrangement for dynamic production, collection, sharing, focusing, annotating and rendering of "visualized units," which includes content suitably configured for display by desktop computers, kiosks, and mobile devices. Various types of systems/engines can be used to display and interact with visualized units. In one example, discussed below an engine displays these visualized units in a window of the engine. Alternatively, these visualized units can be displayed and interacted through other graphical user interfaces such as within a browser, windows of other applications, welcome screens, and desktops The content that comprises visualized units includes news, messages, products for sale, photos and other media. Visualized units are selected, sequenced, and shown in a dynamically changeable manner as an animated visual interface suitable for both large and small size screens. Display of such visualized units is scalable. The rendition of the visualized units in this manner enables visual at-a-glance interest-based viewing, and dynamic handling of large number of content items from various sources.

Figure 1:
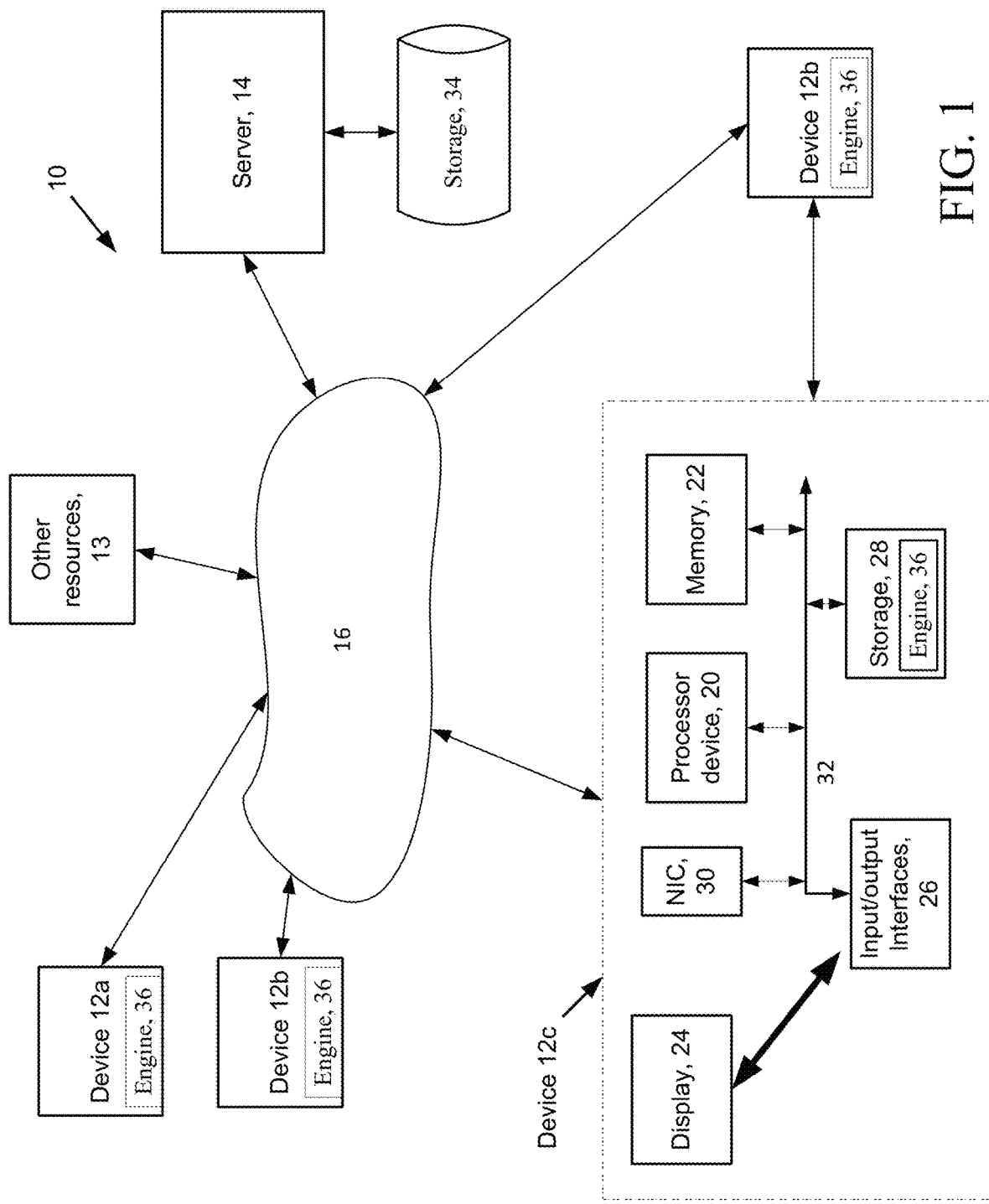
FIG. 1 is a block diagram of a system.

Referring now to FIG. 1, a system 10 includes plural devices 12a-12d coupled to a server 14, via a network 16, e.g., the Internet, as shown. Devices 12a-12d can be of various types of computing devices, such as desktop computers, smart phones, handheld computers, kiosks, laptop computers, tablet computers, home internet televisions, etc. As shown for device 12c, such devices 12a-12d include in a typical arrangement a processor 20, memory 22, a display 24, I/O interfaces, 26, storage 28, and network interfaces 30 coupled via a bus 32 or the like. Various arrangements are possible. Also shown in FIG. 1 is device 12d coupled to device 12c via a peer-to-peer near field connection. Also shown is remote storage 34 that is accessible by the server 14 and by the client devices 12a-12d through the server 14. A representation 13 of other resources is also shown. This representation 13 is meant to indicate sources of material for use by the system 10, which sources include web-sites, remote storage, etc.

Aspects of the system 10 can involve the network that includes various computing devices (not shown), which implement cloud computing. Generally speaking, cloud computing includes Web-based processing, in which shared resources, software, and information are provided to computers and other devices on demand over one or more networks, such as the Internet. Computing devices in the "cloud" retrieve items and visualized units and operate on such over the network.

Each of devices 12a-12d is shown with an engine 36 that retrieves stored visualized units asynchronously from sources, e.g., representation 13 as well as other sources. In some embodiments, the engine 36 is a stand-alone application whereas in other embodiments the engine 36 is part of another application and plays the visualized units in windows/interfaces associated with the other application. In embodiments, visualized units are played without user interaction. However, visualized units can be focused on, e.g., viewed in detail and interacted with at the discretion of the user. Quick interaction tools provided by the engine 36 facilitate interaction with a visualized unit, and such tools perform operations on the visualized units such as to view or make comments, make a purchase using a visualized unit, make a call, make a reservation, or otherwise interact with a visualized unit in a defined manner. Such interactions can use context of a current view of the visualized unit, and information of the visualized unit of interest, user preferences, and the device context to streamline interaction.

Figure 1A:
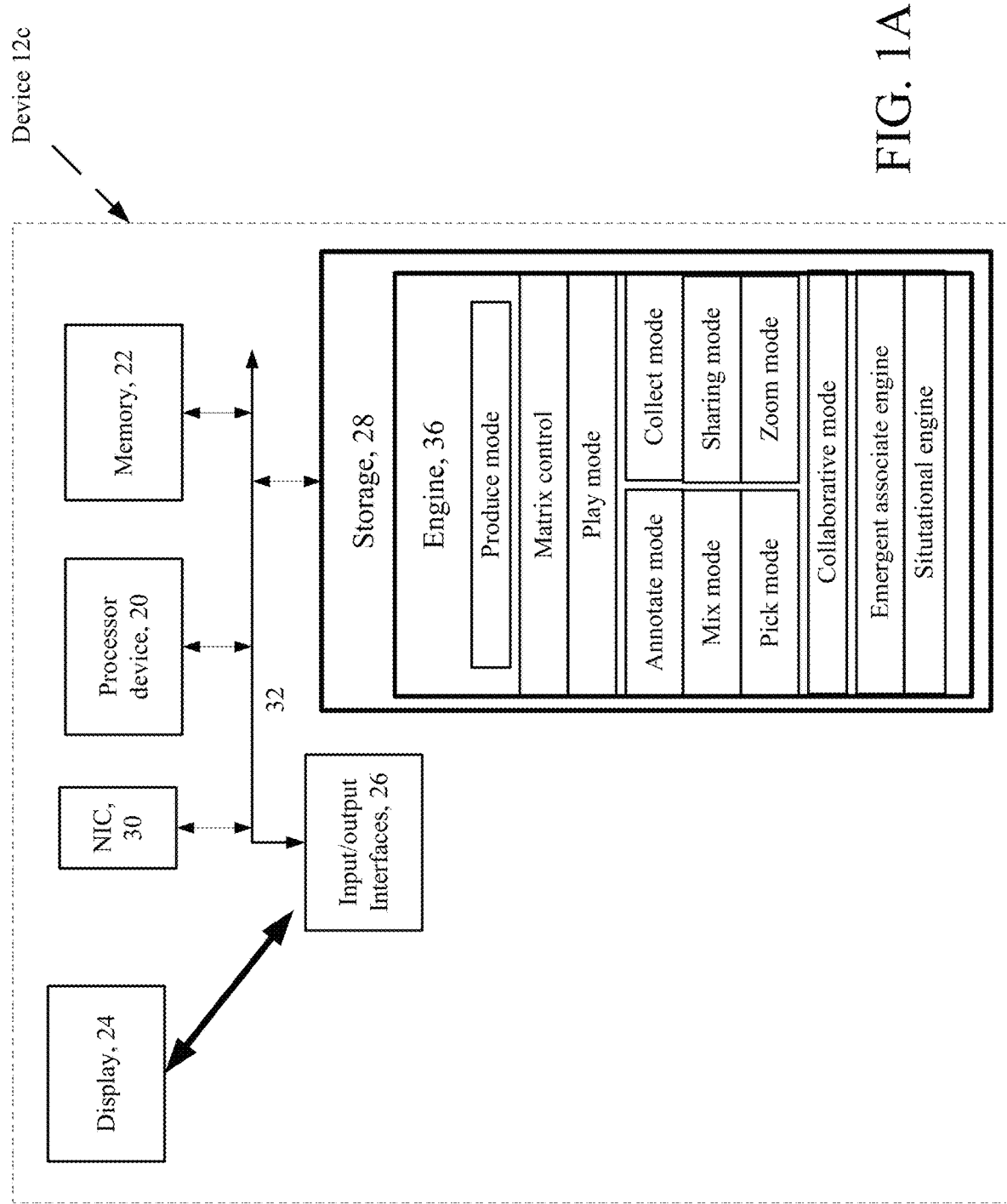
FIG. 1A is a block diagram of an exemplary device in the system of FIG. 1.

Referring now to FIG. 1A, device 12c a typical such device having the processor 20, memory 22, a display 24, I/O interfaces 26, storage 28, and network interfaces 30 coupled via bus 32 has the engine 36 shown in storage device 28, and which executes in memory 22. In embodiments, the engine 36 includes computer software to execute some or all of a produce mode to produce visualized units, a matrix control mode that controls rendering and updating, etc. of a matrix display, a play mode that plays visualized units as well as modes that allow user-initiated manipulation of visualized units including an annotate mode, a collect mode, a mixing mode, a sharing mode, a pick mode, and a zoom mode. The engine 36 also includes a collaborative mode, an emergent associated engine; and a situational engine that uses "situations" that are based on environmental, social, and activity information.

The device 12c can operate with near field and far field communications, where "near field" corresponds to network connections and other such connections that are of physically close devices and, which in some implementations involve sensing of the physical environment for new inputs. On the other hand, "far field" corresponds to network connections to servers and other devices that are physically located remotely from the device. The device 12c receives playable visualized units from near field devices it communicates with, and from user produced new items from the environment. The device 12c receives playable visualized units from networked servers, and devices that connect via the internet or other networks.

Figure 2:
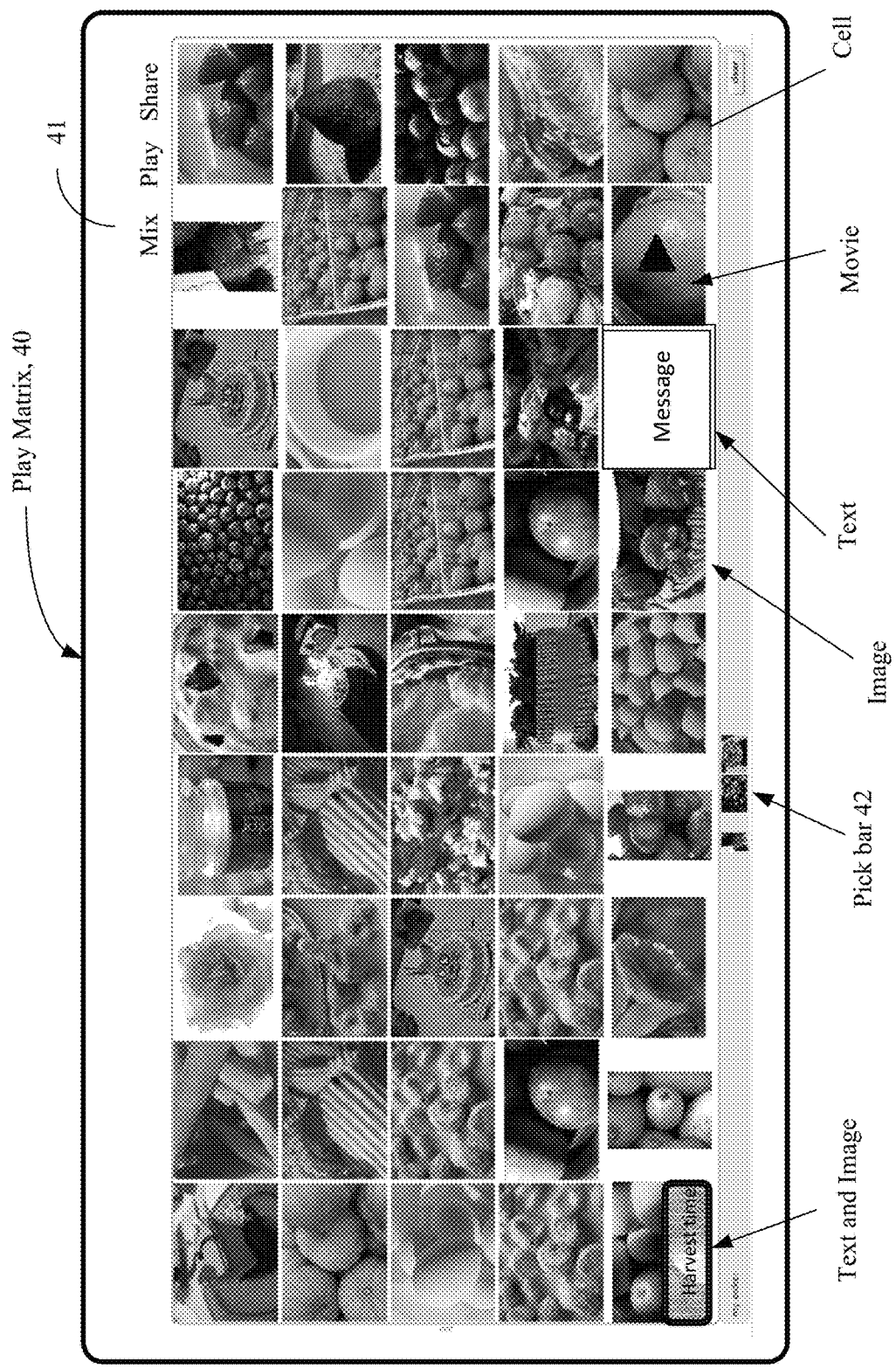
FIG. 2 is a diagram depicting a display rendering in a window dynamic display of visualized units.

Referring now to FIG. 2, the display 24 of, e.g., device 12c is shown rendering a screen or window of a 2-dimensional matrix 40 of visualized units. The display 24 renders the visualized units as thumbnail images of visualized units. The visualized units are assigned positions in the matrix 40 by the engine 36. The display 24 also depicts icons on a toolbar or menu 41 within the window that provide controls, e.g., Mix, Play, Share for displaying and otherwise interacting with the visualized content in the matrix 40.

Figure 2A:
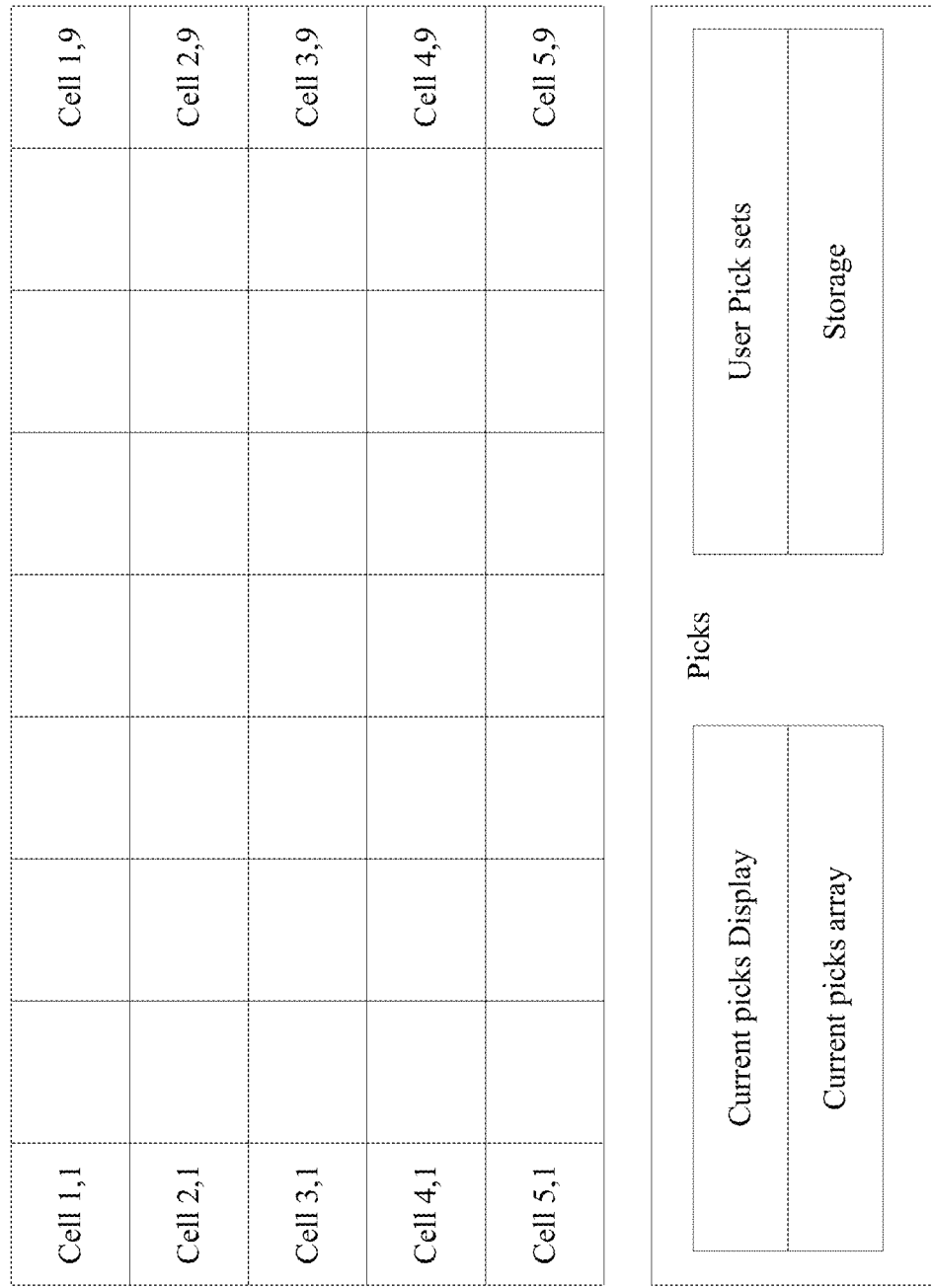
FIG. 2A is a block diagram depicting cells in assignment in the dynamic display of visualized units and pick structures.

As shown, the matrix 40 depicts representations of visualized units as images, a combination of text and images, text, or video, and so forth. The matrix 40 is organized as a group of cells (see FIG. 2A). In FIG. 2A, the cells are arranged in a matrix of 9×5 cells, which would be suitable for displays commonly found with laptop or desktop devices. For kiosk devices typically more cells could be used, whereas for handheld devices, typically fewer cells would be used. The matrix 40 shown is suitable for a desktop, laptop or kiosk display. The time-changing matrix of the visualized units produces a visual collage of juxtaposed visualized units to convey information to a user in a visual manner.

Also shown in FIG. 2, is pick bar 42, with a collection of picks as will be further described below in FIGS. 15 and 16. "Picks" are visualized units that are placed on the pick bar 42 by dragging and dropping the visualized units onto the pick bar 42 or gesturing (such as by flicking) visualized units towards the pick bar 42. Selection can be by any detectable expression including eye movements, gesture, sound, etc. Picks can be from a current session of the display or cumulative from previous sessions. Sets of picked visualized units can be named and stored as discrete collections of visualized units. By default, "picks" and "pick sets" are personal that can be shared as discussed below.

Cell assignments for the matrix of FIG. 2 and pick structures are shown in FIG. 2A.

A current set of picks can be stored locally or uploaded to the server and stored remotely. The set of picks can be stored temporarily for an anonymous user or longer for a logged in user. Pick-sets are collections of references to selected visualized units. A user clears picks and produces new pick sets based on personal logical groupings. For example, if a person collects items for a trip and then items of furniture, these might go into different sets. The user can switch what the current set in use is, and also produce a new set that the user names or which is given a default name.

Structurally, picked sets are collections of visualized unit references. If stored for a known user, the picked visualized unit is stored as (visualized unit-reference, user, pick-set, pick-date). Picked visualized unit can be of various types, e.g., an image and description, or an image and video and so forth.

Figure 3:
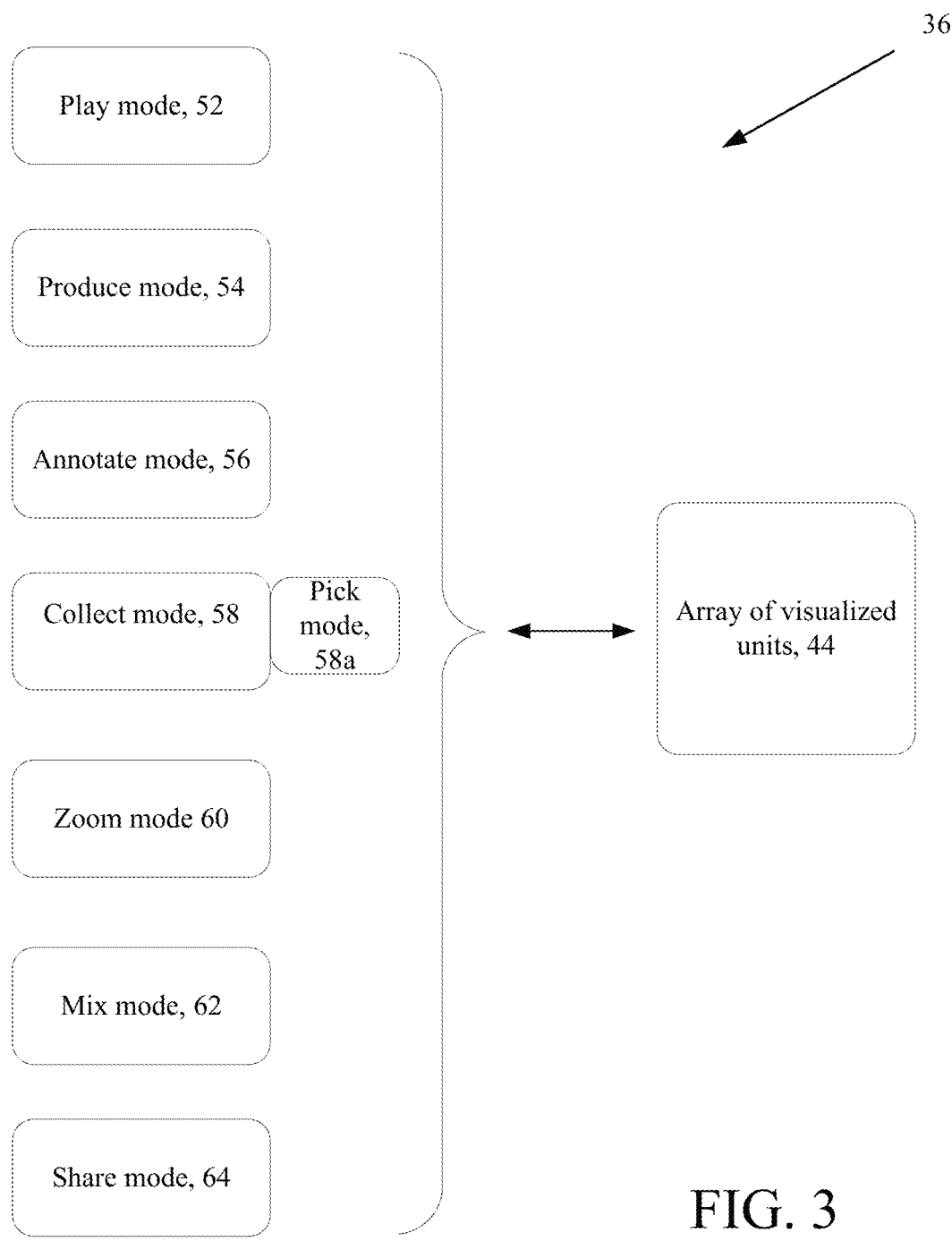
FIG. 3 is a block diagram that depicts operational modes for visualized units.

Referring to FIG. 3, the engine 36 enables users to interact in various ways with a collection of visualized units 44. The engine controls display of visualized units according to the operational mode. The engine includes several operational modes that can be combined to form more complex modes. For example, the engine 36 has a play mode 52 (FIGS. 5, 6) that causes the engine 36 to play visualized units from an array 44 of visualized content. The engine 36 has a produce mode 54 (FIG. 7) that causes the engine to produce visualized units that are stored in the array 44. The engine 36 also has an annotate mode 56 (FIG. 8) that causes the engine to apply user defined annotations to the visualized units in the array 44. The engine 36 has a collect mode 58 (FIG. 9) that causes the engine to collect visualized units from the array 44.

Several types of collect modes 58 are feasible including a pick mode 58a, (FIGS. 15, 16) by "picking" visualized units from existing collections into a pick set, an automatic collection mode that collects visualized units dynamically according to user specified criteria or rules to allow input into a defined collection, including, entering a place and receiving visualized units that have a criteria that matches the rules or user specified criteria such as items on sale, and an additive collection mode that allows users to add visualized units to existing collections either by producing visualized units from input items or by picking visualized units and adding the visualized units to an existing pick set.

The engine 36 has a zoom mode 60 (FIGS. 10-12) that causes the engine to focus on a particular visualized unit from the array 44 of visualized units. The engine 36 has a mix mode 62 (FIG. 13) that causes the engine to mix visualized units in the array 44. The engine 36 has a share mode 64 (FIG. 14) that causes the engine 36 to share visualized units from the array 44.

These modes can be inter-related. The engine 36 can play visualized units in a non-interactive fashion or the visualized units can be mixed first and then played by the engine 36. The mixed, played visualized units can be selectively zoomed into to see more information regarding the visualized units. The played visualized units are picked to provide picked sets that can be named and reviewed at a later time. Picked sets of visualized units can also be shared with an audience to initiate a discussion about the visualized units in the picked set. Such shared set of visualized units can in turn be mixed and played.

One such set of inter-related modes is "Mix-Play-Share." In Mix-Play-Share users mix various collections of visualized units, visually play the visualized units and sharing one or more visualized units by picking the visualized unit(s), and sharing the picked set with an audience. The user can add comments to the picked set and mix with other visualized units and played.

Other sets of interrelated modes include Play-Zoom. In the Play-Zoom inter-related mode, during playing of visualized units, the Zoom mode allows a zoomed on visualized unit to show related content, such as comments, votes, and related visualized units. The sharing mode can also link back to Zoom when a message item is clicked. Selecting and focusing on a visualized unit in Play can show more about the visualized unit in-place, within the matrix 40 by retrieving related visualized units and inserting the related visualized units directly into the matrix as the user selects, e.g., by clicking on interesting visualized units. This interaction focuses in an interactive manner the content towards what the user desires to focus on. New material can be produced and inserted into mixable collections of visualized units. Messages or discussions about visualized units produce additional material that is associated with the visualized units.

Figure 4:
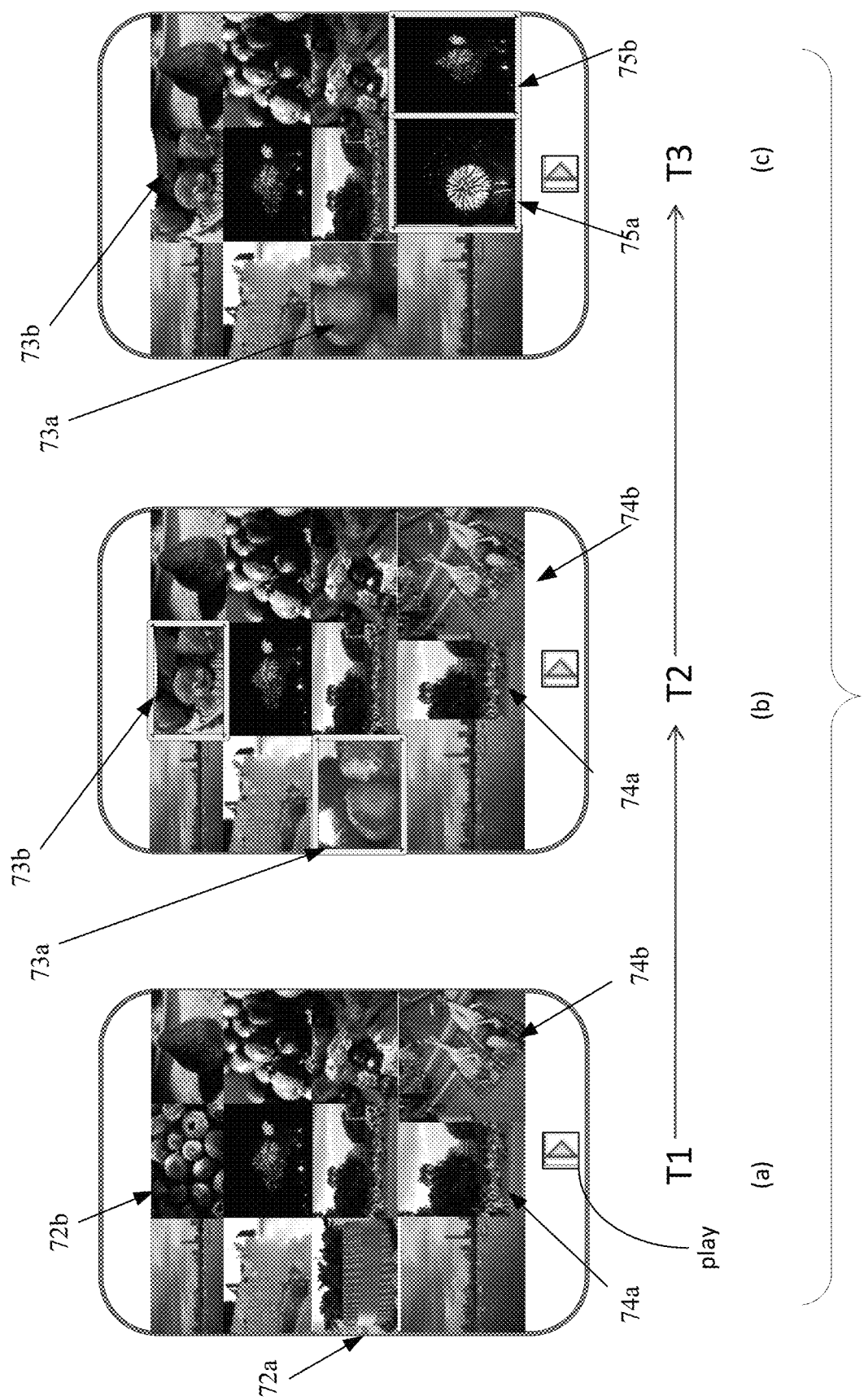
FIG. 4 depicts dynamic display sequences.

Referring now to FIG. 4, the play mode 52 renders in the matrix 40 a dynamically changing visualization. In FIG. 4, the display shown is exemplary for a type/size of a display that would accompany a portable device; the functions described however are applicable to any display, e.g., laptop, desktop and kiosk for instance. Visualized units are played in a time-sequence of different screen shots, in which one or more cells in the matrix 40 changes content every few moments. The variables can include (1) visualized unit order (2) cell update order (3) cell change time (4) refresh data timing (5) number of visualized units displayed (6) number of visualized units changed at a time. The user interface variables are human factor dependent and can be specified by the user. While various time intervals are feasible it is desirable that the display change relatively quickly to catch a user's attention, but not so frequently to be annoying or so fast as to be filtered out by a user. Exemplary time intervals between cell changes can typically be on the order of 5-10 seconds, but other ranges are possible. For example, a range of 2-7 seconds may be more acceptable for some audiences. Time ranges could be upwards of 30 seconds and longer.

Some variables including time intervals can depend on the device type and the size of the display associated with the device. While a mobile handheld device might have a matrix size of, e.g., 3×3, and a laptop, e.g., 5×9 and a kiosk a larger array of cells, e.g., 10×18 or larger each of those devices might use different time intervals. In short, variables are dependent on device, size, and user. Cells can be arranged in other regular, layouts as well as in irregular layouts, and in 3-dimensional layouts. An average setting for a mobile handheld device would be: 3×3 cells, 2 cells change per interval, 3 second interval, check updates every 10 minutes.

The timing and positioning can be randomized. The timing over which cells change content and number of visualized units played in a matrix would be governed by ergonomic considerations, such as the size of the display, where the display is located and other considerations such as psychological, information processing capabilities of a user. While changing cell contents too fast may lead to an uncomfortable feeling of not seeing enough, changing too slow may leads to detachment of the user from the matrix. Interactive-triggering helps by putting the user in control of changes. The automatic changing of content and the visual nature of content is based on an operating principal that people can process a vast amount of visual material with little foreground attention, such visual items of interest are more easily discerned than reading text, and thus shifting a user's attention from a foreground focus that might be required of text, to a background focus.

This shifting of focus relies on peripheral versus central visual acuity and behavior of individuals. Peripheral vision is very acute in people, that is, people can see and comprehend things visually that are not central to one's focus. It is perceptual capability useful with the matrix 40; allowing individual users see and handle complex, changing visuals, in the form of visualized units in the matrix 40, but only focus in on those visualized units that are of interest to the user.

As shown in FIG. 4, at depiction "a" that occurs at a time T1 is a set of visualized units including visualized units 72a and 72b and visualized units 74a, 74b in the matrix 40. At the very next depiction "b" that occurs at a time T2 there is a second, different set of visualized units in the matrix 40. In depiction "b" two of the visualized units 72a, 72b from the depiction "a" are replaced with two new visualized units 73a, 73b, with visualized units 74a, 74b and all other remaining visualized units (not referenced) in the set that were played at T1 remaining the same. At the very next depiction "c" at a time T3 is a third, different set of visualized units, with the visualized units 74a, 74b from the depictions "a" and "b" being replaced with two new visualized units 75a, 75b, with all remaining visualized units (not referenced) in the set that were played at T2 remaining the same.

Figure 4A:
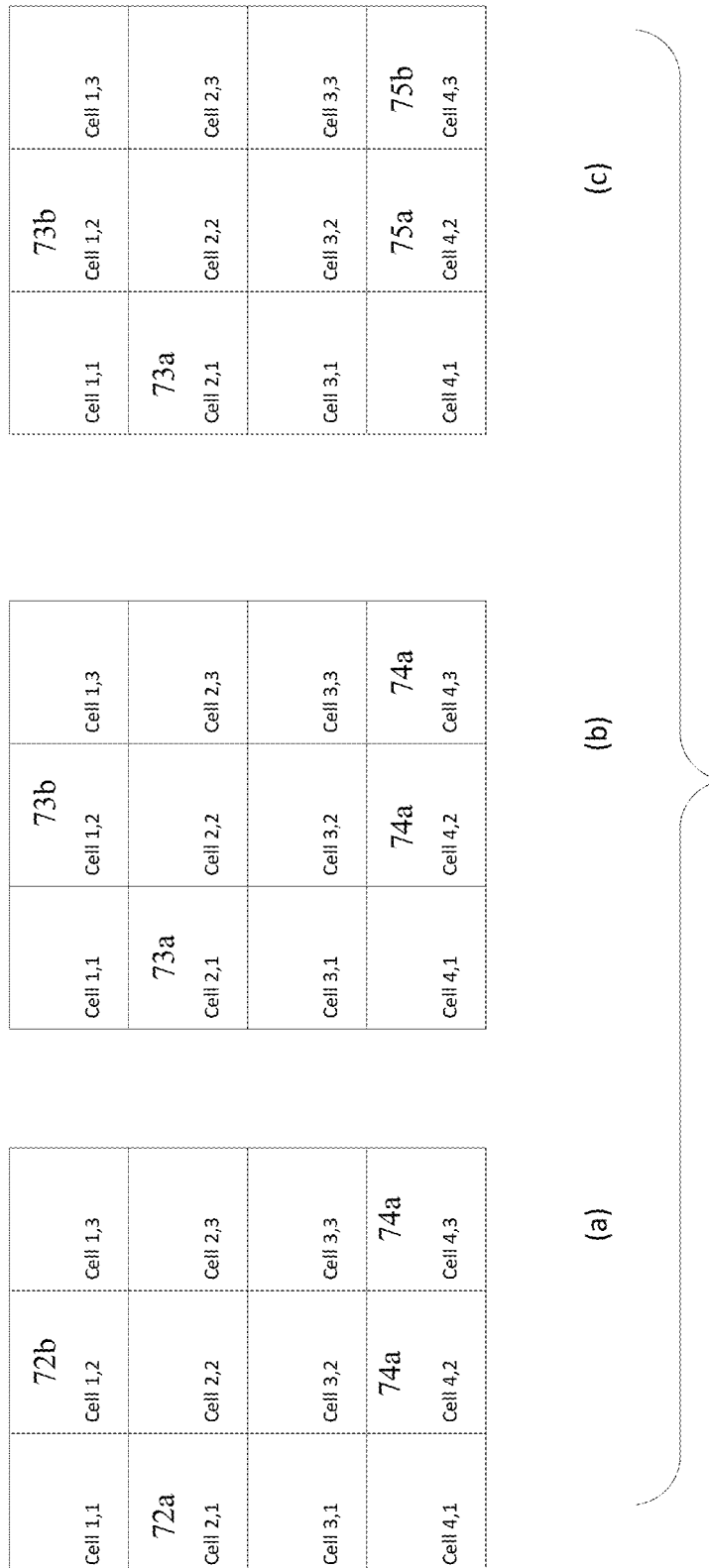
FIG. 4A is a block diagram depicting cell assignment for the sequences shown in FIG. 4.

Referring now to FIG. 4A, a cell mapping of cells C1,1 to C4,3 that illustrates visualized units assignments for the displays of FIG. 4 is shown. In the mapping at depiction "a" cell C1,2 and cell C2,1 have assigned respectively visualized units 72a, 72b and cells C4,2 and C4,3 have assigned visualized units 74a, 74b. However, at depiction "b" cells C1,2 and C2,1 have assigned respectively new visualized units 73a, 73b with cells C4,2 and C4,3 still having visualized units 74a, 74b. At depiction "c" cell C1,2 and cell C2,1 have assigned respectively visualized units 73a, 73b and cell C4,2 and cell C4,3 have assigned respectively new visualized units 75a, 75b.

Figure 5:
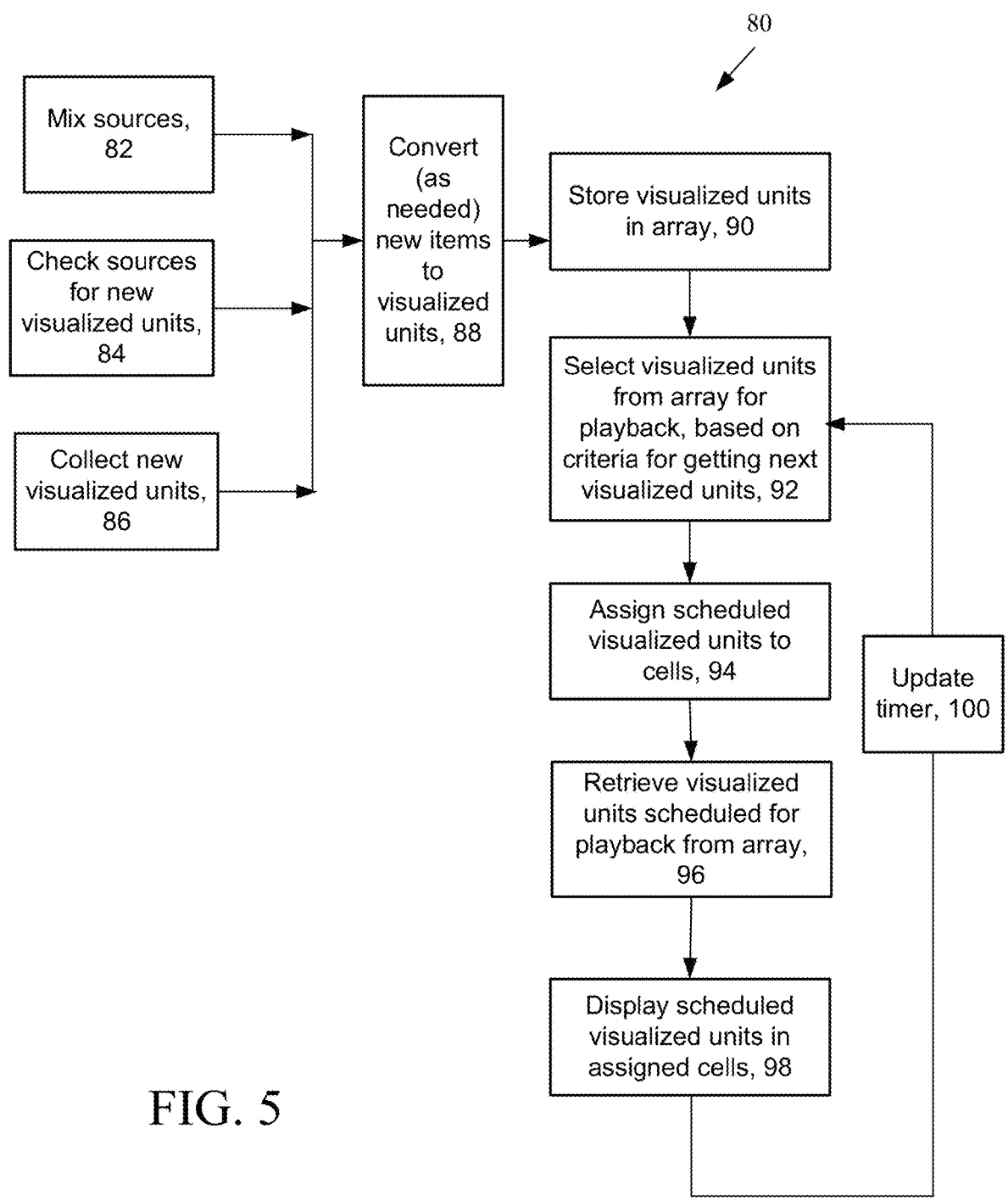
FIG. 5 is a flow chart depicting operations for display of the visualized units modes.

Referring now to FIG. 5, exemplary operations 80 involving display of visualized units for various modes are shown.

Input into the engine 36 is provided 82 from various sources, e.g., it is mixed. The input can be visualized units or items that need conversion to visualized units. Also, the engine 36 can check 84 sources for new visualized units and can collect 86 new visualized units for input to the engine 36. Items from the mix sources are converted 88, if needed, to visualized units and stored 90 as visualized units in the array 44. The engine 36 selects 92 visualized units from the array 44 for playback, based on criteria for getting next visualized units. The engine 36 assigns 94, scheduled visualized units to cells in the matrix 40 and retrieves 96 the visualized units scheduled for playback from array 44 and places 98 them in the matrix for display during playback of the visualized units in the assigned cells of the matrix 40, and updates 100 a timer.

Visualized units can be produced from various sources by processing input material and producing visualized unit-data records "visualized units" about the material, and further processing the material so that the visualized units have at least one property of and in general combinations of properties of being playable, mixable, share-able, message-able, and pickable as visualized units.

For example, a folder of images would be recorded as a collection of visualized units, with thumbnails and zoom-sized images. Other information such as Exchangeable image file format (Exif) meta-data, e.g., a standard that specifies formats for images, sound, and ancillary tags used by digital cameras, etc. can be collected. If other information such as titles, descriptions, authorship, comments, etc. is available that information is also collected. Web content such as a web page or news feeds can also be collected by the engine 36. Web pages can be "scraped" to produce visualized units, based on parsing rules—such as only one visualized unit per titled page, or an visualized unit per captioned image, or based on a special tag.

The "visualization" process can be extended to producing "visualized units" from physical items as well. A photograph of a room or a place can be parsed with human and machine assistance to identify items of interest that appear in the photograph. Physical "visualization" includes designation of items, e.g., a person annotating items in the photograph as a named thing. Alternatively, items can be sensed or detected, as with RFID tags from local, near-field items or by scanning a code, such as a bar code from a product. Both electronic content or items and physical items can be operated on as "visualized units" by the engine 36 bringing both the virtual and the physical environments together in the engine 36 as "visualized units." The visualized unit can be a composite from a variety of inputs, media, and data accumulated over time.

Figure 6:
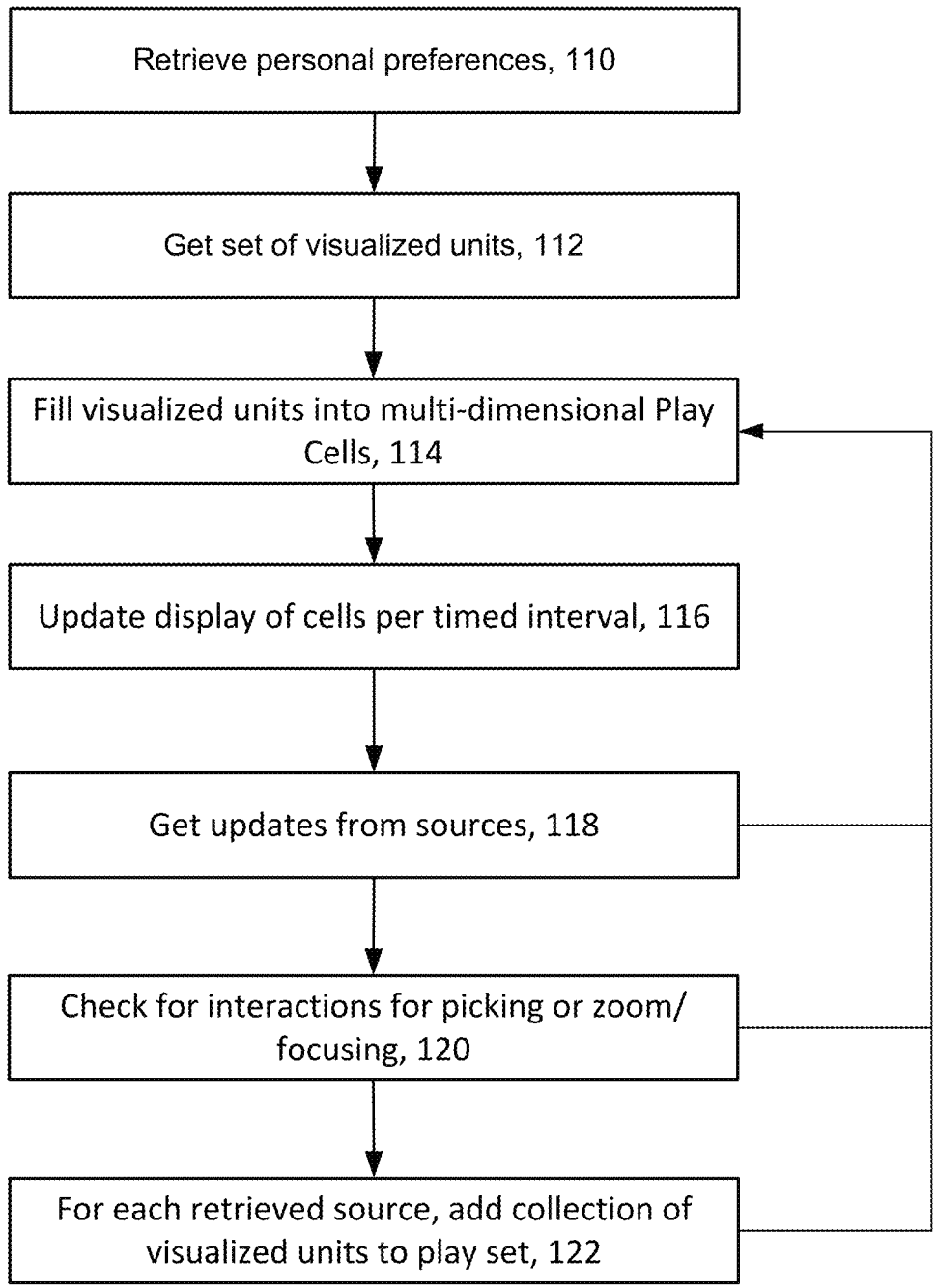
FIG. 6 is a flow chart depicting operations for display of the visualized units.

Referring now to FIG. 6, in the play mode 52, the engine 36 asynchronously retrieves 110 personal preferences of how visualized units are played, and gets 112 a playable set of visualized units from the array. The play mode fills 114 in thumbnail graphics of the visualized units into play cells of the array and updates 116 cell assignments of visualized units on a per timed interval basis. The engine 36 also gets 118 updates of visualized units from sources, checks 120 for user requested interactions such as pick or zoom/focusing, and for each retrieved source, adds 122 collection of visualized units to set to play. After any change in visualized units or a user interaction, the play mode 52 returns (denoted by the path) to fill 114 visualized units in the multi-dimensional play cells and updates 116 the display.

Figure 7:
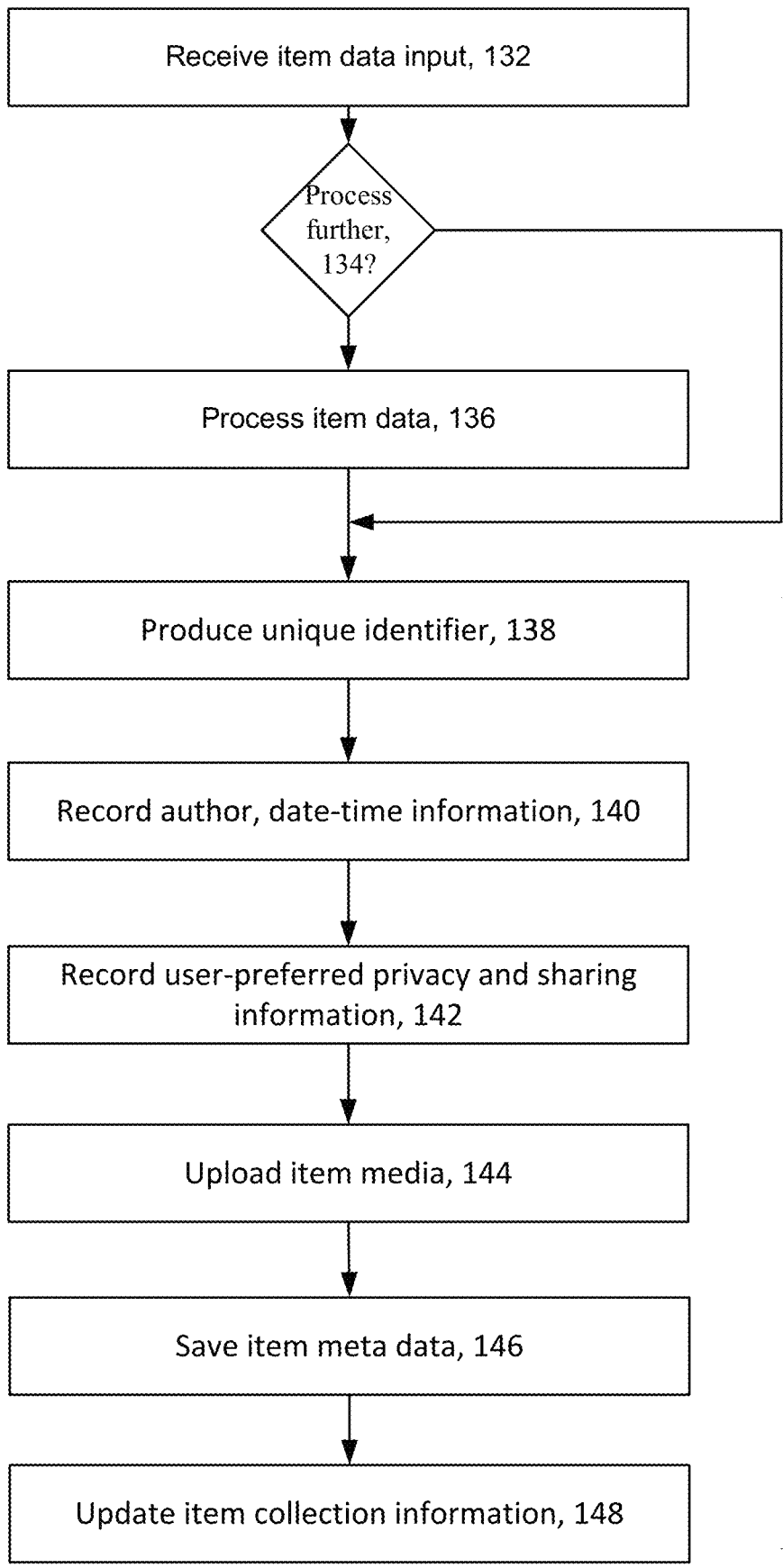
FIG. 7 is a flow chart depicting a producing mode.

Referring now to FIG. 7, a produce mode 54 for producing visualized units is shown. The process receives 132 items as data input, accepts drag and dropped files, photographs, recorded video, or detected near-field items. In addition, the process can accept items or media via machine or human-aided recognition, and other input. Production of items into visualized units is made by ad-hoc conversions of items from a variety of encountered media and documents. For example, simple to more complex, "items" are converted into visualized units by reading one or more images and making visualized units from each image. Visualized units can be made from items in an RSS feed or from items such as media images, or video, etc. Text and/or metadata about the media items are produced by parsing a web page and reading particular tags or elements, such as images with captions, or titles. Also, items in the physical realm can be made into visualized units by sensing or recognizing or denoting such items through near-field RFID tags, photographs, and scan codes.

The produce mode determines 134 whether further processing is required. If required, the produce mode applies 136 further user selected processing such as editing, annotating, designating specific items in media, filter and so forth. After further processing or if further processing was not required, the process produces 137 a record of the visualized unit, by producing 138 a unique identifier, recording 140 information concerning the visualized unit, including an author, date-time of production of the item as well as other information. The process also records 142 user-preferred privacy and sharing information (e.g., whether to make the visualized unit playable, mixable, viewable, pickable and shareable) for the visualized unit and optionally can upload 144 the visualized unit as media to the server 14 (FIG. 1). The process saves 146 the item metadata and updates visualized unit collection information.

Figure 7A:
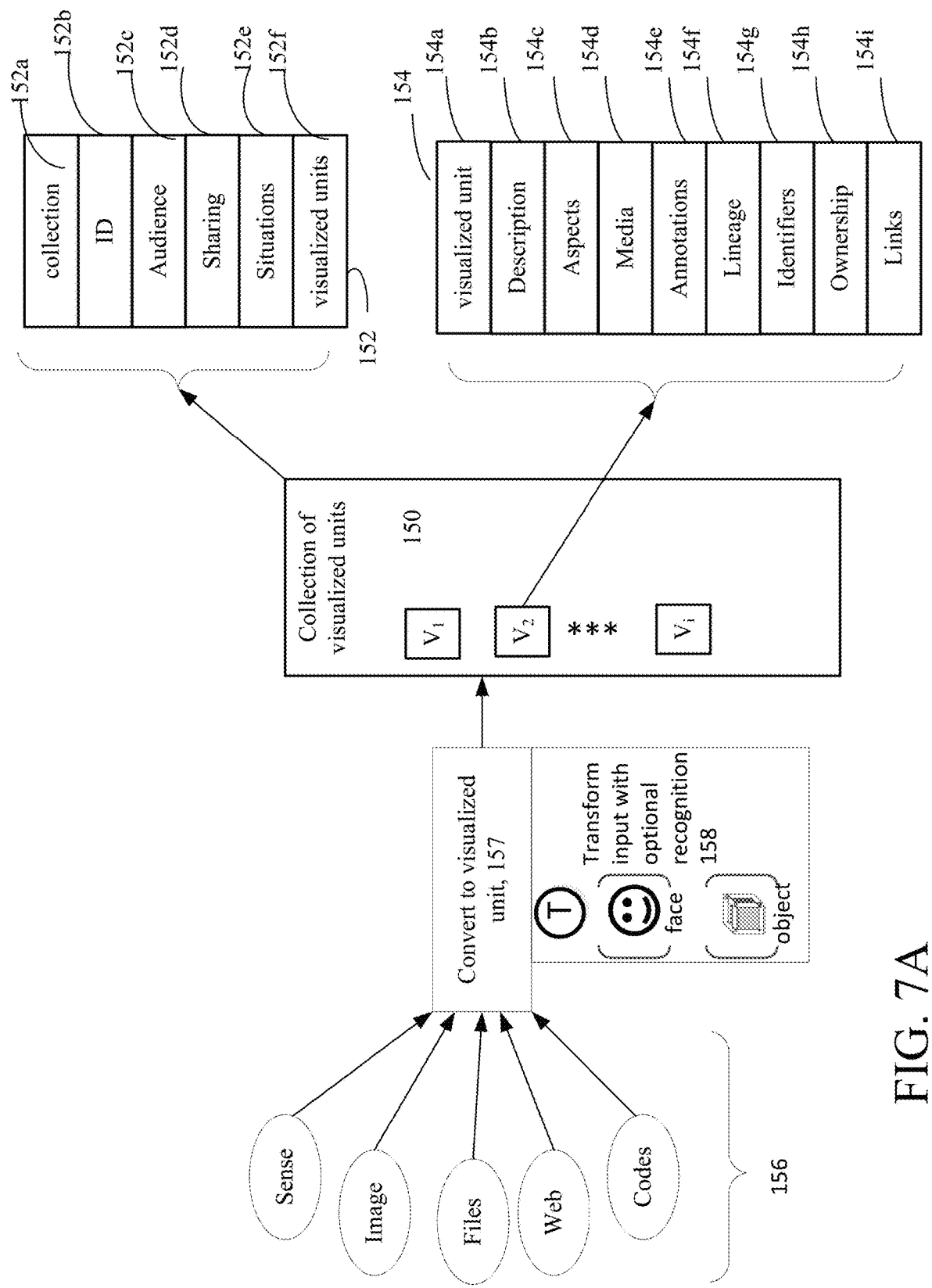
FIG. 7A is a block diagram depicting aspects of visualized units.

Referring now to FIG. 7A, newly produced visualized units are shown stored as a collection 150. Visualized units include a data structure 154 and the collection also includes data structure 152 as shown. Visualized units can originate from items provided by various sources 156 including sensing an environment that the device is presently in, inputting an image from, e.g., a camera (or other type of image input device) associated with the device, files that the device has stored, the Internet (or another network) through HTML or other content associated with a web page, as well as scanning codes such as associated with a product.

These inputted items are operated on by the engine 36 to convert 157 the inputted items to visualized units (as mentioned above) and store in a store of visualized units. In some instances a transformation process 158 can be used for machine and human-assisted recognition, such as face recognition, item, place, building, and environment recognition.

Also shown in FIG. 7A are details involved in a collection 152 of visualized units. A collection 152 of visualized units includes a collection name field 152a, an identification (ID) field 152b, an audience field 152c, sharing parameter fields 152d, situational parameter fields 152e, and a field 152f that stores visualized unit IDs associated with the collection. Also shown in FIG. 7A are details involved with a visualized unit 154. A visualized unit includes a visualized unit ID field 154a, a description field 154b, an aspects field 154c, a media field 154d, annotations field 154e, lineage field 154f, identifier field 154g, ownership field 154h, and links field 154i.

Figure 7B:
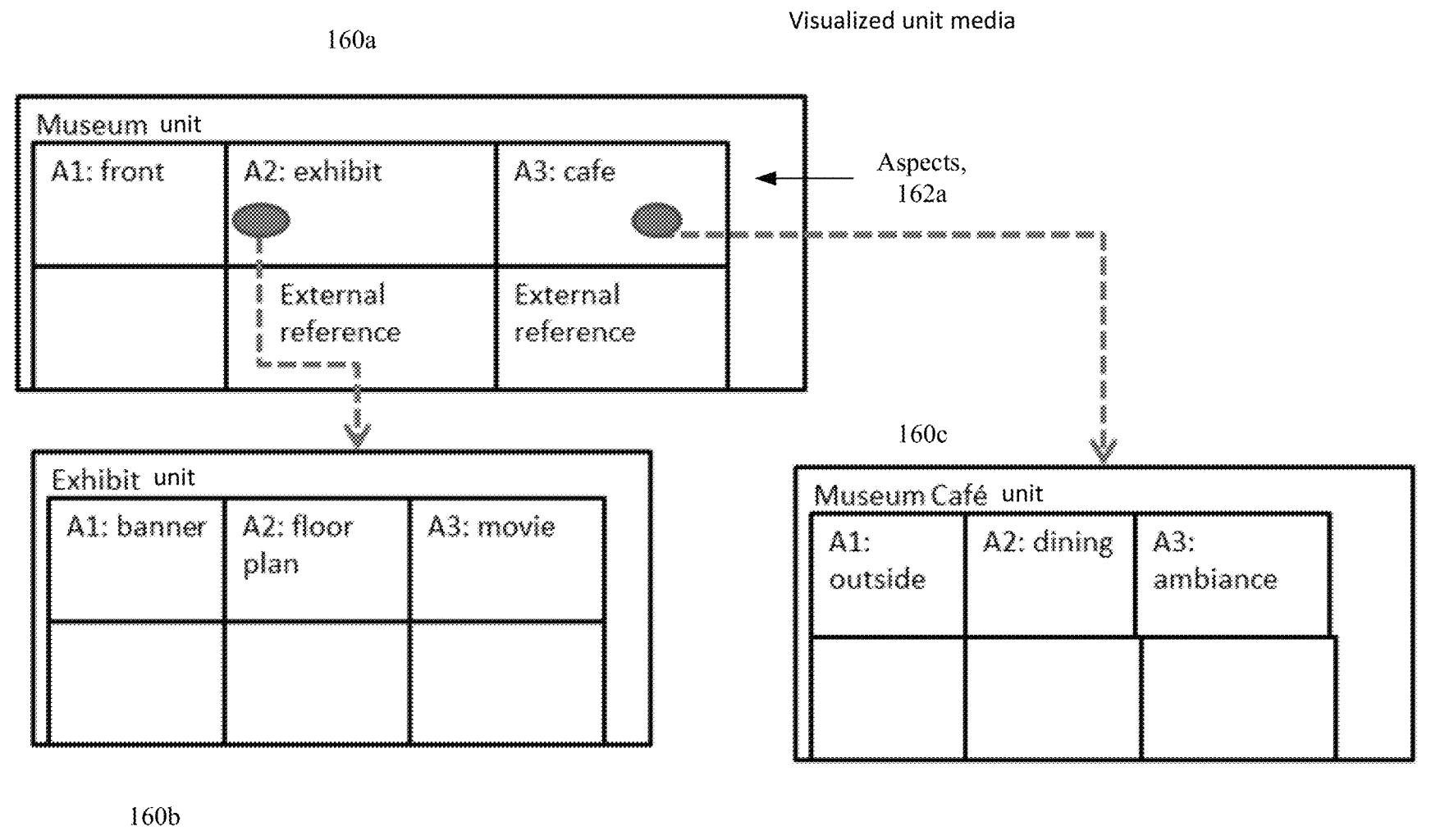

While a basic visualized unit requires minimal information, additional information about the item can be added incrementally during its use, to further define the visualized unit's attributes and relationships to other visualized units. The definition of the visualized unit grows as visualized unit is used, interacted with, inter-related, commented upon, collected and shared. As shown in FIG. 7B, a visualized units 160a-160c can include multiple media, such as images, video, audio, 3d model, and text. Different media can be used by different devices and under different circumstances. A visualized unit, e.g., 160 can have multiple "aspects" 162, which use its media for different (visually) representations.

For example, visual aspects of a visualized unit representing a 3 dimensional physical item can include a front view aspect, a side view aspect and a top view aspect. A product, such as a dress represented as a visualized unit can include an aspect showing it worn on a person, and an aspect suitable for an avatar to 'wear'.

As will be further described below, visualized unit aspects can be used to personalize or otherwise customize the visual representation of items. Visualized units with various aspects can appear differently to different people and in different uses. For example, one person might want to see product-items in a store, on a model, while another person wants to see the same product-items without packaging.

Each visualized unit (and collection of visualized units) can include a recorded lineage that specifies where the visualized unit or its subcomponents or properties came from, since a visualized unit can be formed over time, and interactions, the visualized unit can be a composite of information from many sources. Different pieces of information within the visualized unit can be selectively encrypted for different audiences. Collections of visualized units have their own properties, some of which act to generalize properties for the included visualized units.

Figure 8:
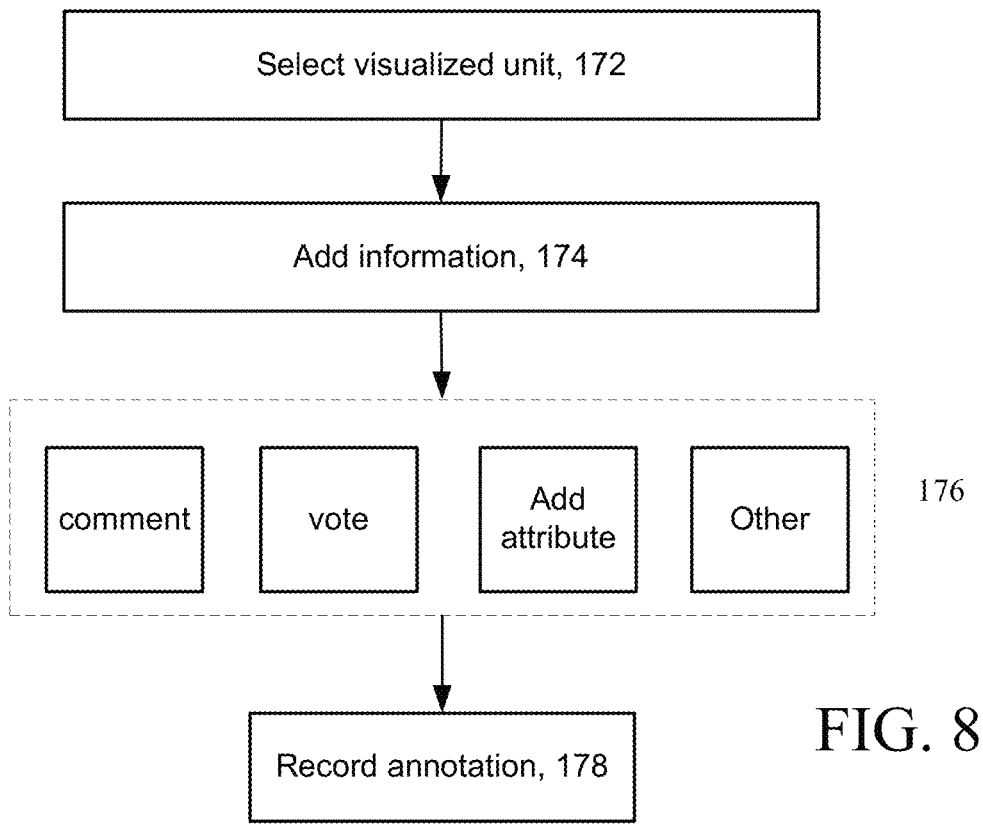
FIG. 8 is a flow chart depicting an annotating mode.

Referring now to FIG. 8, an annotation mode 56 is shown. The annotation mode 56 allows a user to select 172 a visualized unit from the matrix 40, and add 174 information to associate with the visualized unit. The type 176 of information added includes a textual annotation such as a comment, a vote, an attribute, and other information that is record and saved 178 with the visualized unit. Annotations can be from various sources, dependent on how the visualized unit is shared and allowed to be annotated. Annotation adds information about a visualized unit. The information does not exist without the corresponding visualized unit. Once a visualized unit is focused on, such as by Zoom, previously applied annotations can be shown and new annotations made to the visualized unit.

Figure 9:
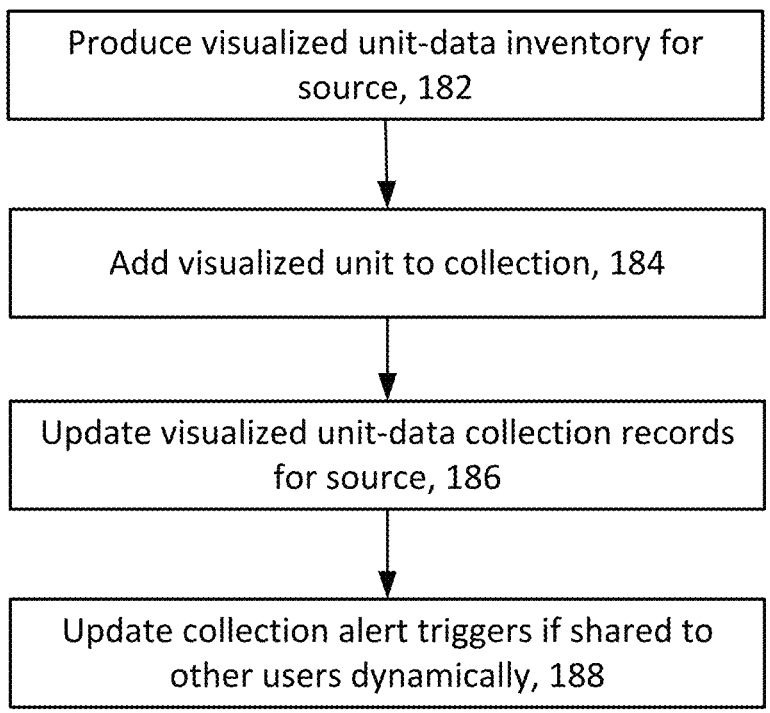
FIG. 9 is a flow chart depicting a collecting mode.

Referring now to FIG. 9, a generalized collect mode 58 is shown. The generalized collect mode 58 produces 182 collections of visualized units and data inventory for source. A user selects a visualized unit from the matrix 40, adds 184 the selected visualized unit to an existing or a new collection, and updates 186 visualized unit-data collection records for source. The generalized collect mode 58 dynamically updates 188 collection alert triggers if an existing collection is already being shared by other users.

Figure 10:
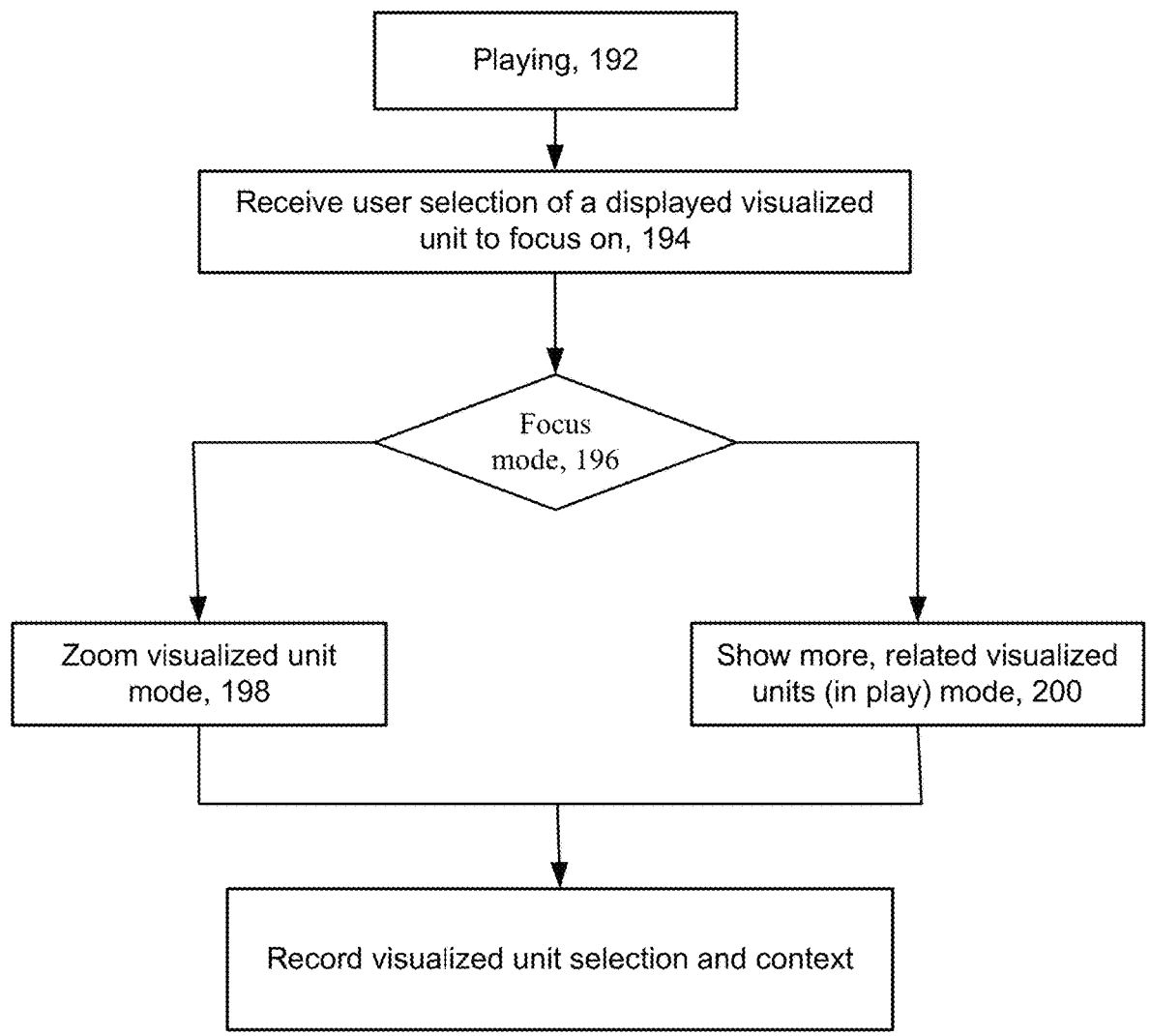
FIG. 10 is a flow chart depicting a visualized unit focus operation.

Referring now to FIG. 10, while playing 192, the engine 36 receives a user selection 194 and the engine determines a focus mode 196. The engine can enter 198 a zoom mode 60, where the engine 36 zooms in on a displayed visualized unit or a mode to show related visualized units in-play mode 200.

Two of types of focusing include zooming and showing more in play. Selection of more in play adjusts the play-visualized unit-space, by retrieving more visualized units like those selected. In more-in-play mode, more visualized units related to the selected visualized units are shown alongside the selected visualized unit, in play. This mode provides more information like the selected (focused) visualized unit, without stopping the continuous nature of play.

Showing more in play also acts to focus or tune the content (space) through user interaction.

User selection or focus can be via a gesture or device click, or other recognizable motion, e.g., eye gaze, utterance or detectable user interaction. Therefore, 'focus' on various visualized units, in play, can act to tune the set of visualized units retrieved and shown in play, dynamically and interactively. As the user sees and experiences the visual visualized units in play, and selects visualized units of interest, finding and showing more visualized units in-play acts to shift the content toward a range of selected interests. For example, seeing general offerings of a department store, and then selecting a visualized unit such as "hats" can shift the visualized units in play to see more of visualized units related to "hats" or other visualized units matching or are like the one selected. Later, emergent associations will be described as a technique for obtaining further sets of associated visualized units.

On the other hand zooming jumps out of play mode to zoom in on a particular visualized unit to provide further information on that visualized unit. The zoom mode 60 records the selection and the context from which the zoom mode 60 was selected for the visualized unit, as now discussed below.

Figure 11:
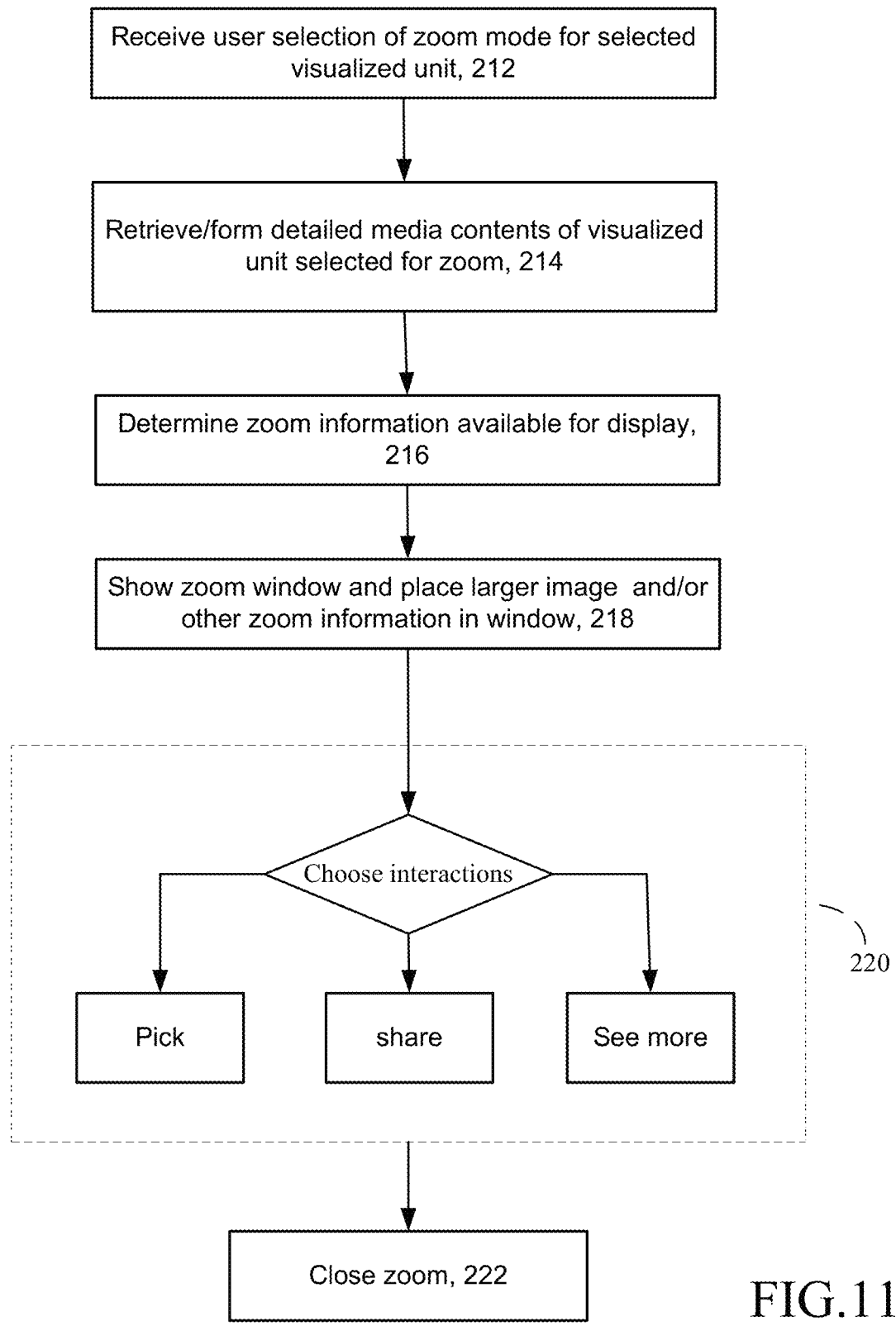
FIG. 11 is a flow chart depicting a zoom mode.

Referring now to FIG. 11, details of the zoom mode 60 are described. In the zoom mode 60 the engine 36 receives 212 a user selection of zoom mode for a selected visualized unit. The visualized unit is selected by user interaction with the display matrix 40. The engine 36 also retrieves or forms 214 detailed media content pertaining to the visualized unit that was selected for zoom mode 60. The engine 36 determines 216 zoom information that is available for display and launches a zoom window to place a larger image of the visualized unit and other zoom-related information in window 218. While in zoom mode 60, the engine 36 allows a user to choose 220 among various permitted interactions with the visualized unit, e.g., to pick the visualized unit, to share the visualized unit or to see more information (e.g., back to more in play mode) regarding the visualized unit. The zoom mode 60 is closed 222 by the engine 36 upon receiving a user command to close or exit the zoom mode.

Figure 12:
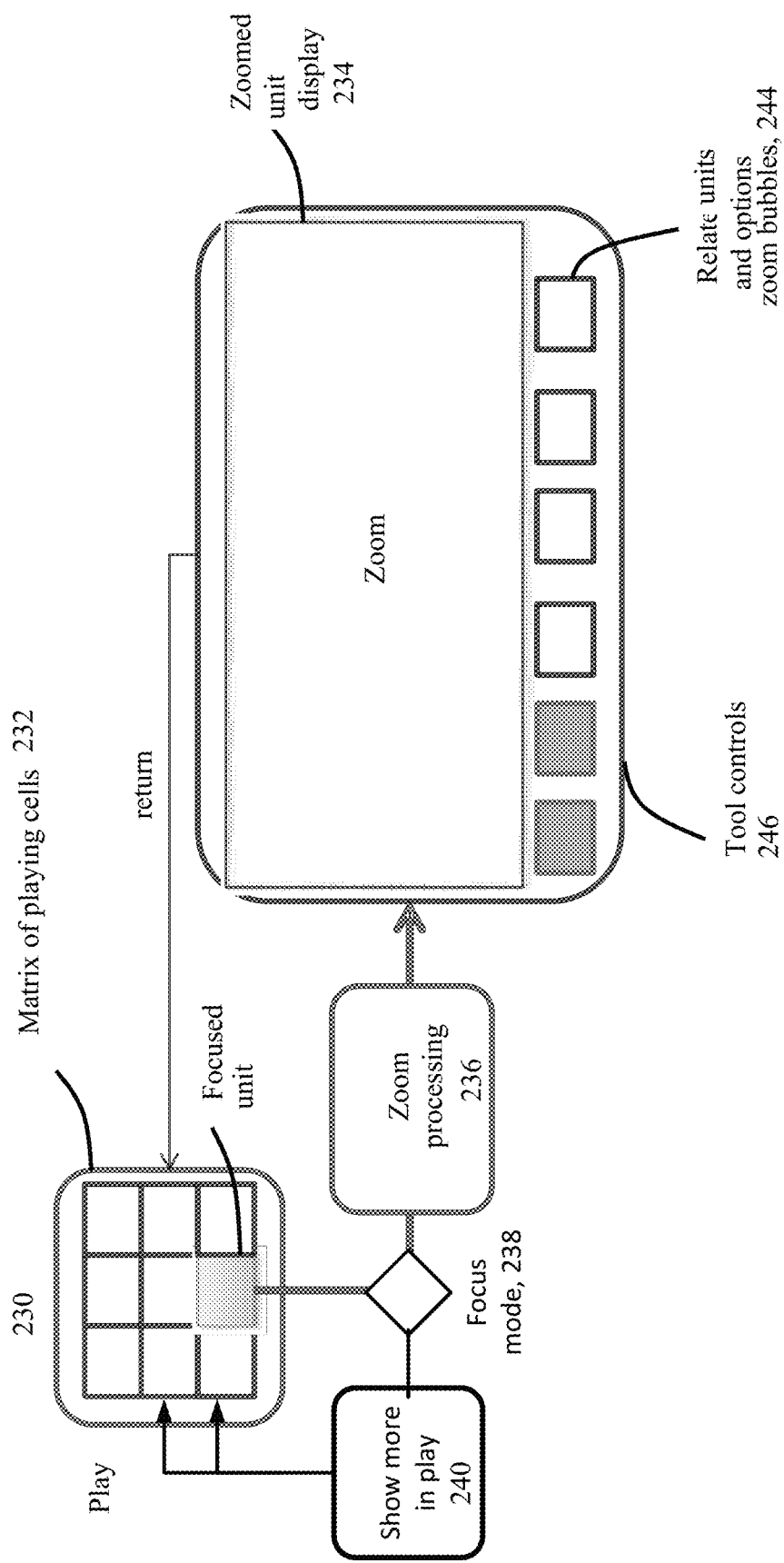
FIG. 12 is a block diagram depicting zoom operation.

Referring now to FIG. 12, a pictorial illustration of the zoom mode 60 is shown. In FIG. 12, a display 230 of a device (not shown) is rendering a matrix 232. A focused visualized unit 234 selected from the matrix 232 is shown enlarged as it would appear on the display 230 after entering the zoom mode. The engine 36 operates on the visualized unit via zoom processing 236 to gather information regarding the visualized unit selected and to place an image of the visualized unit in the zoom display as also depicted. With the zoom version of the visualized unit are included soft controls that allow user interaction and also included are thumbnails of related visualized units and options. Also shown in FIG. 12 is selection of a focus mode 238 (discussed above). The selection between zoom processing 236 and show more in play processing 240 can be explicit or implicit.

Playing presents many visualized units together and in a time-changing manner. When one visualized unit is selected, more information can be shown in the zoom screen about the visualized unit. Zooming in on a visualized unit shows the visualized units in more detail (if available) and focuses in on the selected visualized unit. Zooming intends to be a visually and informational-immersive experience. The basic zoom shows a larger image, title, description, link, and other basic information. As also shown in FIG. 12, related visualized units are shown in "zoom bubbles" 244 The engine 36 searches and retrieves related information such as comments (annotations), votes, more information such as product information, location, related visualized units, links, etc. corresponding to the visualized unit. Related visualized unit and collections of visualized unit are produced via interactions that provide associated sets, as described below. Tools 246 are also provided.

Figure 12A:
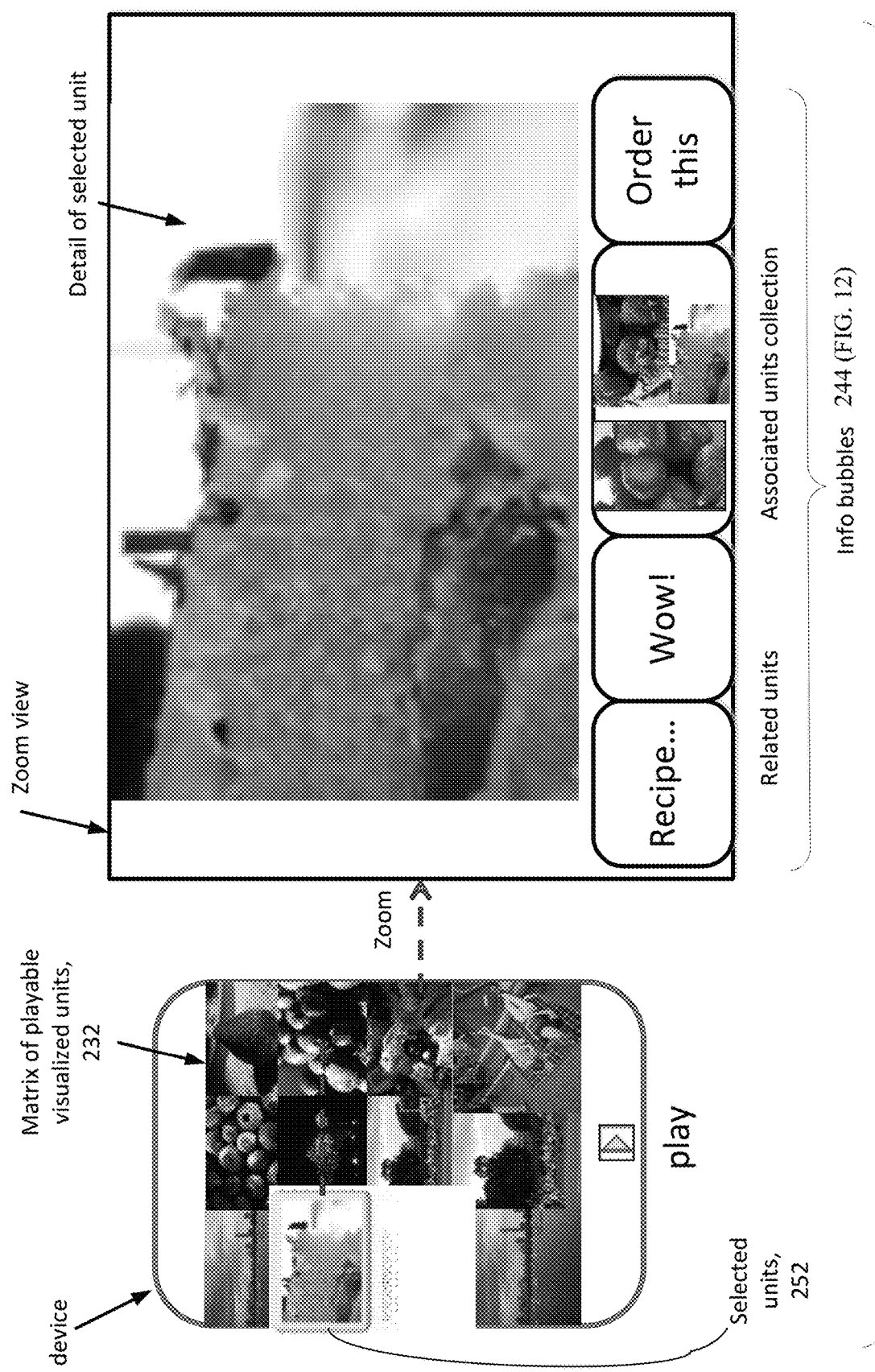
FIG. 12A is a diagram showing pictorially a zooming operation.

FIG. 12A shows zooming on a selected visualized unit 252 and details of the zoom bubbles 244. In FIG. 12A the zoom bubbles depict comments associated with the zoomed visualized unit and related sets of information, such as a set of other visualized units with some commonality (see Emergent Sets description below). The zoomed visualized unit from the matrix display is displayed on the display at a subsequent time, in further, enlarged detail. If the visualized unit is a video or other media, the visualized unit can be played. If the visualized unit has other information such as title, price, link, etc. this information can be displayed during zoom. The Zoom bubbles show related information, which can be related collections of visualized units, votes, comments, etc.

For example, as shown in FIG. 12A zooming on an visualized unit, here a visualized unit of a strawberry shortcake, shows in zoom bubbles instances of strawberries, recipes, comments, etc. an order selection, etc. These are in an associated set of visualized units, allowing the user to expand the visualized units to new sets of (related) information. Zoom selection shows the zoomed visualized unit with related information as bubbles. Showing the related information along with the zoom visualized unit provides a visual context to the zoomed visualized unit. The zoom bubbles can include linked material, information, comments, and related visualized units.

Figure 13:
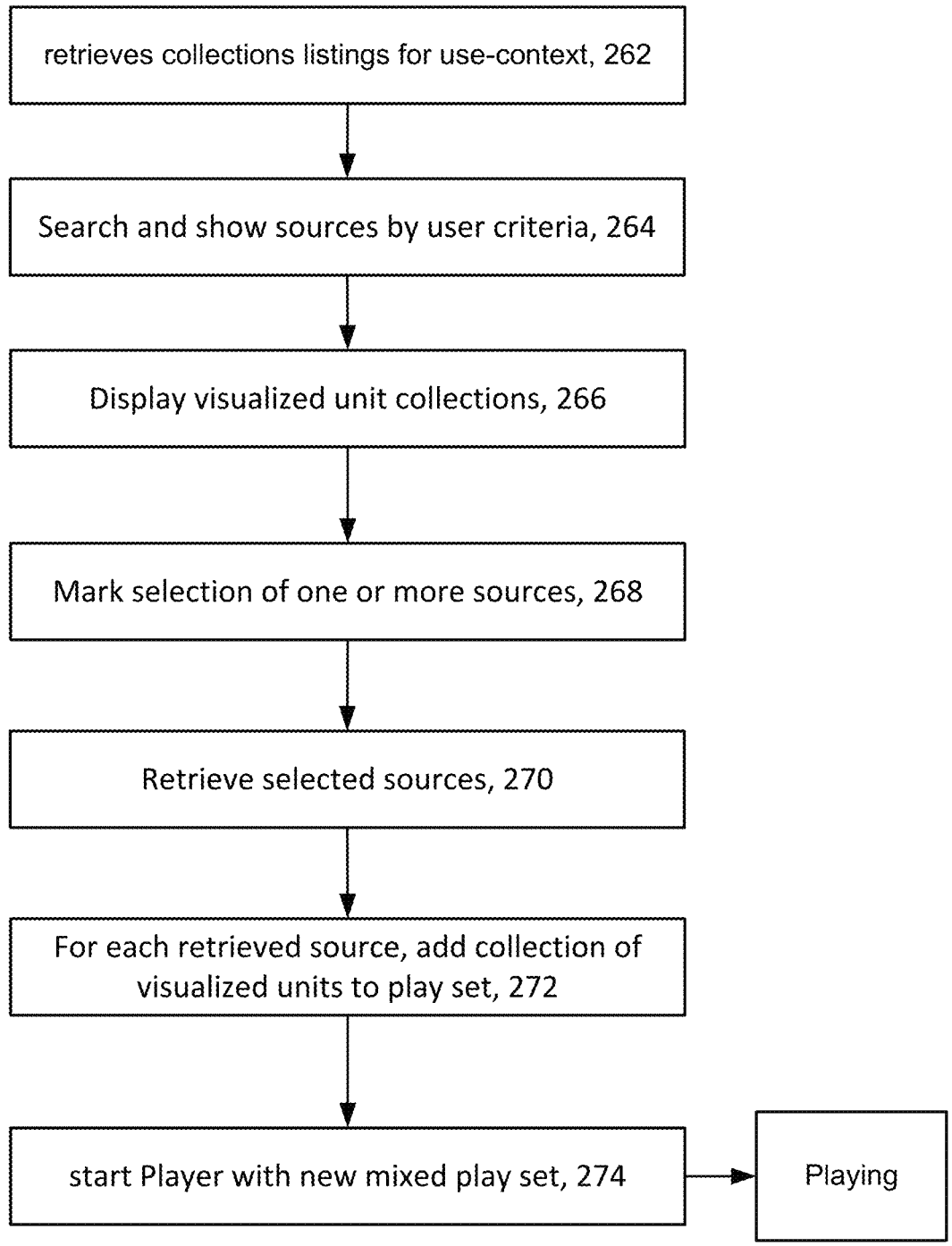
FIG. 13 is a flow chart depicting a mixing mode

Referring now to FIG. 13, the mix mode 56 is shown. The mix mode 56 retrieves 262 collections of visualized units and listings of sources. During the play mode 52, a mix mode 62 has the engine 36 get collections/listings from various sources for use in context, and searches 264 the array for visualized units, and shows sources according to user-defined criteria. The mix mode 56 searches and shows sources by user criteria and displays 266 visualized unit collections. The mix mode 56 marks 268 user selection of one or more sources and retrieves 270 the selected, marked sources. For each retrieved source, the mix mode retrieves and processes visualized units from sources adds 272 into collections of visualized units and when visualized units from all retrieved sources have been processed into collections of visualized units, the engine 36 can play 274 a new, mixed set of visualized units. Mixable collections of visualized units come from various sources. The user selects from tables of contents of sources, and mixes selected collections into the current play matrix. Sources are listed, selected and source collections are retrieved or processed into a collection of visualized units.

Figure 14:
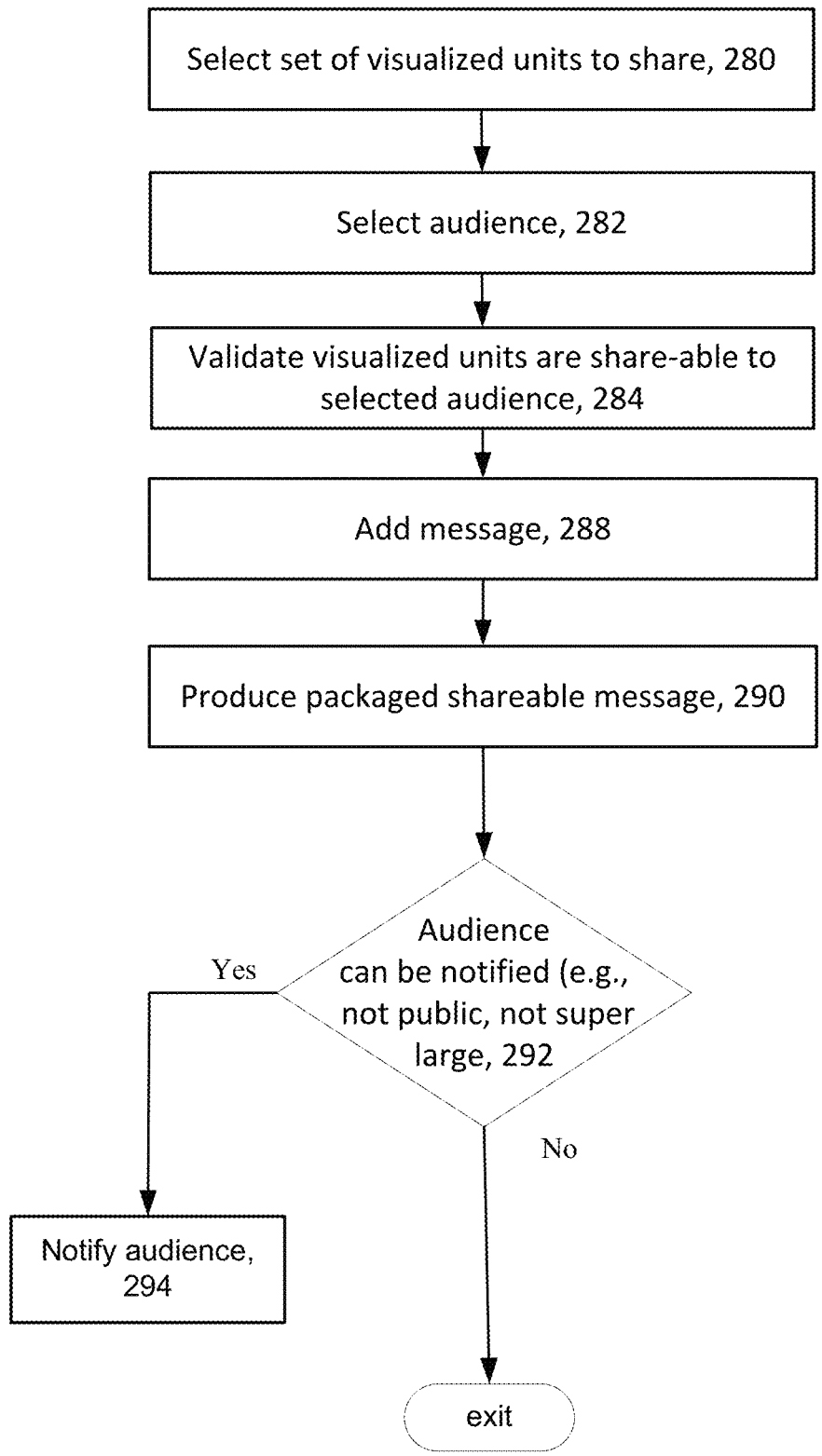
FIG. 14 is a flow chart depicting a sharing mode.

Referring now to FIG. 14, a share mode 64 is shown. The share mode 64 involves selecting 280 a set of visualized units to share. Selection of the visualized units to share can be performed using various methods. Once the visualized units to share are selected, the share mode 64 receives 282 a selection of an audience to share the visualized units with. Selection of an audience can occur using various methods. The share mode 64 thereafter validates 284 that the selected visualized units are share-able with the selected audience. The share mode 64 optionally allows a user to add 288 a message to accompany the shared visualized units. The share mode 64 produces 290 a packaged shareable message optionally evaluates if notification is feasible 292 and notifies 294 the audience of the visualized units or exits. The audience can be a set of members maintained by the user, but in some embodiments can be more public and a relatively large audience. The share mode 64 then exits.

Figure 15:
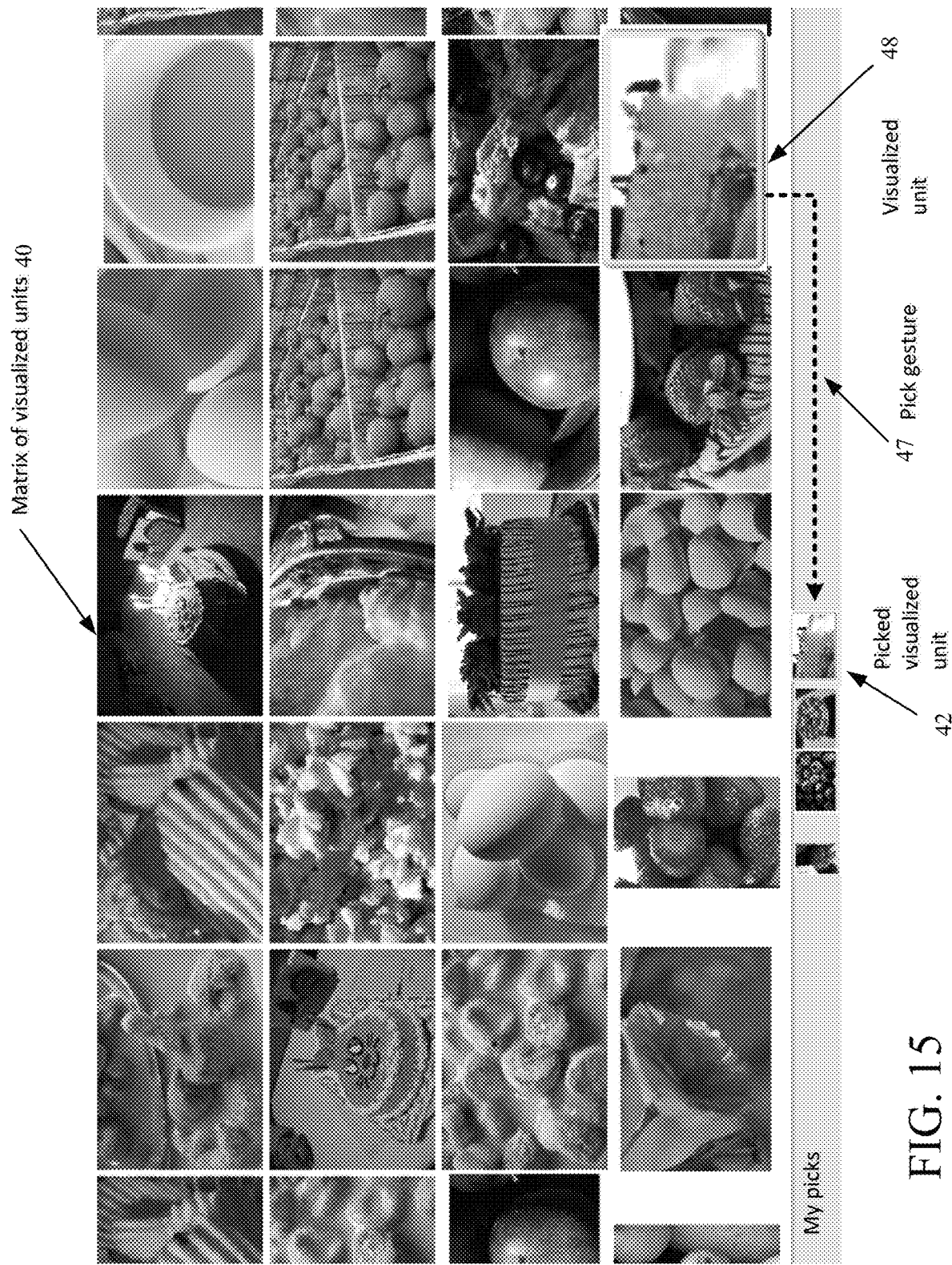
FIG. 15 is a diagram depicting a display rendering a window having a dynamic changing display of visualized units representing content and a picks bar.

Referring now to FIG. 15, the matrix 40 (FIG. 2) is shown with the pick bar 42 populated with three visualized units and a pictorial representation represented by line 47 of a visualized unit 48 being added onto the pick bar 42. The visualized unit 48 in this embodiment remains in the matrix 40, but in other embodiments the visualized unit 48 can be replaced in the matrix with another, different visualized unit.

Figure 16:
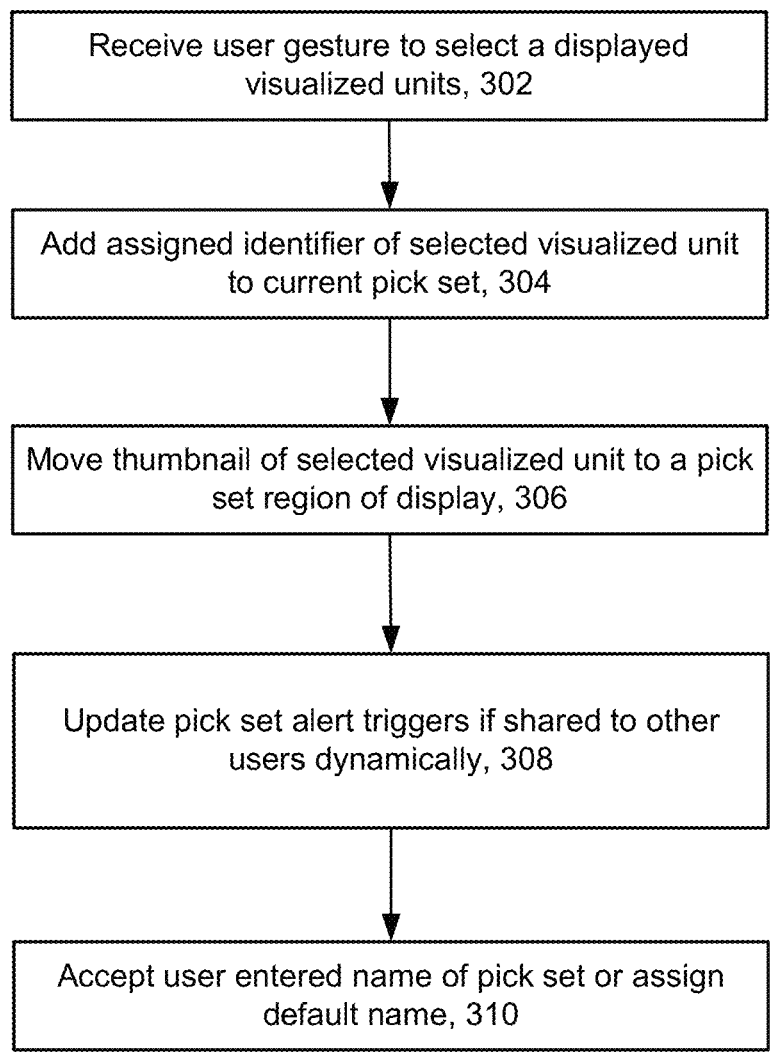
FIG. 16 is a flow chart a pick operation to group visualized units from the display of FIG. 15.
Figure 17:
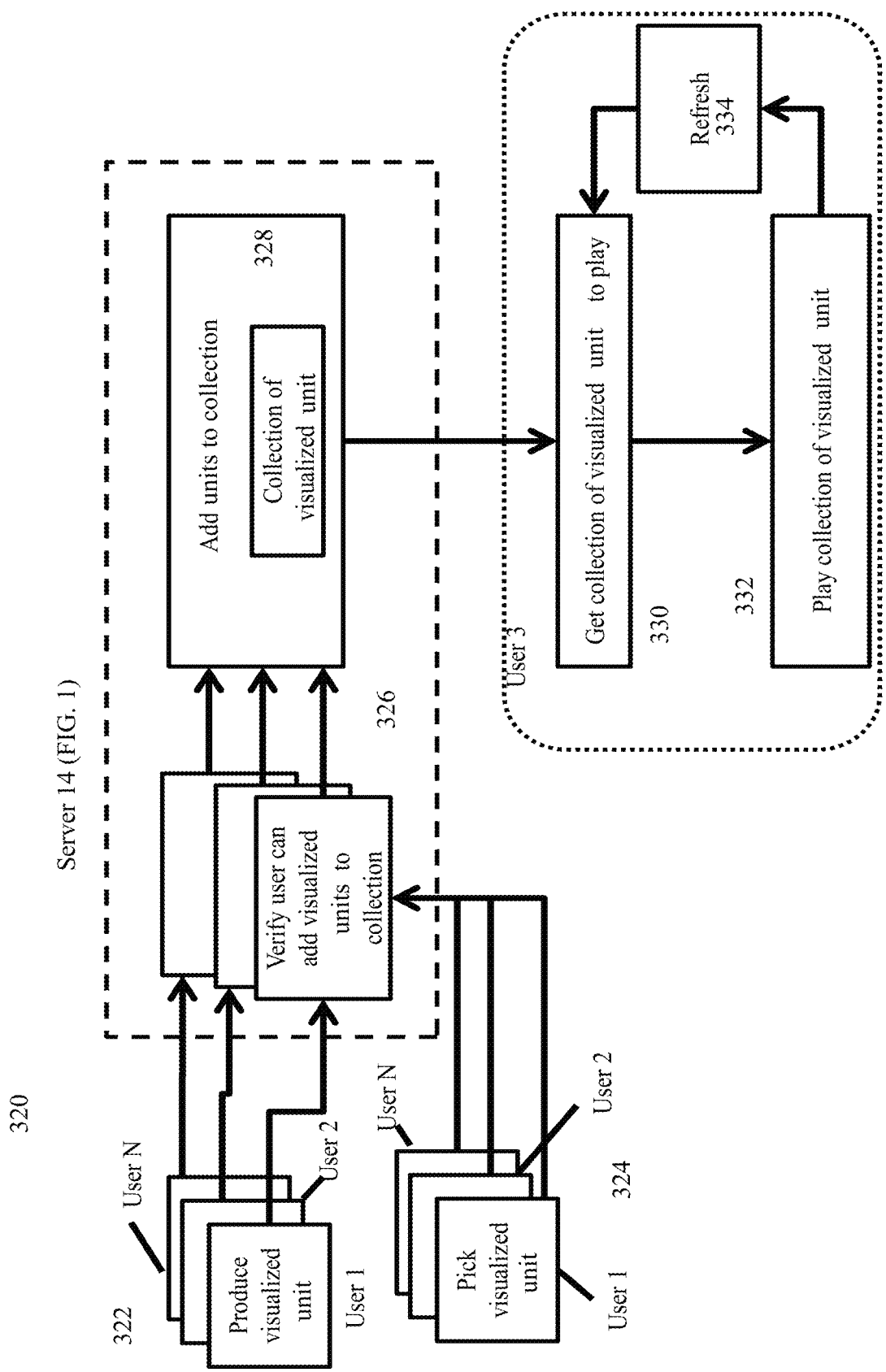
FIG. 17 is a block diagram of a collaborative visualized unit building mode.

Referring now to FIG. 16, a pick mode 60*a* which is one of the collect modes 60 is shown. In the pick mode 60, the engine 36 receives a user gesture 302 or a user dragging and dropping action that selects a displayed visualized unit from the matrix 40 to place on the pick bar 42. The engine 36 assigns 304 the identifier of the selected visualized unit to a current pick set (that is the pick set currently being displayed in the pick bar 42 of FIG. 6). The engine 36 moves 306 a thumbnail representation of the selected visualized unit to the pick bar region 42 of the matrix 40, and dynamically updates 308 any pick set alert triggers (if the pick set is currently being shared with other users), as will be discussed. The pick mode 60*a* accepts 310 a user-entered name for the pick set or assigns the pick set a default name at least when the pick set is saved. Referring now to FIG. 17 a collaborative visualized unit building mode 320 is shown. Here plural users, user 1 to user n each produce 322 and/or pick 324 visualized units using any of the respective modes discussed above, for example. Each of the users sends the produced/picked visualized units as collections to server 14.

Server 14 verifies 326 for each of the user 1 to user n that the respective user has permission to add 328 visualized units to an existing collection that is stored on server 14. A user 3, which can be any user such as user 1 to user n or another user, gets 330 the new collection of visualized units from the server 14 and plays 332 the visualized units using the refreshing 334 (dynamic displaying of visualized units), discussed above.

The collaborative mode produces shared collections of visualized units that can be produced and experienced by many users. Users may have various roles to produce, discuss, organize, share, or view/play the collaborative produced collection. For example, a whole family on a trip could collectively produce a visual collection of their travel experience for each other or someone else not present on the trip. The collaborative produced collection is produced in real time, collectively, and visually, via, e.g., mobile devices. The collaborative produced collection can be viewed in large and small devices with or without user interaction, as discussed above.

Figure 18:
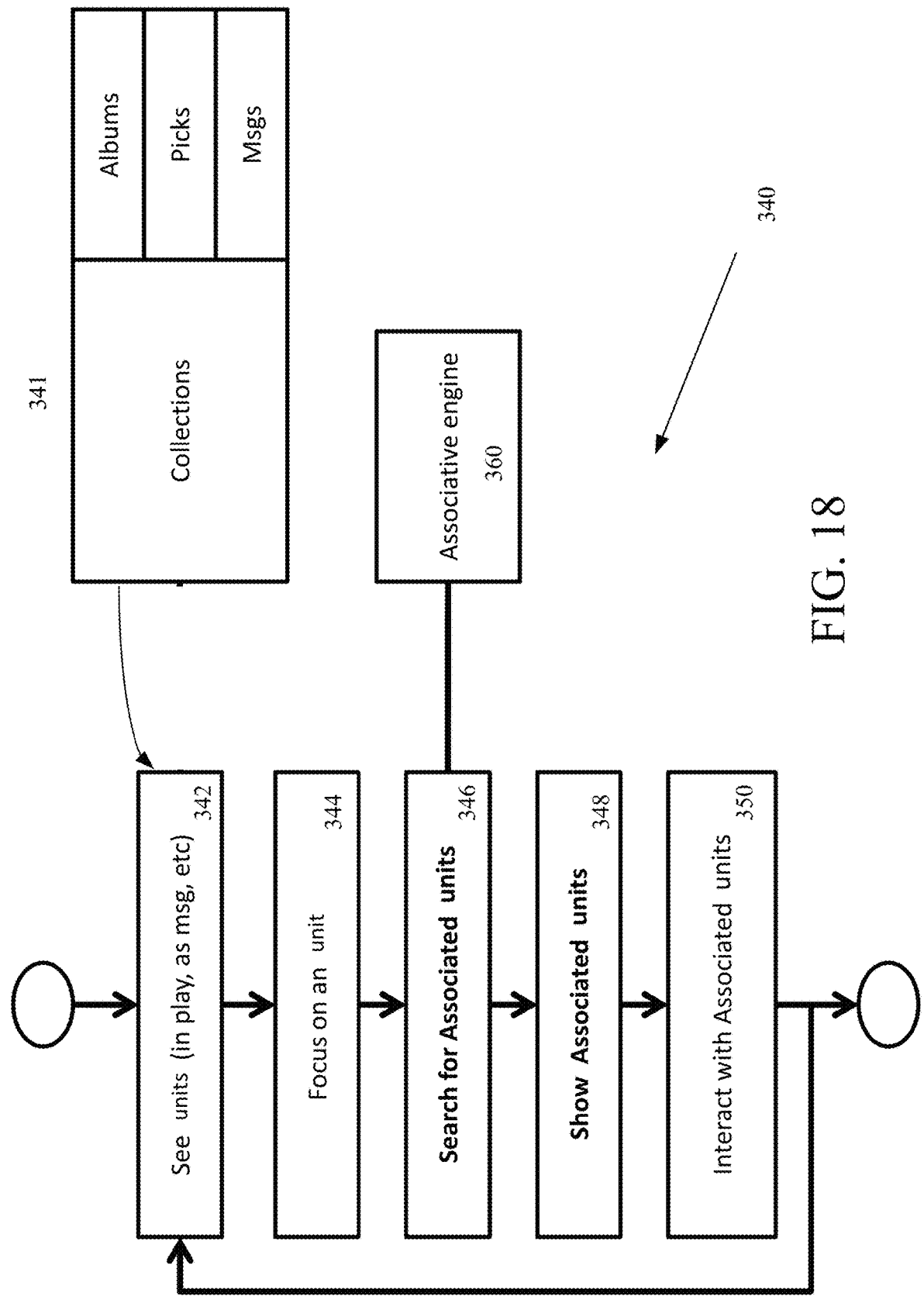
FIG. 18 is a flow chart of an emergent associative mode.

Referring now to FIG. 18, a process 340 to produce collections of visualized units that are related to each other by common visualized unit membership, referred to as emergent association is shown. The emergent association process 340 occurs during a play mode. A display renders 342 (user sees) visualized units in play, such as from messages, collections, picks, and albums, and focuses 344 on a visualized unit. The process searches 346 for associated visualized units using an associative engine (discussed below) 360. The process retrieves associated visualized units and shows 348 the associated visualized units in the matrix display allowing a user to interact 350 with the associated visualized units.

These emergent associative sets of visualized units show related visualized units based on set associativity properties that are automatically produced through user activities such as picking visualized units (into pick sets) or discussing visualized units (in message sets) or finding associative relationships from a focused visualized unit (or visualized units) from other collections. The production of associative relationships is interactive, rather than through explicit visualized unit tagging (such as with keywords). That is, this emergent association activity occurs completely visually and interactively, without any prior keyword "tags" on visualized units. When one visualized unit is selected, such as during zooming, prior inclusion of the selected visualized unit in other collections is used to show content-related by collection. The production of associative sets of visualized units can be multi-user, distributed, and asynchronous via the server 14. Found associations of visualized units can be filtered by other criteria such as user, date, location, property, etc. The collections can be segmented by user, friends, topic, date, or other criteria. When an associative set of visualized units is presented, new visualized units are can be browsed in place, picked, or added to the array for display in the play matrix.

Figure 19:
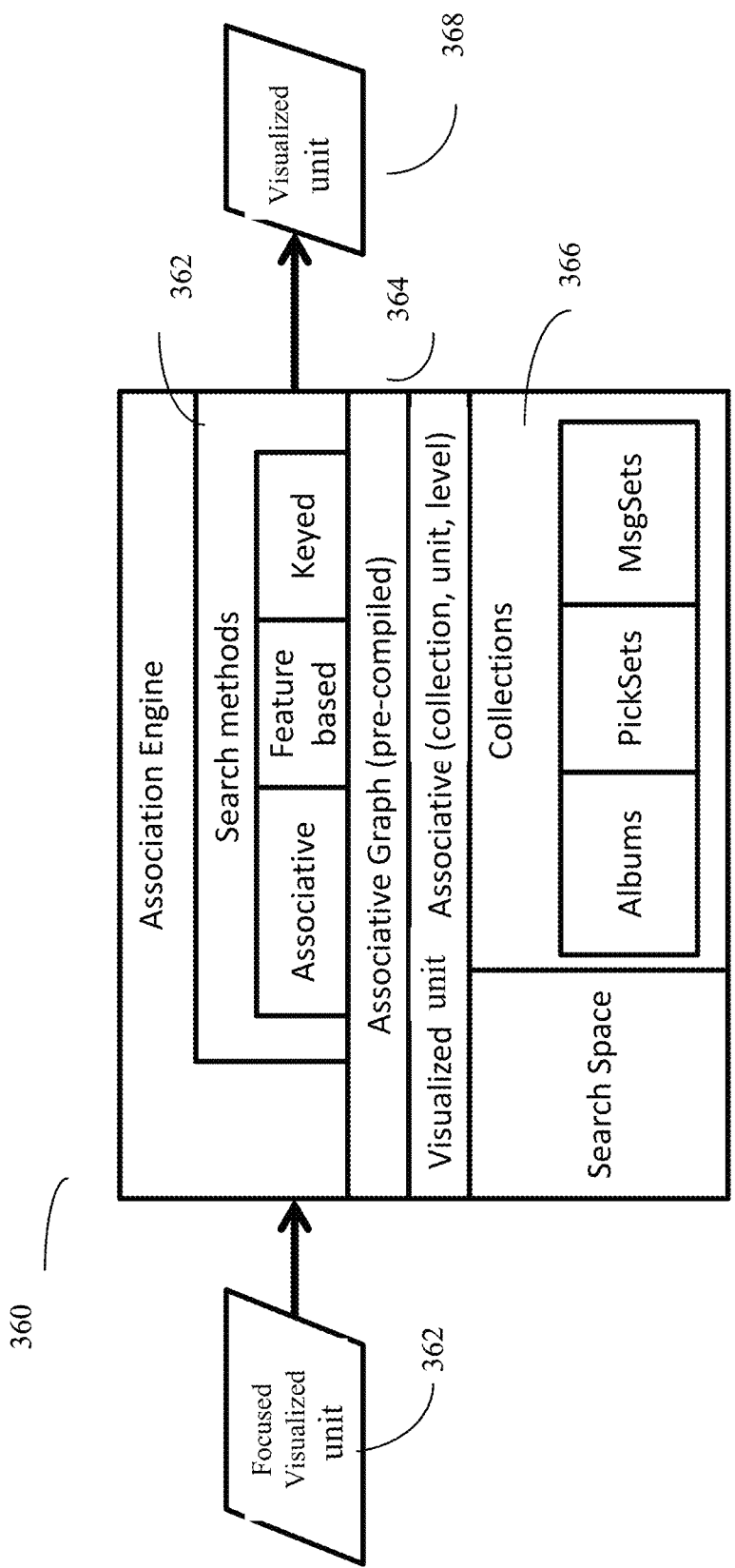
FIG. 19 is a block diagram of an emergent associative engine.

Referring now to FIG. 19, an emergent association engine 360 is shown. The emergent association engine 360 can narrow a play space, expand the play space or shift the play space. The emergent association engine 360 can find visualized units as part of an expansion of the current play space when a focus-mode is in-place and visualized units are added during play or a focus-mode is in zoom and found visualized units are selected and inserted into the current play space 362. The emergent association engine can shift the play space because found sets include other visualized units. The emergent association engine 360 uses search methods 362 based on associative, feature based and keyed processing a pre-complied graph 364 and operates 366 on visualized units in a search space using collections that can include albums, pick sets message sets, etc. to find visualized units.

Figure 20:
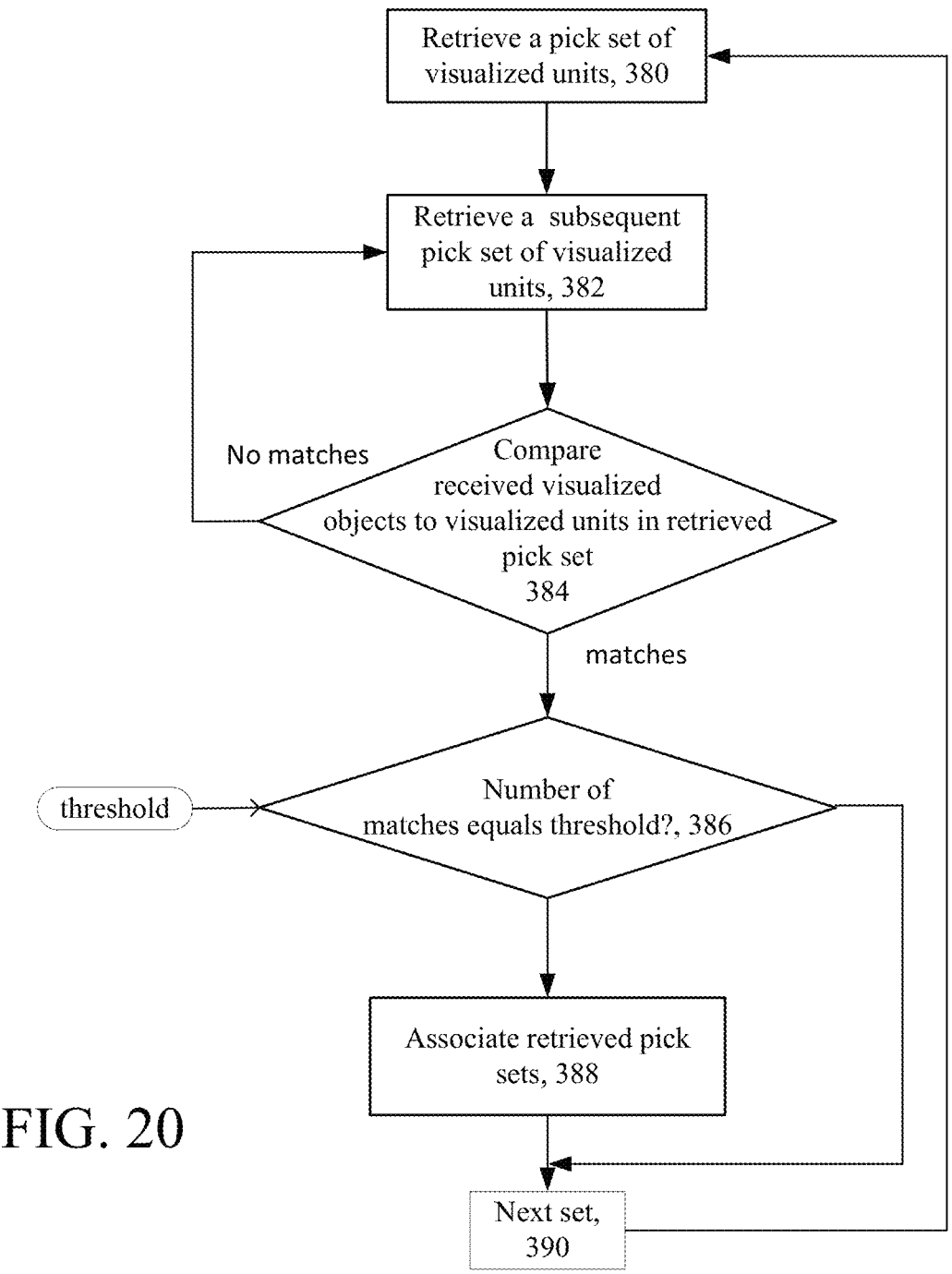
FIG. 20 is a flow chart of emergent associative processing.

Referring now to FIG. 20, emergent association processing includes at least two different types of "emergent associations." A first type of emergent association involves picking and a second type of emergent association involves situational interactions (discussed below).

Pick based emergent association processing produces new collections of visualized units from related information or visualized units interactively by picking or messaging, etc. Pick based emergent association includes the device forming ad hoc picked sets based on receiving from users picked visualized units. These ad hoc picked sets can be named by a user or unnamed by a user and which the device will provide a name, as shown in the user interface.

Emergent association processing retrieves a pick set 380 and a subsequent pick set 382 examines 384 various stored pick sets for common membership of visualized units in the pick sets, possible according to a threshold 386 and finding such common memberships among picked sets, forms 388 respective emergent associations among those picked sets and retrieves a next set 390. The associated picked sets can be displayed visually. Different levels of emergent associations can be provided. The sets used can span one user, or sets belonging to friends or other groupings, or public sets.

Selection, focus, picking is designating interest. This can occur in various interactive ways. Emergent associations are searchable connections in collections without keyword or attributive tagging. Conventional searching uses an attribute-field to search on. For example, finding all products for a party, with an attribute field, or searching in a general keyword-tag field for "party." This, however, requires "tagging" records with keywords. In the real world use of tagging techniques requires among other things a high degree of vocabulary consistency. Emergent pick set based associations use sets to determine commonality. Furthermore, the sets are produced as a side-effect of user interactions. Examples of set based associations are discussed below for situational and situational plus pick based emergent sets.

Figure 21:
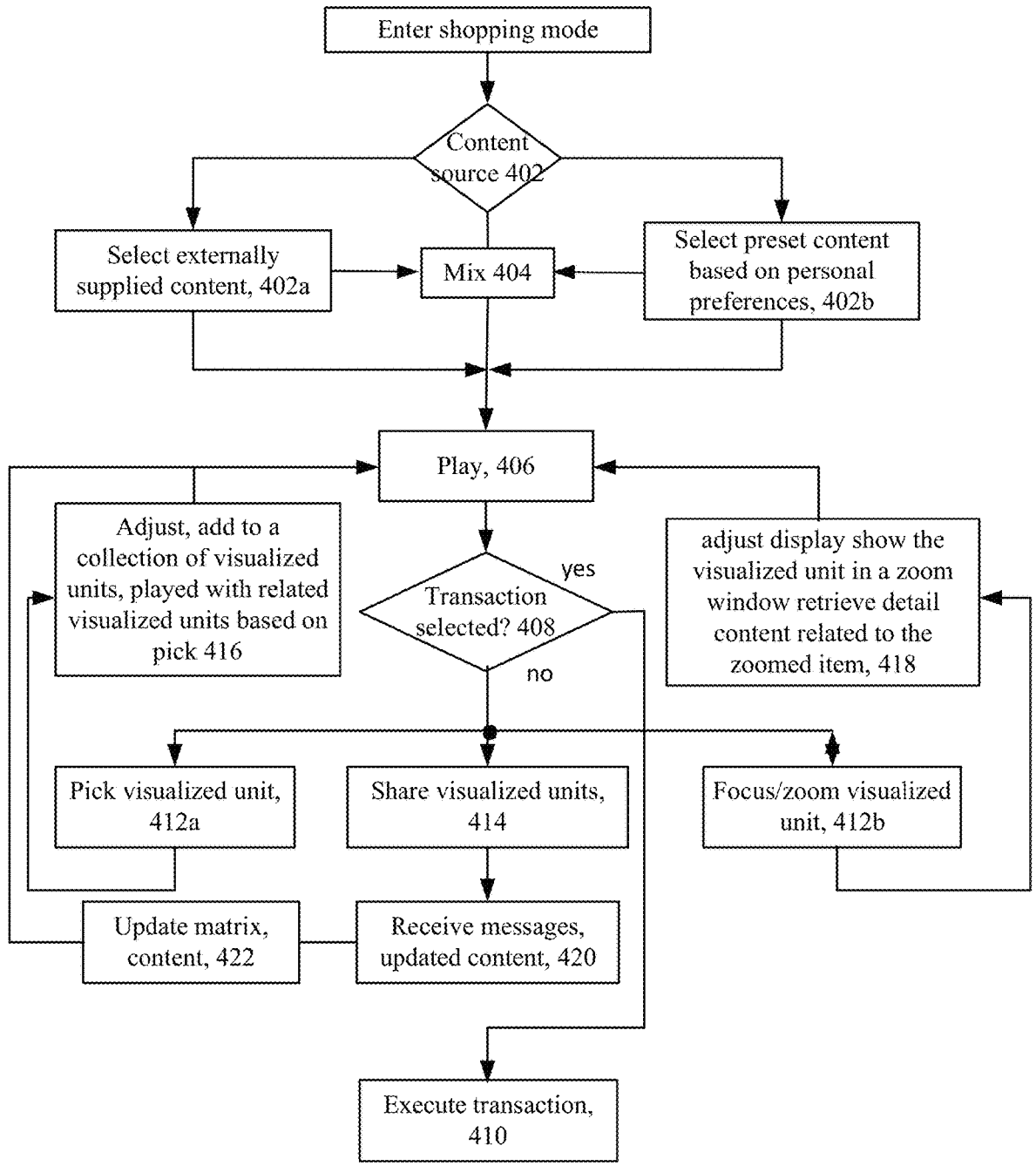
FIG. 21 is a flow chart of a shopping scenario mode.

Referring now to FIG. 21, a shopping scenario 400 is shown. The shopping scenario 400 is an example of a complex scenario that interactively uses several of the modes described above. A user enters a shopping mode. A content source preference is selected 402. Content source preference selection involves accepting or selecting location-based source detection 402a where the user device receives one or more tables of contents from a variety of sources based on the location of the device. However, if the user only allows personally approved sources (or applies other personal preference to the selection), only those selected sources are received if available 402b. The device applies the mix mode 404 to mix the selected sources of visualized units and plays 406 the selected visualized units. When a transaction is selected 408 the transaction is executed. Otherwise, the user selects visualized units of interest, either by picking 412a or implicitly by zooming 412b. The user could also share 414 visualized units. When picking visualized units 412a the device, adjusts 416 the display and adds the picked visualized unit to a collection of visualized units to configure the device to play the visualized unit with related visualized units based on the pick. The device plays 406 the adjusted collection.

The user can alternatively, enter a focus mode where the visualized units are zoomed into and inspected 412b. The zoomed visualized units might become interesting to the user upon viewing more information. When zooming on a visualized unit the device, adjusts 418 the display by showing the visualized unit in a zoom window, and retrieves detail content related to the zoomed visualized unit.

The user can enter the share mode 414 where a visualized unit (picked or zoomed or merely selected) is shared to others, e.g., in a message, and others can comment, annotate (not shown). As a result of the share mode messages are received 420 with content and the display is updated 422 with the content. Either after a current mode has ended or during the current mode (based on user action) the device returns either to the play mode or selects 408 to perform a transaction involving one or more finally selected visualized units. The device thereafter with a server associated with the original source of the visualized unit(s) that resulted in the finally selected visualized unit(s) executes one or more transactions, buying the one or more visualized units. Alternatively, the foregoing can be processed on server 14, and the server 14 can serve as a conduit for execution of the transaction with the server associated with the original source of the visualized unit(s).

In the pick mode, the user can pick visualized units for later review or even pick visualized units to purchase. Picked visualized units can be used to start a discussion by invoking the share mode. For example, a group of people might pick visualized units of clothing and discuss whether the visualized units match or whether the visualized units are otherwise suitable. Visualized units that are added to the pick collection can be from more than one user, with the entire collection and discussion viewed collectively by all users. Thus, in the shopping scenario, visualized units for sale are viewed, and the device allows users to browse through visualized units of interest. The visualized units can be zoomed in on and interacted with and visualized units can be picked as like "window shopping." The visualized units can be across many stores, vendors, locations, collections, and sources, the visualized units can be visually compared to other visualized units and can be shared with others (friends, family). Visualized units can be collaboratively collected while shopping. Visualized units can be acquired into the device from physical items via photography, id/tag sensing and thus used within the device as ad hoc visualized units.

Figure 22:
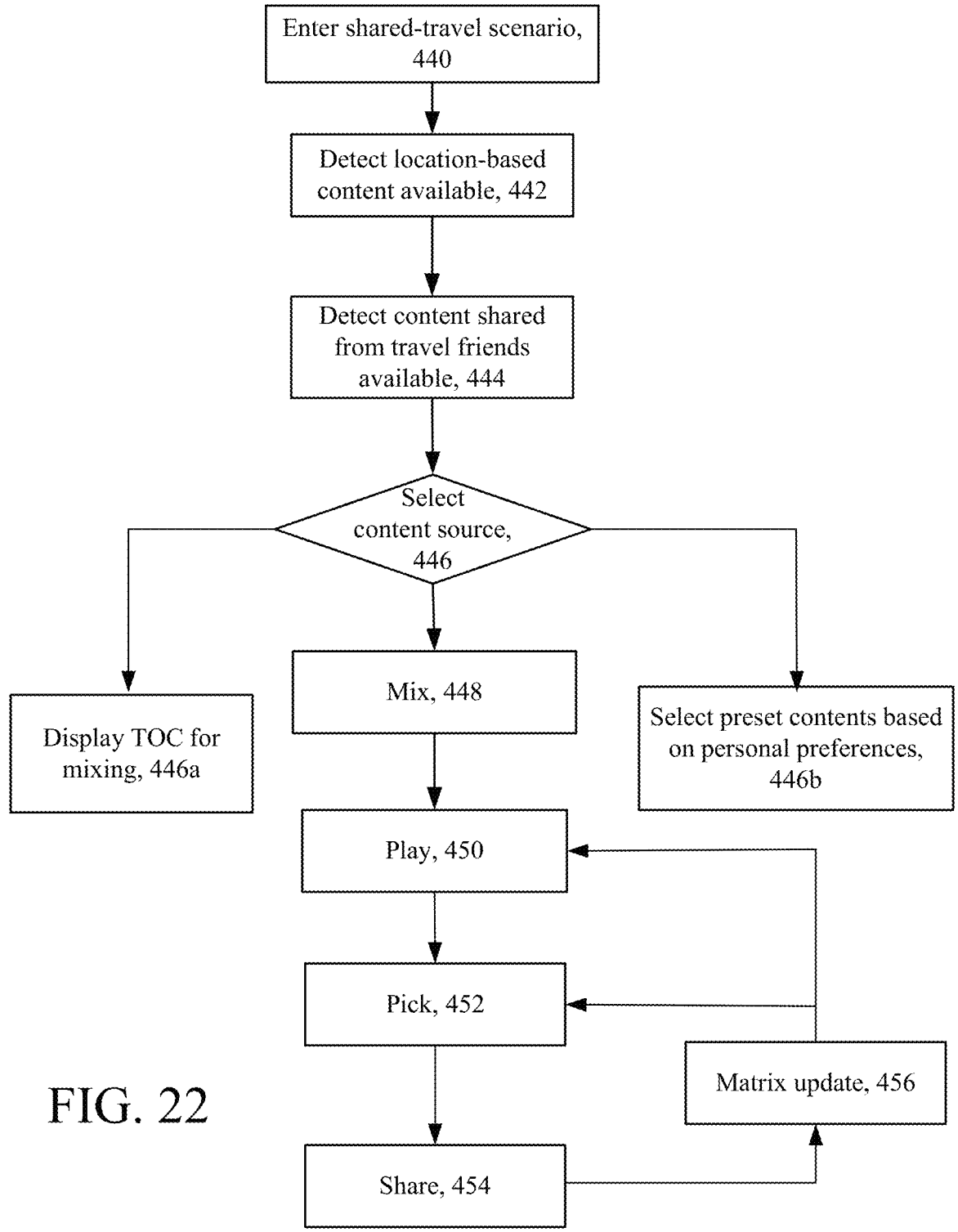
FIG. 22 is a flow chart of a travel scenario mode.

Referring now to FIG. 22, a travel scenario is shown. A user, while traveling for example, enters a travel space or initiates the travel mode 440. The travel mode of FIG. 22 is another example of a complex mode that interactively uses several modes, as described above. In the travel mode, the device detects 442 the presence or availability of location based content. In the travel mode, the device can also detect 444 the presence or availability of shared travel content from friends. A user of the device selects 446 a content source preference. The content source preference is based on a table of contents 446a or a preset content 446b based on personal preferences. The selected selection involves accepting or selecting location-based source detection where the user device receives one or more tables of contents from a variety of sources based on the location of the device. However, if the user only allows personally approved sources (or applies other personal preference to the selection), only those selected sources are received if available. The device applies the mix mode 448 to mix the selected sources of visualized units and plays 450 the selected visualized units. The user selects 452 visualized units of interest, either by picking (or implicitly by zooming). The user could also share 454 visualized units. When picking visualized units the device, updates the matrix 456 by adjusting the display, and adds the picked visualized unit to a collection of visualized units to configure the device to play the visualized unit with related visualized units based on the pick. The device then plays the adjusted collection. The user can also share the adjusted collection with other users.

The user can alternatively, enter a focus mode where the visualized units are zoomed into and inspected. The zoomed visualized units might become interesting to the user upon viewing more information. When zooming on a visualized unit the device, adjusts the display by showing the visualized unit in a zoom window, and retrieves detail content related to the zoomed visualized unit. The user can enter the share mode where a visualized unit (picked or zoomed or merely selected) is shared to others, e.g., in a message, and others can comment, annotate (not shown). As a result of the share mode messages are received with content and the display is updated with the content.

The device updates the matrix to display visualized units according to selections and processing that occurs in each of the modes entered. In the travel scenario/mode a user viewing places, sites, activities, sales specials or other places of interest can produce photo collections on the road, sharing travel collections and institute real-time discussions and visual impressions to collaboratively produce shared experiences that are embodied in the collections of visualized units and annotations associated with the visualized units.

Discussed above are embodiments that rely on visualization, making use human visual ability to see with and without attention but nonetheless with some degree of comprehension through viewing played visualized units. Personalization deals with a user controlling the content of visualized units, the selection and mixing of visualized units, and the appearance of visualized units. Socialization is the extension of one user to interactions with others performing activities together instead of as an individual; sharing information; interacting with others, possibly with roles and groupings.

Personalization of played visualized units is making and transforming visualized units to fit personal preferences. Visualized units need not appear the same for all users.

As described earlier, visualized units can have 'aspects' that allow visualized units to be rendered in different ways. Aspects can therefore be used to specify how people prefer to see particular types of things. In general, preferences and appearances influence interest, interaction, and commerce. Customizing the way visualized units are shown to each person's preferences can therefore have an effect on how people react and interact. Personalization as used herein is different from search-space personalization, which reduces the choice of available search records based on preferences. Visual aspect personalization presents visualized units found (from many sources) in personalized ways, if those visualized units are available.

Personalization of visualized units proceeds by matching preferences to available visualized units aspects, before visualized units are played. If a visualized unit does not have multiple aspects or a matched aspect then the visualized unit is visualized in a default way. If a visualized unit has an aspect that matches preferences, then media for that aspect within the visualized unit is used. A transformation process may occur to process the selected aspect-media for visualization. Image media may not need processing, whereas personalizing an item in 2d or 3d may require image processing, 3d rendering, or combining information to produce an image. For example, seeing shoes from the side may be readily available as an visualized unit aspect, whereas seeing the shoes as worn by a model, or a person's avatar would require a processing step. After a visualized unit is processed and transformed in the personalization step, it continues to be played (as in FIG. 22A).

Figure 22A:
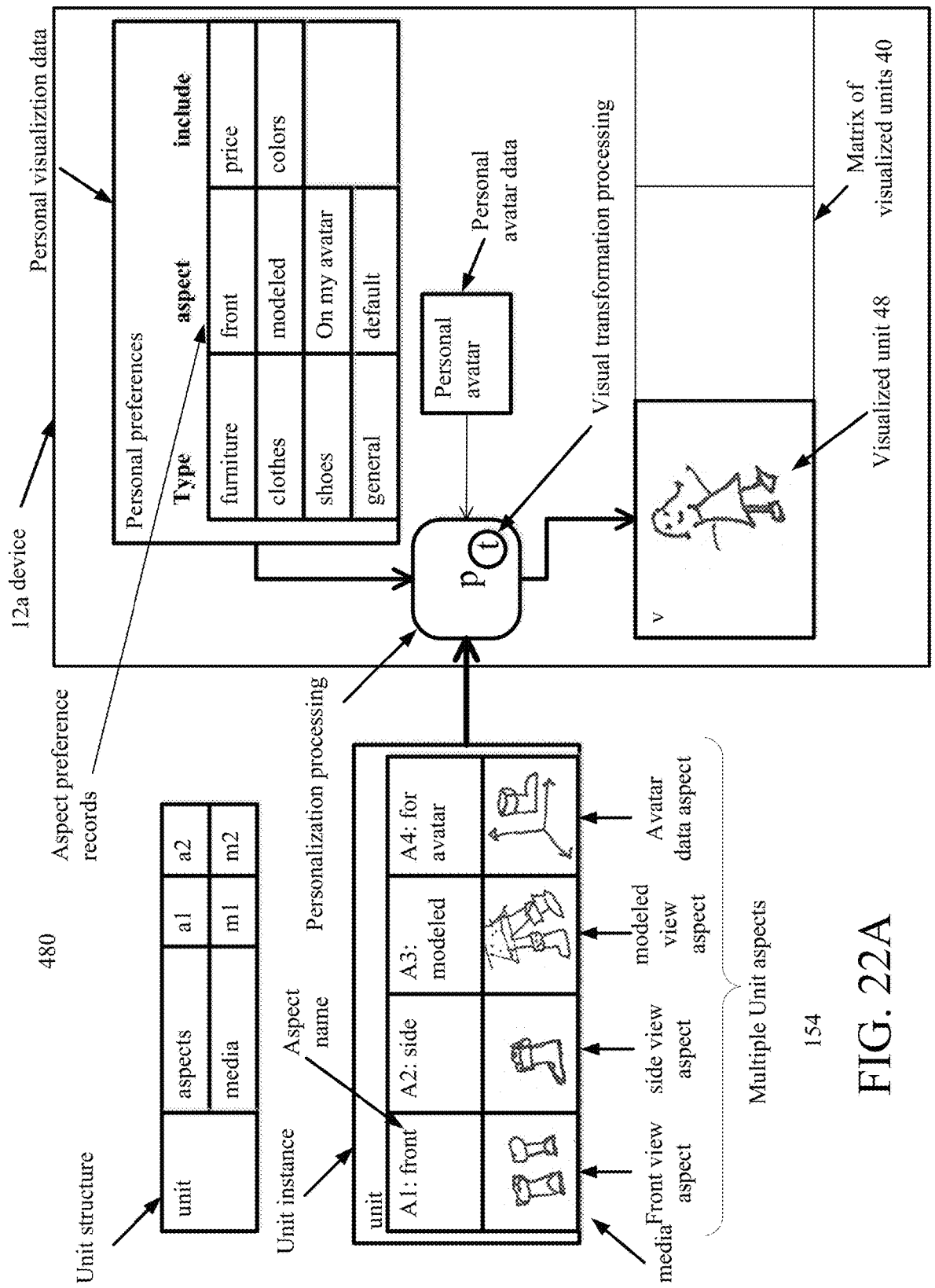
FIGS. 22A, 22B are pictorial representations helpful in understanding personalization.

Referring now to FIG. 22A, an example of use of a visualized unit 154 having multiple aspects 460, with each aspect having a name 462 and media 464 is shown. In this example, the visualized unit is a boot, with aspects 460 for a front view, side view, modeled by a person, and in 3d form for an avatar to model. During mixing and playing, the visualized unit 154 aspects 460 are matched 468 to user preferences. In the example, a user preference record 470 specifies 472 that "shoes" to be shown on the user's avatar. In the processing of the visualized unit, the user's avatar 478, is transformed 479, using the visualized unit aspects for avatars, resulting in the visualized unit shown in a cell of the matrix 40 on the device 12a as worn on an avatar 480.

Figure 22B:
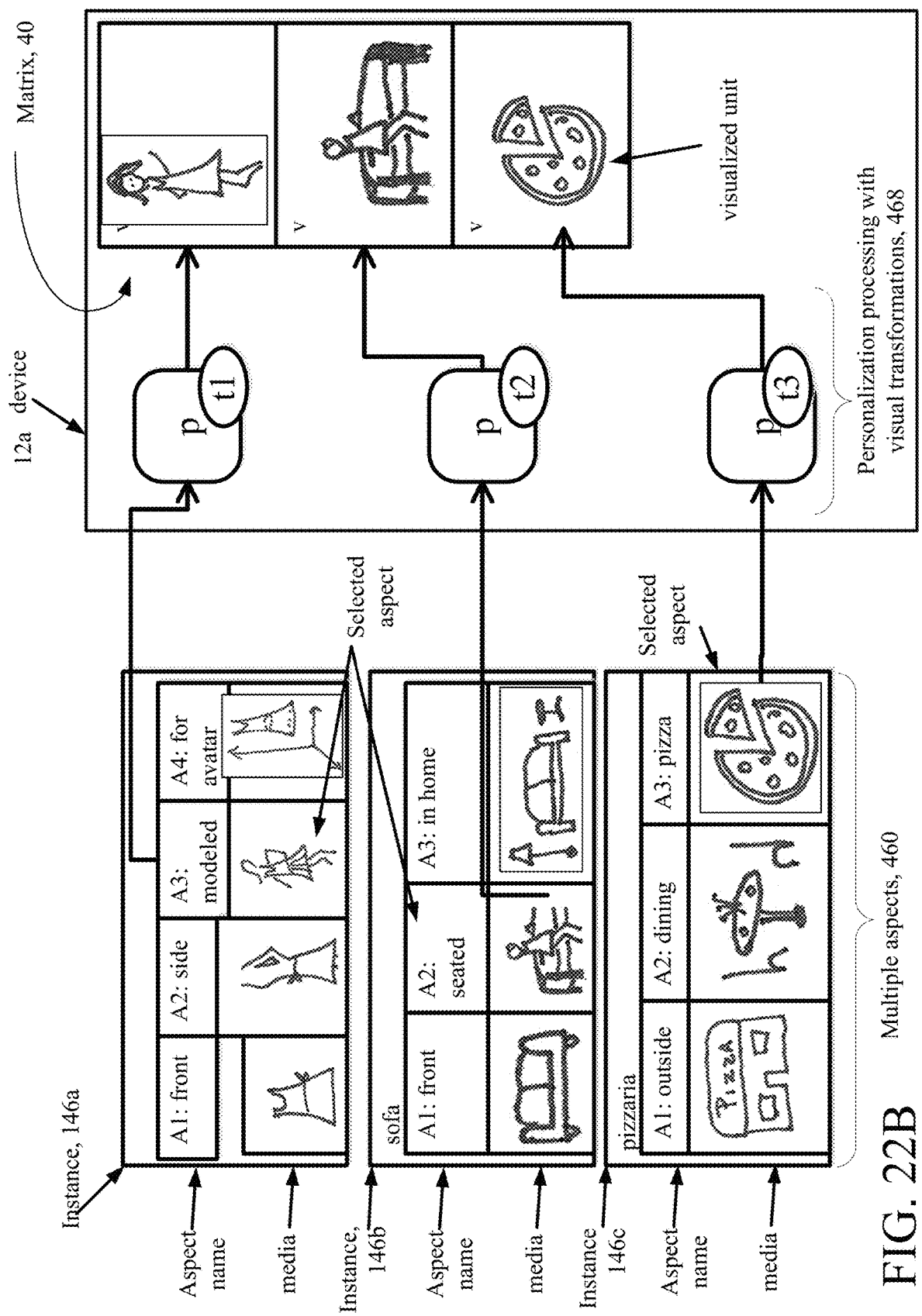

Referring now to FIG. 22B, three (3) visualized unit instances 146a-146c are shown, with each having various aspects 460. the visualized unit has 4 aspects related to a dress item: front, side, modeled, and for an avatar. Sofa item has 3 aspects: front, seated, and shown in a house. Pizzeria has aspects: outside, dining, and a pizza. During personal visualization 468, the visualized units 146a-146c are each personalized via transformations T to produce personal visualizations. In this example, the dress item is represented as a visualized unit and shown on a person's avatar; the sofa item is represented as a visualized unit and is shown with a person seated, and the pizzeria item is represented as a visualized unit and is shown as a pizza. For a different person, the same visualized unit could be rendered differently according to that person's preferences using different visual aspects of the visualized units.

In Table I below the modes (FIG. 3) are represented in columns and rows represent dynamic device activities of visualization, personalization, socialization, situational, and association. Each cell in the table can be interpreted as a simplified generalization for what each activity-mode may lead to. Each cell can be considered independently. Association processing is the determination by the device of implicit relationships among collections of visualized units within the system. Association processing determines connections between users, visualized units, and environment only by the activities that involve them. By making these relationships part of the system, it enhances the user's experience. Situational processing thus is the adaptation of the system to a particular context. Situational processing can either narrow or expand the way in which the user assimilates the visual experience with the real world, either way enlightening perceptions of what is around us.

TABLE I

|  | Adding items A | Mixing B | Playing/ Seeing C | Selecting D | Sharing E | Interacting, Annotating, Messaging F |
|---|---|---|---|---|---|---|
| 1. Visual | Producing/ adding visualized units | Mixing by seeing visualized units displayed | Multi-dimensional visualized units | Selecting by picking seen visualized units | Sharing by picking seen visualized units | Visual-inspired discussions |
| 2. Personal | Adding things as visualized units | Personal mixes | Personalized visualization | Moments captured | User decides what is private | Personal notes |
| 3. Social | Group adding | Social mixes | Group visualization | social picking | Socialized sharing | Group editing |
| 4. Situational | Situational adding | Situational mixing | Situational visualization | Situational selections | Situational socialization | Situational interactions/ discussions |
| 5. Associational | Producing emergent associations among visualized units | Producing emergent associations between collections | EMERGENT visualization | Producing emergent sets | Emergent sets formed by social (shared) sets and content sets | Emergent sets formed by messaging and interacting with item sets |

Figures 23A, 23B:
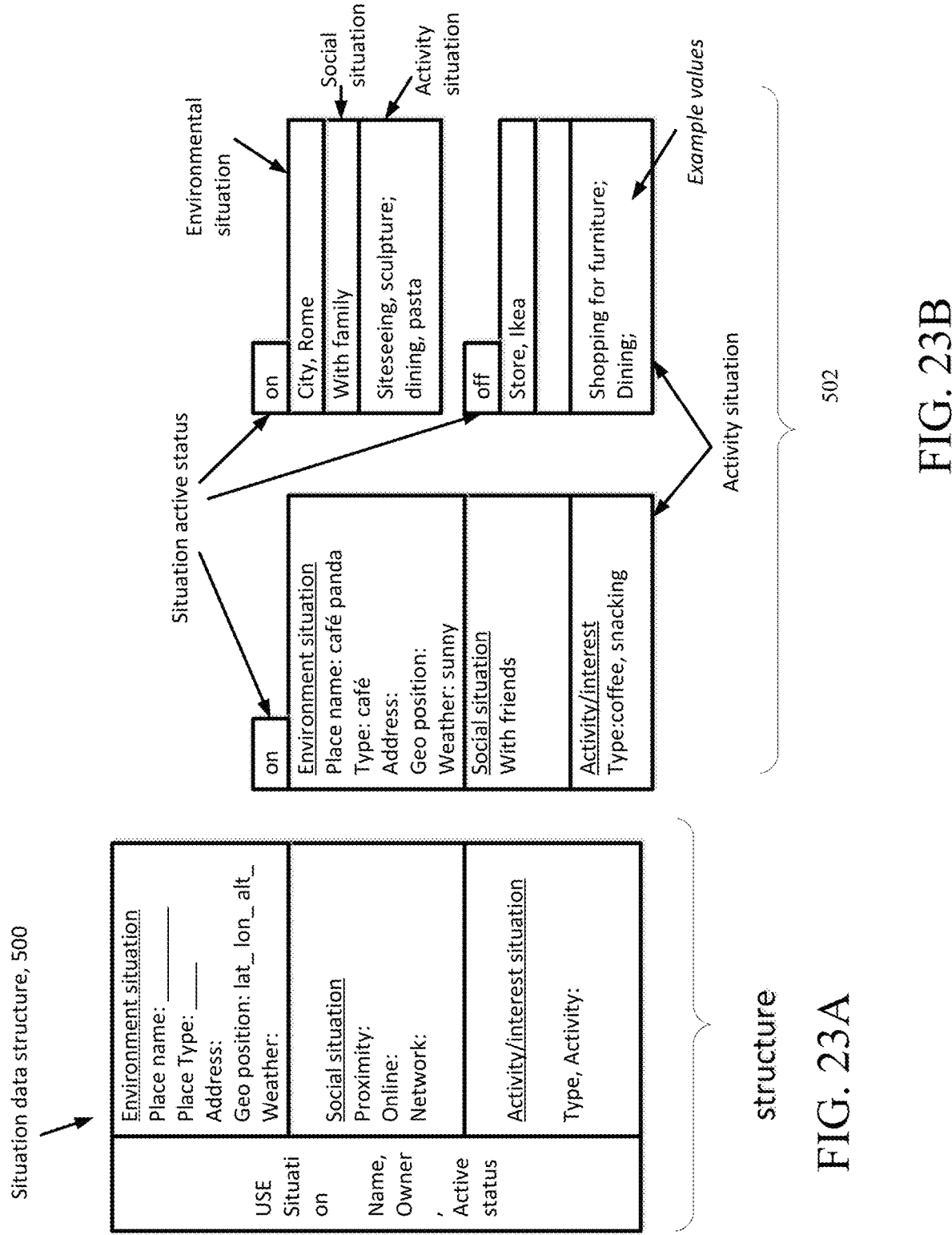
FIGS. 23A-23B are diagrams depicting situational records.

Referring now to FIGS. 23A and 23B, a depiction of situational records is shown. A situational data structure 500 and situational data records 502 are defined by environmental, social, and activity-interest related data. Environmental situations can be the physical place one is in references by name, address, geographic position, or type. Environmental situations can also include climate features such as terrain, (e.g., mountains, seashore) or weather or specific environmental conditions that can be specified and detected. Environment can also be about a virtual place.

Situations also include social aspects delineated as relationships to people or organizations, and can include and/or span social networks. A person can have a non-social network based social data. Inter-relationships between people and organizations can be virtual (online) or physical, in person, and across social networks.

Situations also include activity and interest features that are specified by what a person is doing or is interested in, such as shopping, dining, site-seeing, and so forth. Situations are used to match conditions and trigger actions, such as the acceptance or sharing of information. Activity situations are about what a user is doing, interested in, looking for, etc. This may involve actions in the physical world and virtual world.

In combination, the three areas help define situations that can be articulated, recorded, generalized, compared, shared, and re-encountered. Some situational variables might be general while others are exact. For example, a situational record might express a desire for eating pasta in a place, but not specify a restaurant. Situational records have statuses that can be turned on or turned off.

Figure 24:
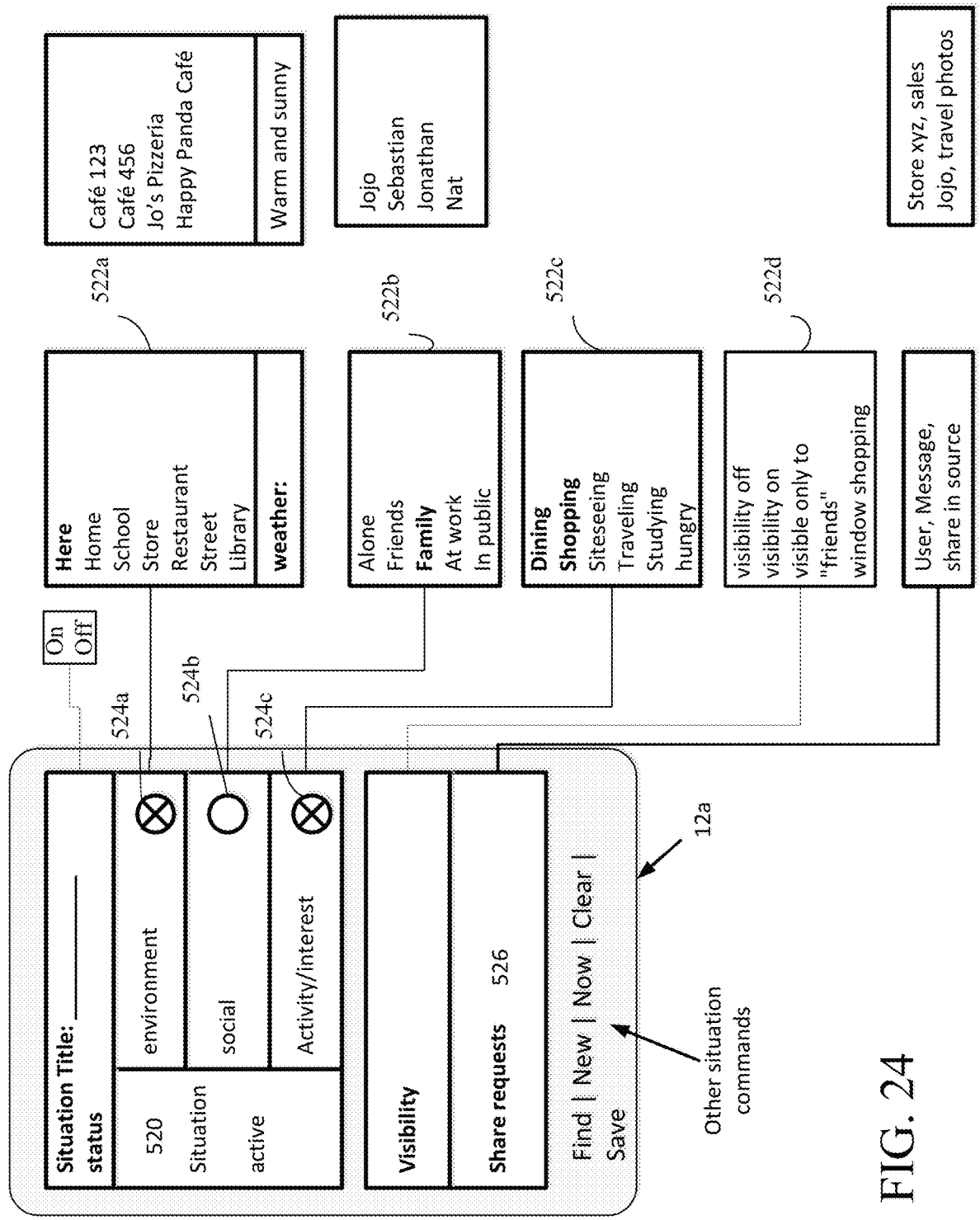
FIG. 24 is a diagram depicting a situational user interface.
Figure 25A:
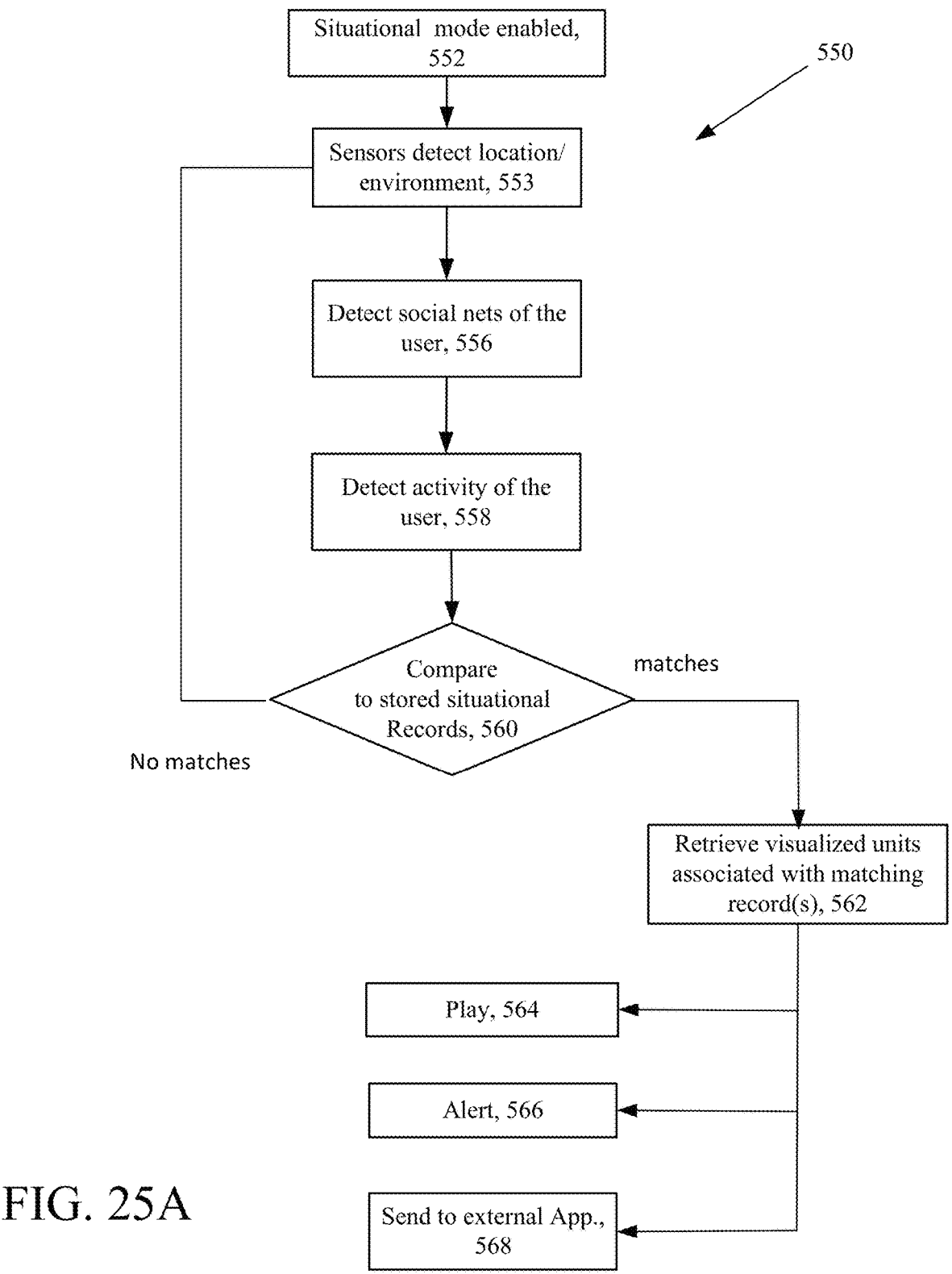
FIG. 25A is a flow chart depicting situational processing.

Referring now to FIG. 24, a user interface 520 for producing and managing situational records is shown. The device 12a produces a situational record from information entered into the user interface. The device 12a also can detect and produce situational records for the user without user intervention. Situations are detected based on conditions on the three situational levels: environmental situation, social situation and activity situation. Fields, e.g., with drop down menus and/or free text area are provided for environmental situation 522a, social situation 522b, and activity situation 522c. Saved situational records can be edited, generalized, re-used and shared. The user interface 520 is used with the processing shown in FIGS. 25A-25C. The user enters relevant environmental, social, and activity-interest related information into the user interface 520 and that information is stored in records. The records are stored on computer storage. The records are identified by either the user or the system. The user through the user interface sets a visibility parameter 522d that governs how the situational record is shared. For example, the visibility parameter can have a number of values, such as completely visible, visible only to "friends" visible for external detection without identification (window shopping), visibility off and so forth. Visibility of the user visible for external detection without identification is a situational form of 'window shopping' where the user is not identifiable and has limited interaction by choice.

The user interface 520 includes fields 524a-524c respectively that turn the corresponding situation areas on/off, e.g., environmental situation, social situation, and activity/interest situation. The user interface 520 also includes a region 526 that shows other users attempting to communicate with the user based on an active situation. The records are identified by either the user or the system. In some embodiments, the records are produced by the system. Other situational commands 528 include controls to "find" a situational record that would involve the device searching by name and/or attributes, "new" to produce a situational record (example shown in FIG. 24), "now" that when selected causes the device to find a situational record based on the current situation, clear which clears the record that is currently displayed and save which saves a new record or changes to an existing record.

Situational processing uses sensory conditions for detecting its environment, access to social information (across multiple social networks), and activities. Exemplary sensors include global positioning sensors, temperature sensors, visual item recognition, facial recognition, RFID sensors, sensors at other wavelengths, and so forth. Situational processing stores and uses situational records (FIG. 25B), and its output is the detection of matches of selected situations or sub-conditions thereof. Situational processing control inputs designates what information should be detected, what situational variables should be used, what to search (FIG. 25C).

Figure 25B:
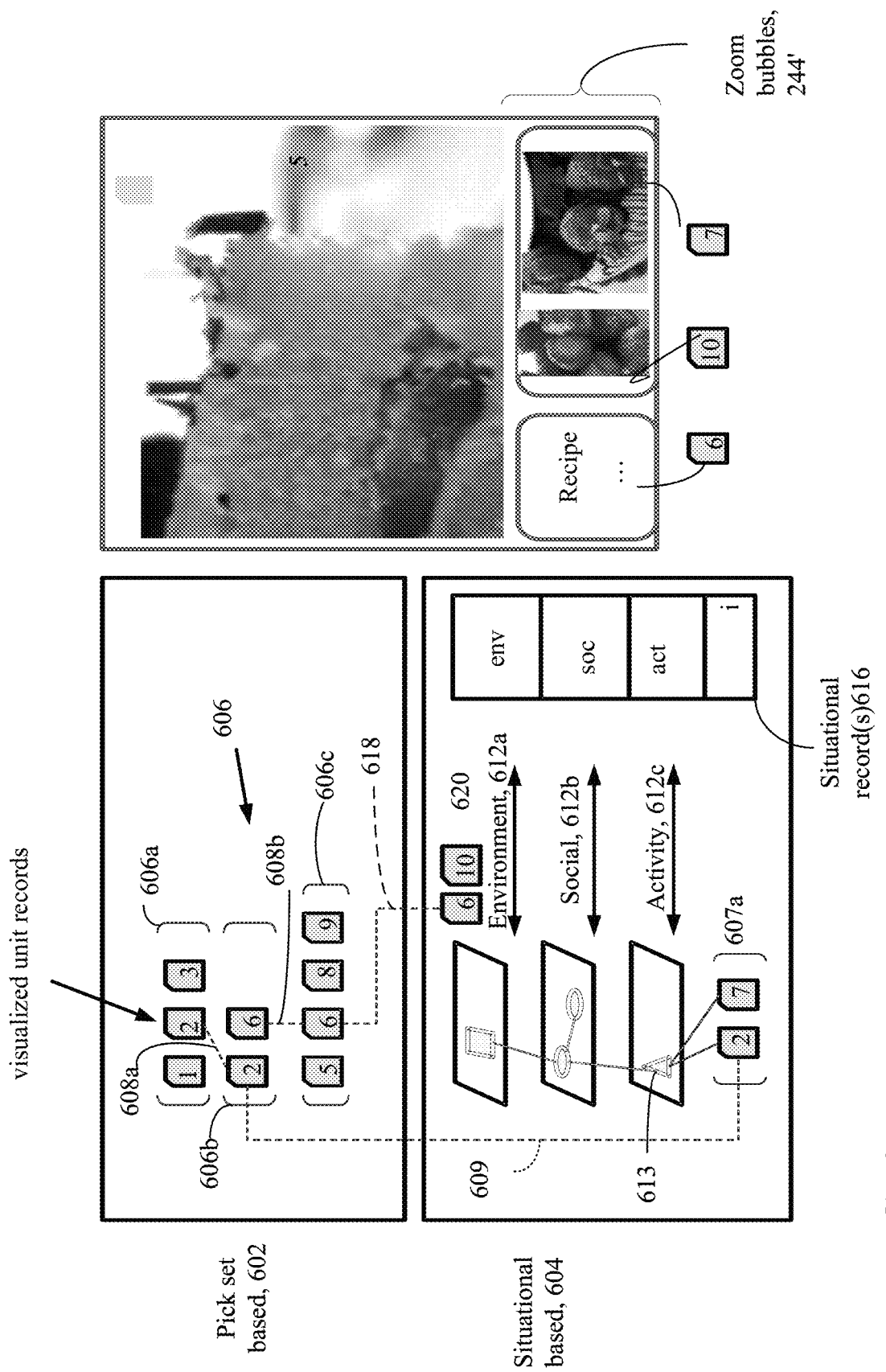
FIGS. 25B and 25C are pictorial representations helpful in understanding situational processing.
Figure 25C:
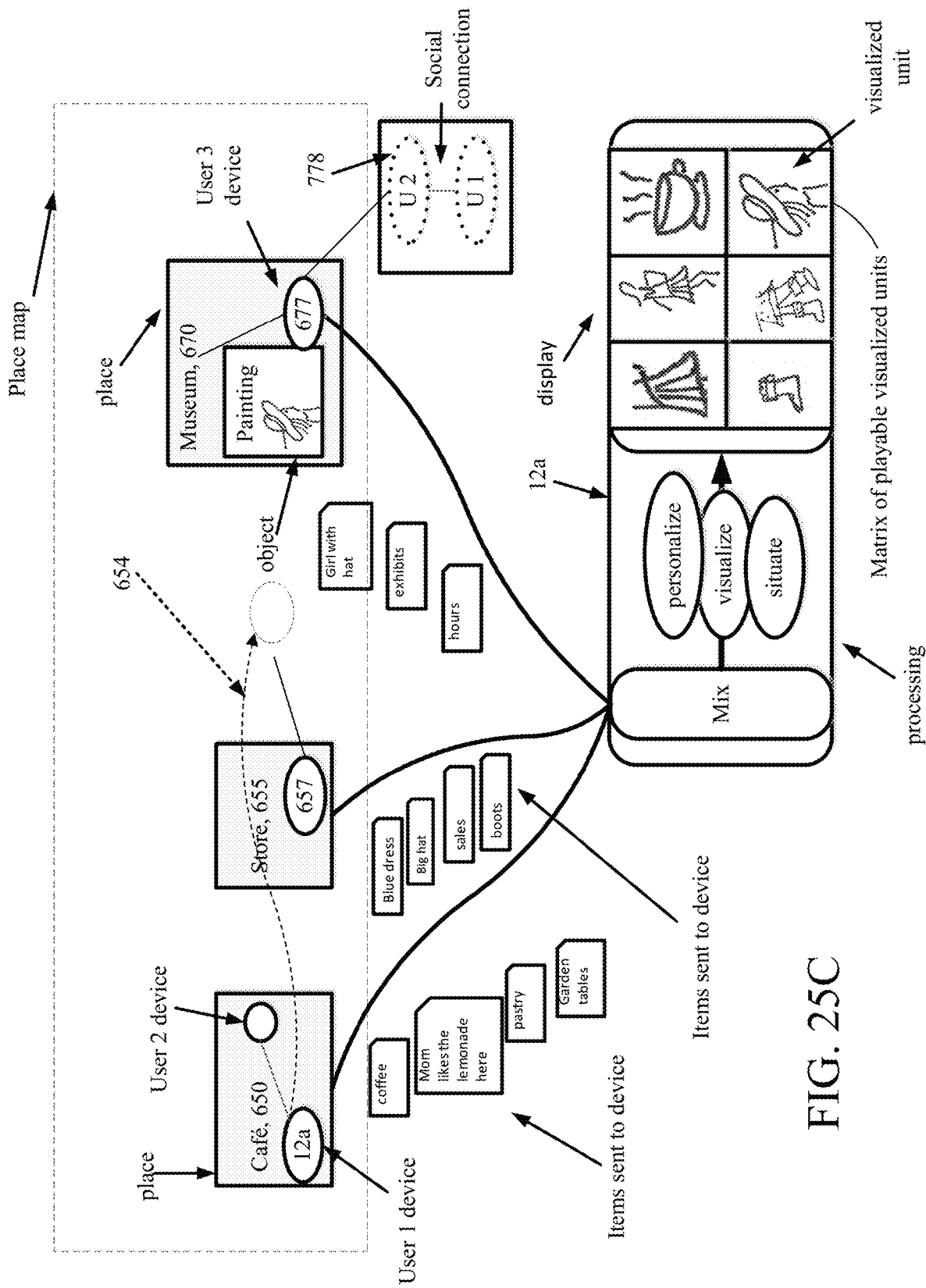

Referring now to FIG. 25B, a process 550 executed by a situational engine for using situational records is shown. The user through the user interface sets 552 the situation mode to "enabled." The system detects 553 through sensors current the location and environment of the user. The system detects 556 the social nets of the user and detects 558 a present activity of the user. The system determines 560 whether there are any matches of the current environment/social/activity of the user to stored situational records. The system retrieves 562 any stored, matching situation record (s) and content (such as visual items) associated with the matching situation record(s) for either playback 564 on the player or alerting 566 or for sending 568 to an external application. For sending to an external application the matching situation record(s) and content associated with the matching situation record(s) would need to have appropriate visibility parameter settings that allow the records to be "visible" or "visible only to friends" or "visible for external detection without identification." After searching all stored records and finding no matching situational records the device could prompt the user to produce a record or could automatically produce a record (not shown).

Situation data in addition to be saved, can be collected, edited, and shared with others. Situation data is generalized so that it can be re-used under different conditions. For example, in a travel situation, such as finding a hotel a situational record can be used or made in one city (a place), and then generalized to be used in any city. Situations can be shared from one person to another; allowing situations encountered by one person to be reused (or redeployed) by another person.

Thus, the situation engine takes inputs, via sensors, for environmental situations, social situations, and activity situation, and compares current sensed situation with prior, stored situational records. Each stored situational record also has subparts for environmental situations, social situations, and activity situations. Situational records also can contain collections of visualized units that are either stored or retrieved dynamically. If a match of current conditions with situations is found, then the results are acted upon. The action could be to retrieve some visualized units and play the visualized units on the user device, or alert the user of a match, or send the information to an external application for further handling.

Referring now to FIG. 25B emergent associations are connections between visualized units that emerge or are found within a context and provide expanded related information. Emergent associations are found through pathways such as pick sets 602 and situations 604 as defined above. These are two distinct pathways and mechanisms, but a search can cross over from one to the other. Both pick sets 602 and situations 604 are the stored information products of user interactions with the user engaged in an activity, e.g., picking visualized units of interest into sets and interacting in a place, with people, on an activity. Metrics can be used to determine the relevance of connections. Emergent associations expand the visualized units in use by finding related visualized units without direct prompting, but based on current user interactions.

Emergent associations can be produced via picking 602 or situational 604 interactions for example. Associations are related information (as visualized units). The process is "emergent" because new information, e.g., associations among visualized units are formed and found interactively through picking, messaging, etc., and in activities that are situational instances. These associations emerge through user activity, rather than "tagging."

Pick set based emergent associations arise from users picking visualized units into picked sets generally 606. Such sets 606 can be named or unnamed. Common membership in picked sets 606 leads to associations between such sets 606. Such associated sets can be displayed on the device 12*a*, as shown in FIG. 25C in zoom bubbles in the zoom mode. Different levels of associations can be used. The sets used can span one user, friends, or other groupings, or public sets. Thus in sets 606*a* to 606*c*, visualized unit 2 is common to sets 606*a* and 606*b* and visualized unit 6 is common to sets 606*b* and 606*c* thus two associations 608*a* and 608*b* are formed, e.g. connections.

Whereas, tagging is an explicit labeling of an item by characterizing properties, expressed explicitly by words, emergent associations do not require user or system word-based characterizations (tag explicit). Rather, associations are by set-collectivity, both direct and indirect. Picking results in pick sets—collections of picked visualized units. Picked visualized units can be mixed with other visualized units (as discussed above) directly or from other sources (i.e., pick sets do not have to be purely picked). Commonality of visualized units among sets is used to form connections between such sets.

Set associative logic can apply to find sets that are indirectly connected, separated by some number of levels. Set associativity can span users. A user can have pick sets with visualized units associated with other user picks.

In situational based emergent association, the three areas environmental situation 610*a*, social situation 612*b*, and activity situation 612*c* are used to link visualized units with collections of visualized units. Thus emergent associations can come from either picks and/or situations.

Continuing with the example, visualized unit #2 in collection 606*b* is also in collection 607*a* that is connected 609 to the situation, via an activity element 613. Visualized unit #6 is connected to the situation via a place collection 620. The result is that visualized unit #2 is associated with visualized units #6, 10, and 7. Visualized unit #2 is connected to 6 via collections 606*b* and 606*c* and is connected to 10 via the collection.

As also shown, a user focusing on visualized unit #2 in zoom mode has the graphic of an item represented by the visualized unit depicted along with zoom bubbles 244' showing a recipe visualized unit 6, and another representation of visualized units, representing visualized units 6, 10, 7. Pick-sets and situational information can be used separately or together to find related information.

Referring now to FIG. 25C, a user receives visualized units into a mobile device 12*a* based on chosen source input and situations. The device 12*a* cycles through and displays information on a display of the device without user interaction. As the user encounters new situations, e.g., physical, virtual, social, and activity, new visualized units are fed to the user's device 12*a*. The device 12*a* mixes visualizes items and optionally personalizes the visualized units based on situational data.

A user with a user device (e.g., 12*a*) inside a cafe 650 communicates with a second user with a second device e.g., 12*b* inside the cafe, and receives a collection of visualized units on, e.g., things to eat, drink and seating in the cafe; augmenting the experience of physically being in the cafe 650. The visualized units can be general or custom. The user with device 12*a* travels 654 past a store 655 and a system 657 in the store transmits visualized units or items that are converted into visualized units on clothes and sales for example. The device converts the items and plays the visualized units and may personalize the visualized units for display.

For example, the "boots" item is a visualized unit and using the visualized unit's visual aspects and user preferences the visualized unit is transformed to render the item "boots" worn by the person. The user can be 'window shopping' and receives information about visualized units without engaging in "visible" contact with the system 657. By visible contact is meant that the user receives information but the system either does not know the identity of the user or user device or even that the information was received.

User 1 also receives visualized units from a friend user 3, who is in a museum 670. The friend sends visualized units 51*c* (visualized units or items that are converted into visualized units) on exhibits and makes a new visualized unit "girl with hat" 50*i*, by taking a photo of a painting 21 item, and producing an visualized unit. The user 3 is connected to the user 1 via an online connection 778 on a social dimension.

Situation data can be saved, collected, edited, and shared with others. Situation data can be generalized so that it can be used again in more conditions. For example, a travel situation, such as finding a hotel, can be first used or made in one city (a place), and then be generalized to be used in any city. Situations can be shared or given from one person to another person via a social situation connection, allowing situations encountered by one person to be reused (or redeployed) by another person.

Figure 26:
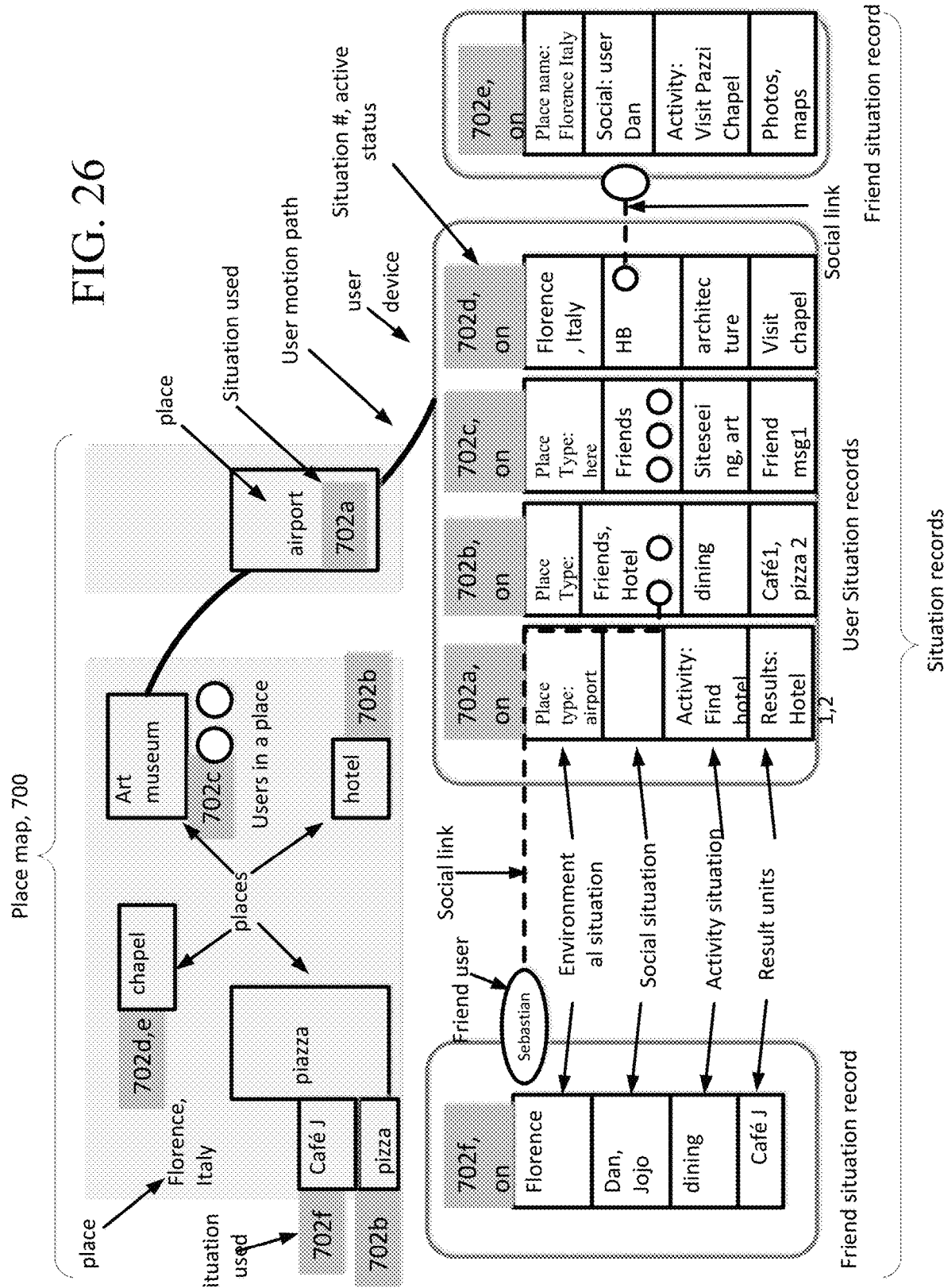
FIG. 26 is a diagram depicting situational records and a place map.

Referring now to FIG. 26, a person "User 5" has a collection of situations stored in device 12*a*. In FIG. 26 there is a place map 700 of places, including here a country Italy a city Florence and specific places within that city, namely a café, a pizzeria restaurant within a piazza, a chapel, a hotel and an art museum. Another place here outside of the city is an airport.

The user has several activated situational records 702*a*-702*f*. Situational records 702*a*-702*d* are stored on the user's device whereas situational records 702*e* and 702*f* are provided by, e.g., friends as discussed below.

Situation record 702*a* is activated when a user arrives at the airport. Within the situation record 702*a*, the environment is the airport, the social situation is a connection with a web or search service to find a hotel. The activity is to find a hotel. The result is stored in situational record 702*a* as result visualized units "Hotel 1, 2" that are either from a past activation of this situation, or new visualized units found, such as via the social connection. The social connection could also be to ask a friend.

At the hotel, the situation record 702*b* is activated to receive visualized units about local places to eat, from the hotel and from a knowledgeable friend. The hotel might send information about a local pizzeria, while the friend's device (not shown), sends information about a café via a previous situation.

The user might also receive visualized units about friends who are somewhere in the city. The location "here" (situation #3) generalizes the locale to wherever the person and device are physically located. Situation record #3 activates in location "here", for friends who are site-seeing or in an art related activity. Visualized units are received either from these friends or from where they are. Results are received either from these friends' devices or from places where the friends are located. These results could involve various items from indication of presence in area or situational records to messages from the friends in the area. In the situation #4, the social dimension is navigated to a friend that shares a situation: "if you are in Florence, visit the Pazzi Chapel". This is an example of an 'emergent situation'—one that comes out of a situation, of being in a place: Florence, having a social situation and having a situation involving User 1 in that place, and an activity. Furthermore, the situation (702e) supplies visualized units or items which could be photos or maps that are converted to visualized units.

Figure 27:
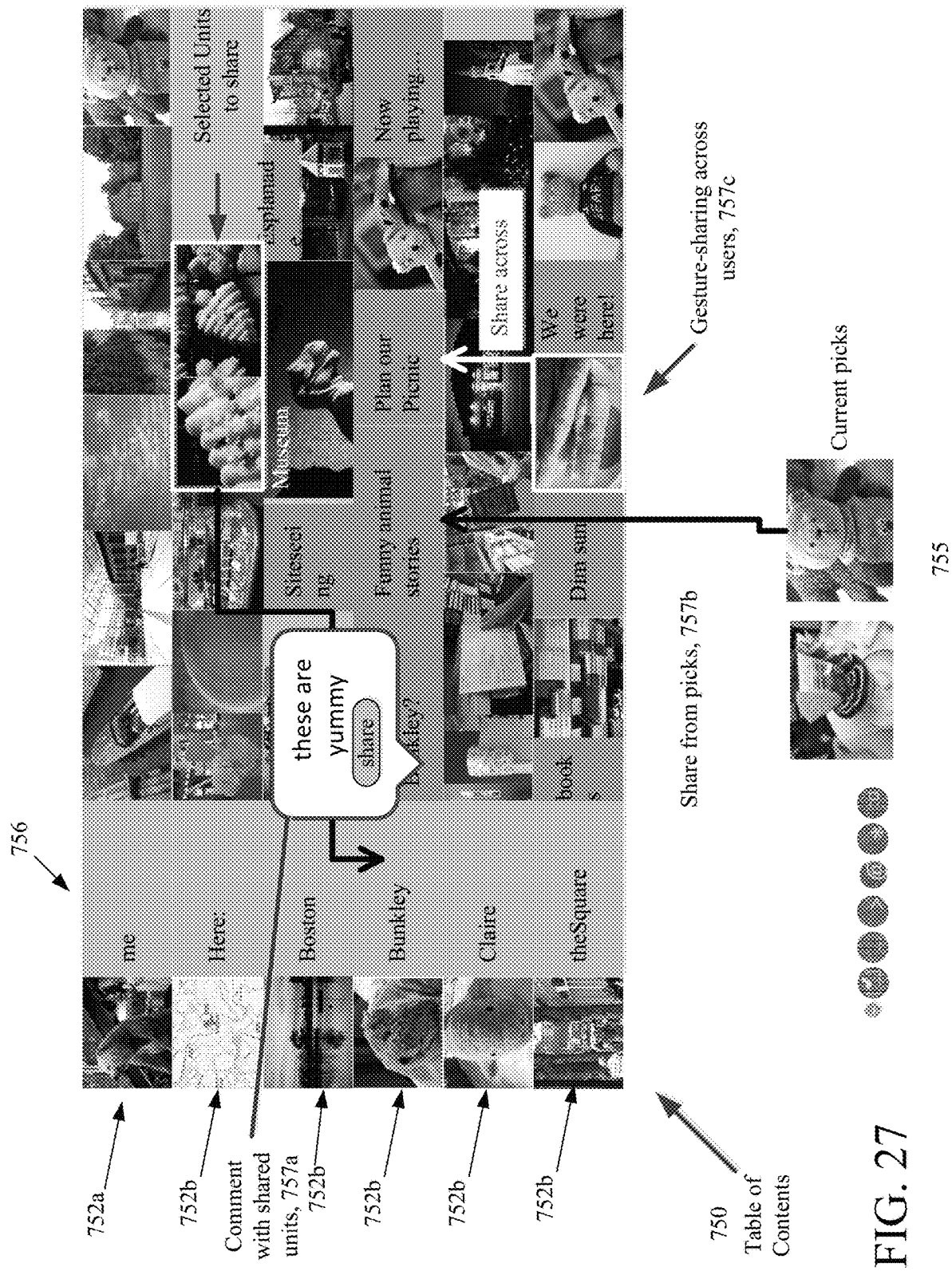
FIG. 27 is a screenshot of a user interface for situational processing.
Figure 31:
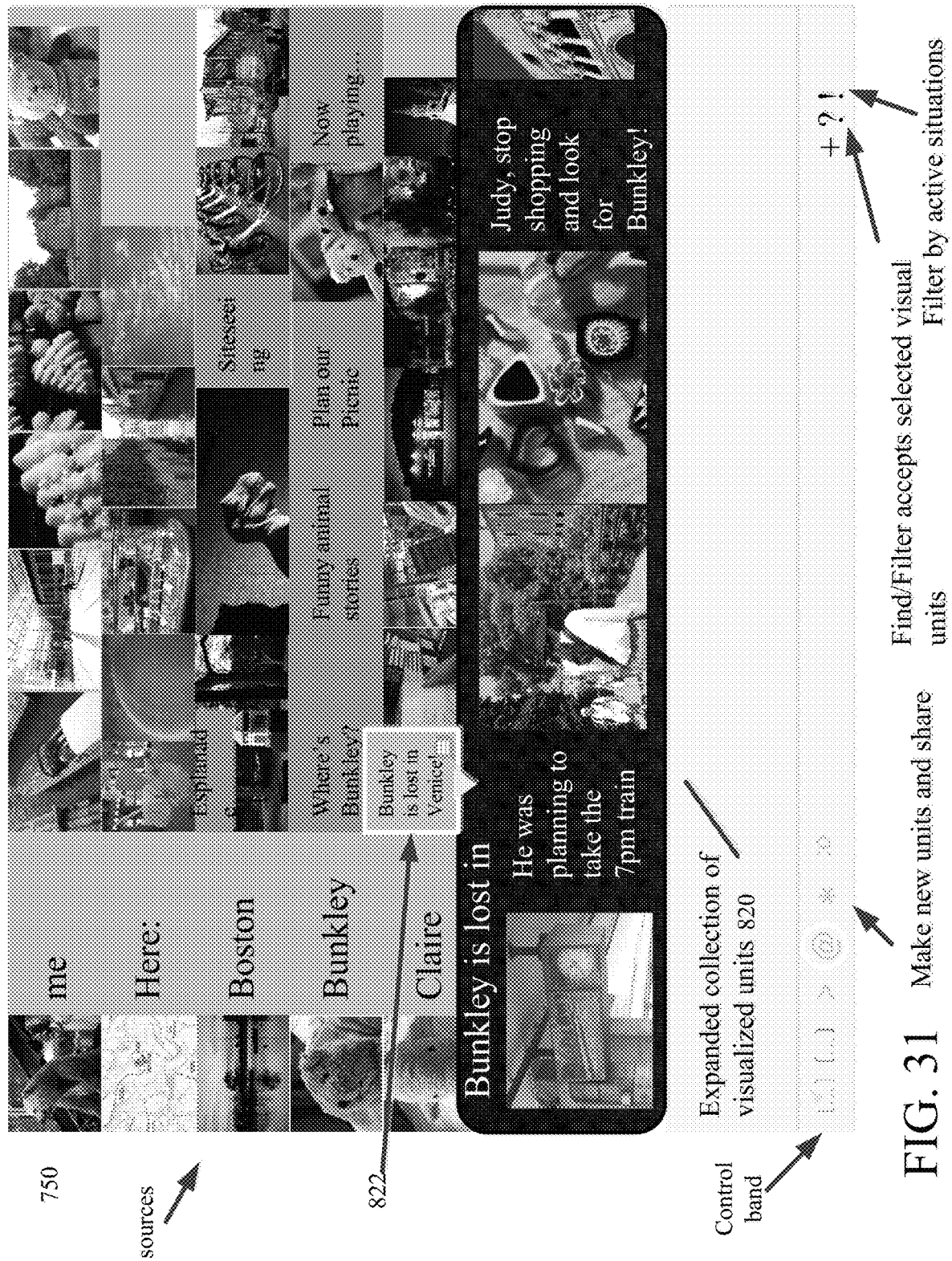
FIGS. 31-33 are screenshots of user interfaces of visualized units arranged according to an attribute of the visualized units.

Referring now to FIG. 27 a welcome screen or a table of contents (TOC) screen interface 750 is shown. The interface 750 provides a graphical "sharing switchboard" that supports different types of gesture-based sharing in a unified visual interactive interface, while also providing support for viewing all visualized units and collections on a user's device through the interface. FIG. 27 will be referred to hereinafter as a table of contents. The table of contents interface 750 is configured for a full-size display, but could alternatively be configured for a small display that would accompany a hand-held device, as shown in FIG. 31.

The table of contents interface 750 is rendered on a display device of a particular user, and shows that particular user's different visualized units and collection(s) of visualized units according to some parameters or attributes. The table of contents interface 750 is arranged as a matrix (as in FIG. 2) and depicts that particular user's visualized units as well as other visualized units from other sources of visualized units that were shared by other users, such as from friends of the user. Visualized units within cells can change (as in play mode) or can be static.

To show more items, the whole page can scroll vertically and horizontally while maintaining the border "headers" for user sources. Alternatively, individual rows can scroll to see more across the display to see more visualized units or collections that are categorized according to the particular row. The display can show visualized units or collections and/or text. In this embodiment, each row is from a particular source. That is, each row corresponds to a source such as a friend or from a store or other user source. A source can also be a place, including the relative location attribute 'here'.

One row-source can contain multiple collections, which can be expanded. Row 752a is the collections and units of the particular user of the device, row 752b is a collection of visualized units pertaining to a "current" location of the device, row 752c is a collection of visualized units named "Boston," row 752d is a collection of visualized units from a friend named "Bunkley," and row 752e is a collection of visualized units from a friend named "Claire." Row 752f is a collection of visualized units named "theSquare" corresponding to a particular shopping location.

The TOC interface 750 also includes a pick bar 755, similar as discussed above. The TOC interface includes a heading column 756 that typically is fixed during display and labels the rows of collections and visualized units based on ownership, place, etc.

Other arrangements and configurations of the contents interface 750 are possible and the particulars of the configuration are based on the content that the particular user has stored on the device. In this implementation, as illustrated, the first row 752a labeled "me" is the user of the device that displays the table of contents, e.g., from that user's account. Users can have accounts that allow them to store information, have privilege-based relations between users, and share information. Accounts can also link and use information on external accounts and systems. Also illustrated are various actions that can occur on the TOC interface 750 including a comment with shared units 757a, share from picks 757b and gesture 757c.

Referring now to FIG. 28, a process 760 executed by engine 36 for generating the table of contents interface 750 is shown. Process 760 retrieves 762 personal preferences for display of the TOC. Exemplary personal preferences for display of TOC include the number of rows in the matrix, assignment of rows to matrix, assignment of user row, etc. Process 760 selects 764 visualized units from storage for playback, based on personal preferences for getting next visualized units (discussed earlier) and the personal preferences for display of TOC. Process 760 assign 766 scheduled visualized units to rows and cells according to preferences and retrieve 768 those visualized units scheduled for playback from storage and populates 770 the matrix for display of scheduled visualized units into assigned rows/cells.

Figure 29:
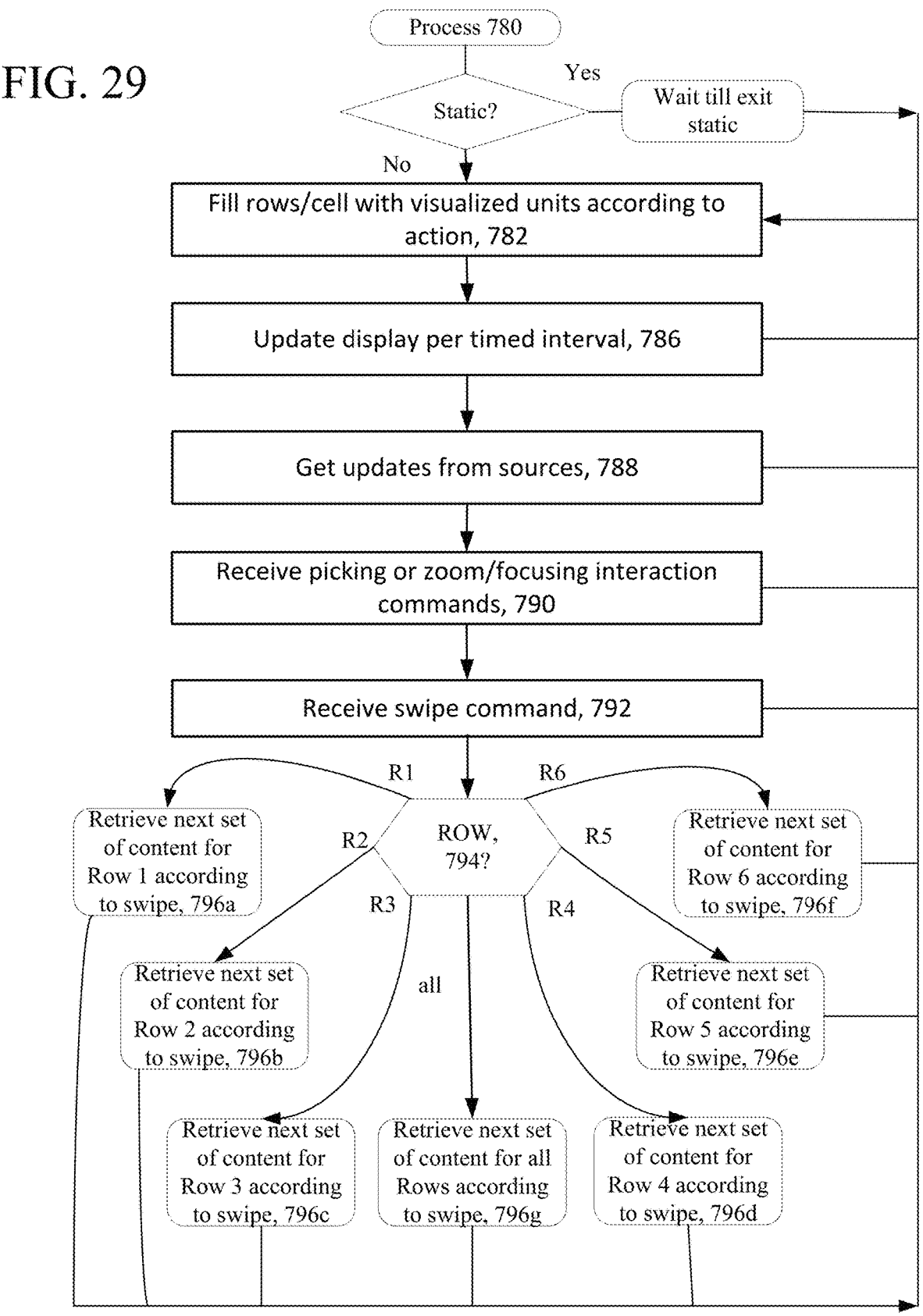

Referring now to FIG. 29, in the play mode 52 (discussed above), the engine 36 executes a management process 780 to manage the table of contents interface 750 according to personal preferences for display of TOC including the number of rows in the matrix, assignment of rows to matrix, assignment of user row, etc. When the management process 780 can have a static mode in which the TOC does not change through asynchronous actions, and the process merely waits for a user action to exit the static mode. The management process 780 also can a non-static mode where it receives asynchronously receive various inputs that can change the table of contents interface 750.

When not in static mode, the management process 780 fills 782 in thumbnail graphics of the visualized units into play cells of the array according to an action. When the management process 780 receives an action the non-static mode, the process 780 updates 786 cell/row assignments of visualized units on a per timed interval basis. The engine 36 can also get 788 updates of visualized units from sources, checks 790 for user requested interactions such as pick or zoom/focusing, and for each retrieved source and adds collections of visualized units to set to play. After any change in visualized units or a user interaction, the play mode 52 returns (denoted by the path) to fill 782 visualized units in the multi-dimensional play cells and updates 786 the display.

The management process 780 also receives 792 user swipe command(s), e.g., a user gesture, typically by swiping a figure across a touch screen (other types of gestures could be used). The management process 780 figures out the type of gesture, and in particular the row 794 and retrieve a next set of content for the corresponding row according to swipe, as illustrated in FIG. 29 for actions 796a-796f. The management process 780 could also receive a user gesture (typically user or system defined) that can update multiple rows (not show) or all rows as shown for action 796g.

Figure 30:
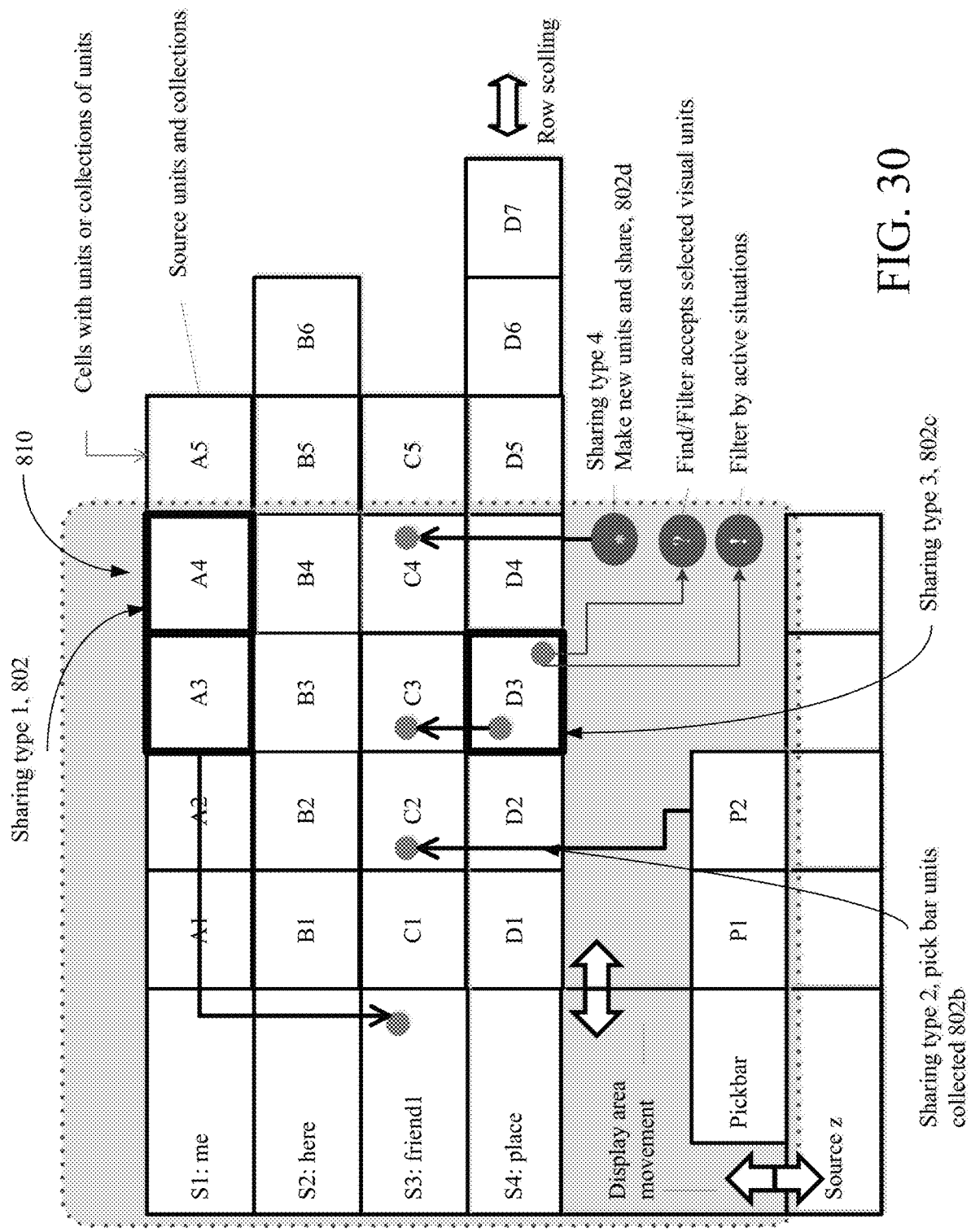
FIG. 30 is a block diagram.

Referring now to FIG. 30, a process for sharing that uses four types of pick-sharing is shown graphically. Sharing type 1 illustrated by path 802 has a user sharing visualized units from the user's collection to a friend. Sharing type 2 illustrated by path 802b has a user sharing visualized units from the picked bar to another user, and sharing type 3 illustrated by path 802c has a user sharing visualized units across from one user source to another user. Sharing type 4, 802d has the user make new units and share.

The display area 810 shows a clipped partial view of the sources (columns) and visualized units and collections (rows) that are possible in the user's 'contents space'. The display area can be re-positioned to show other sources (vertically) and more visual units (horizontally), as a whole or by source row. The sharing types are shown: (1) sharing from the user to a friend, (2) sharing from the pick-bar to a friend; (3) sharing across from one external source to another user; and (4) making new visualized units and directly sharing them into a selected friend's collection.

The table of contents displays representations as in the form of visualized units of not only things that a user owns, but also of things that the user finds, collects from various sources, and has shared-in to the user from other users. The table of contents interface 750 shows sources such as friends, stores, places, etc. Sharing of visual units can be done singly, multiply or as whole collections by interactive selection and gesture.

In sharing type 1, some visual units are selected and dropped into a friend's area. A message is added and the units are shared. In sharing type 2, a visual unit from the user's pick-bar 755 (FIG. 27) is shared to a friend's specific collection by dropping the unit into a friend's cell. The pick-bar 755 contains current units found and picked. In sharing type 3, a visual unit is shared from one source to another source, both not owned by the user. For example, a user sees something his friend would like and can share it with the same interaction as the other forms of sharing. In sharing type 4, the user can make new visual units, such as by taking photos, and immediately share them with sources by selecting a shared-destination and starting the "make" operation. The 4 variations of interactive sharing use the Table of Contents as a (visual) content switchboard.

As described previously, the user selectable privacy and sharing settings determine how the visualized units are playable, mixable, viewable, pickable, and shareable. The display of sources and their collections and visualized units can be filtered by keyword or attribute search or alternatively, by associative and situational filtering, such that the current situation of environment, social and activity parameters can filter the table of contents. Furthermore, a user can drag and drop one or more visual units into the associative and situational filter to find and display associated visual units and collections in the table of contents.

Shared messages can accompany the shared visualized units. Visualized units can be shared via a drag and drop or gesture from one source to another based on allowed sharing permissions. Each cell in the matrix can be one unit or a collection of units that can be expanded in view.

The view of visual units can page or scroll while maintaining source title headings. The view of units can be static or dynamically playing, as mentioned. Text titles and messages can be inserted in between visual units for separation, as mentioned. Discussions can be added by selecting and typing on a visualized unit permitting sharing of the message for that visualized unit or units.

Referring now to FIG. 31 the table of contents screen interface 750 is shown with one collection (row) expanded 820 based on a selection of one of the visualized units ("Bunkley is lost in Venice)." Even though each source is shown as one row, each source can have many collections and visual units. The table of contents can show individual visual units or a cell can represent a collection of units. In dynamic play mode, the table of contents can show updates and sequences of visual units within collections in a time sequential manner. In static mode, the user can browse and scroll across many user-sources (rows) and many units (columns). Selecting a collection expands its views of visualized units and annotations (such as comments). The collection view can also scroll. The arrangement allows for large amounts of visual units to be viewed and interacted with in one display. This allows visual composite viewing and inter-actions across various sources and contents; accessing and viewing all contents of interest, collected, produced, shared in and out, found, picked, from friends and other sources, in one expandable, interactive display.

Figure 32:
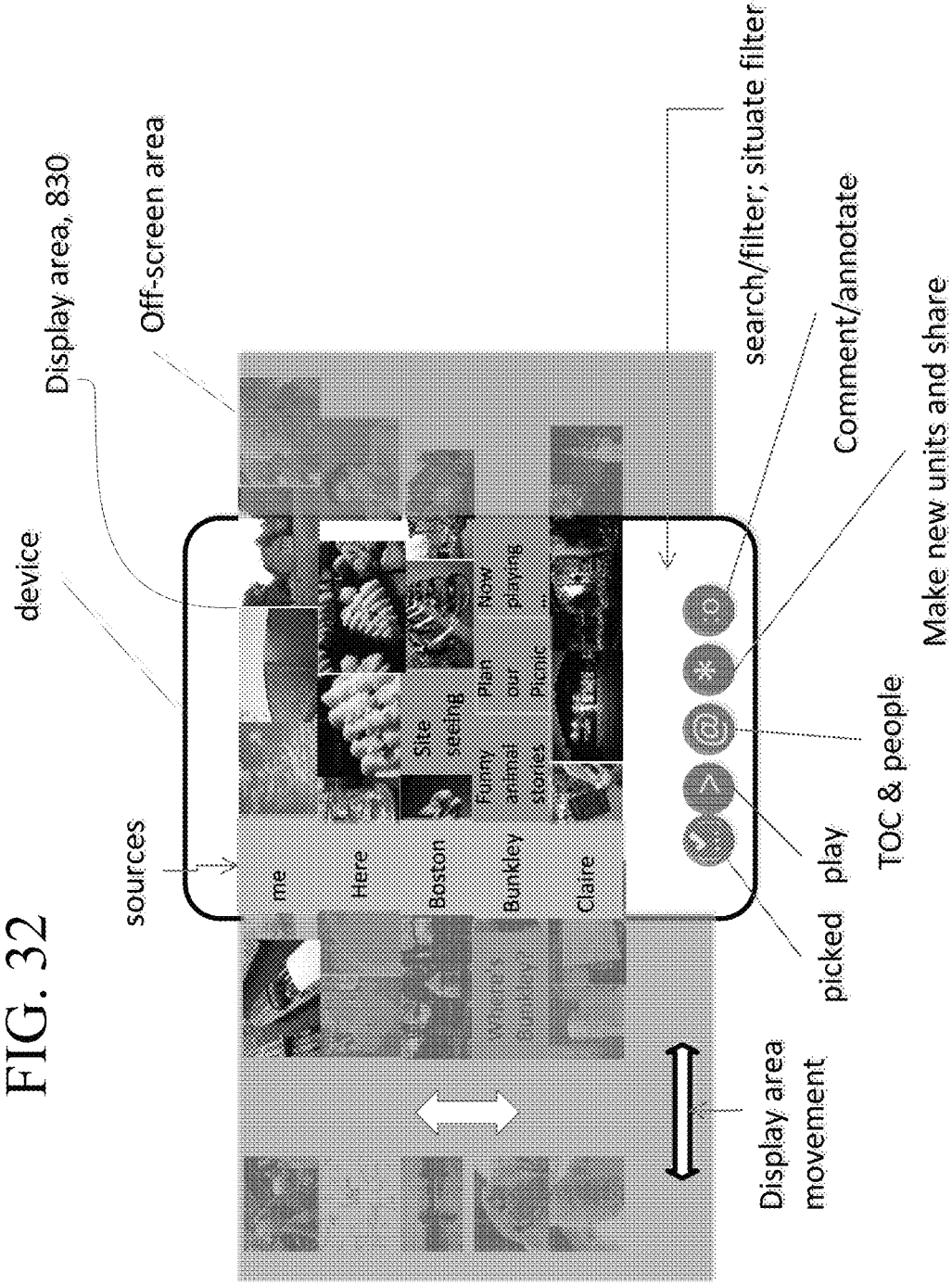

Referring to FIG. 32 a TOC 750' is shown for a small display suitable for a mobile device (not labeled). The device has a display area 830 that is smaller than the overall source content space (off screen content shown is content that may had been shown on a larger screen, but the manager can be configured for the smaller screen without off screen content.

In this implementation, scrolling allows reposition of the display across sources and visualized units and collections; and individually within sources. An input area allows for filtering the table of contents by typing keywords. Alternatively, one can drag a visualized unit into the search filter and filter for all things like that visualized unit. The table of contents 750' can therefore selectively display content views based on attributes, but also things related or like selected visual units via associative and situational means (previously described), or filtered by situations. Tools are also shown with the labeled functions.

Figure 33:
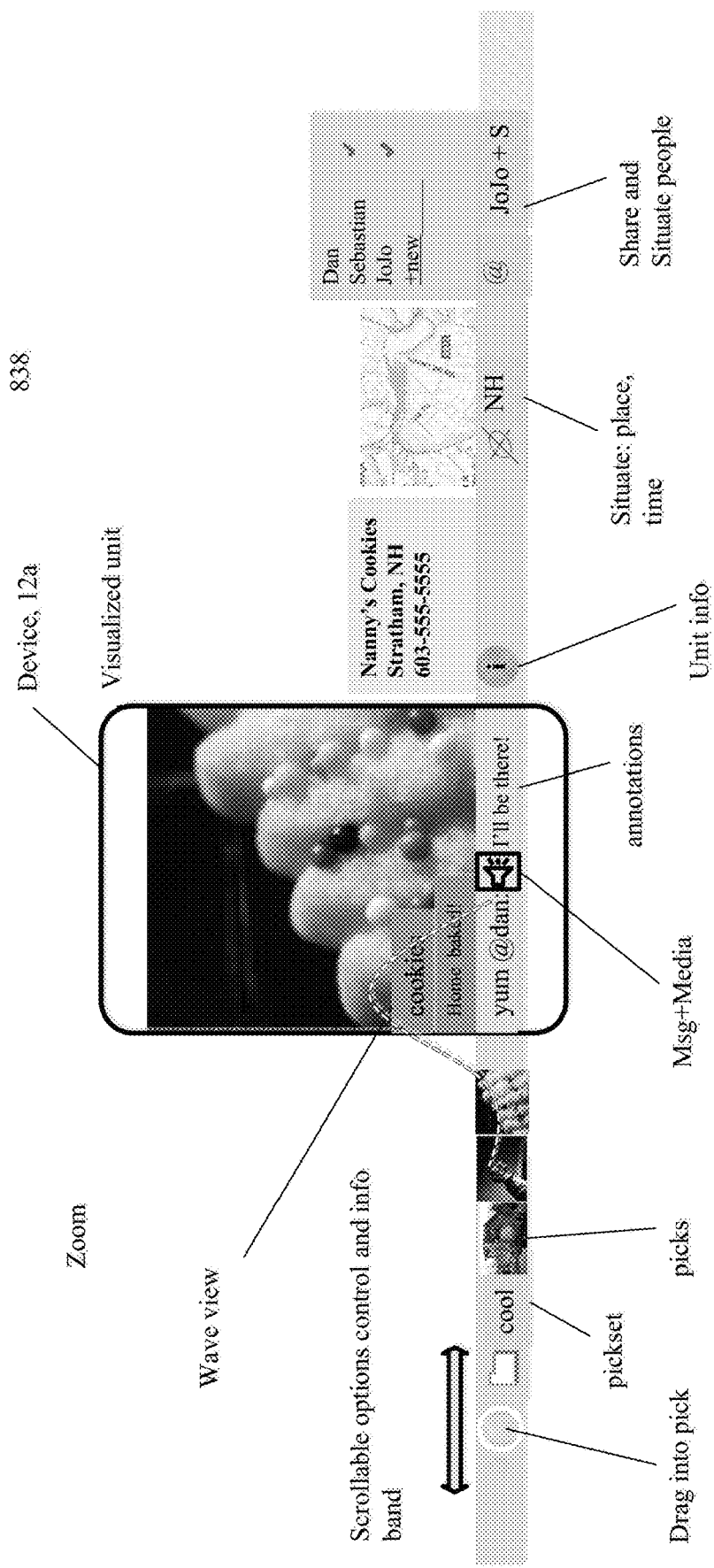

Referring to FIG. 33, a small display suitable for a mobile device shows the display shows a visualized unit in zoom mode 838. The control and information band shows options that can be scrolled for the present content and context. For example, general controls are shown, followed by the current pick-bar picks; a series of comments are shown for the visual unit. The comments can also contain media such as audio as shown, or video. As one scrolls, the comments are displayed within the visible display area. To further accommodate both the underlying visual unit display and its comments on a limited display, the comments form a 'wave' that piles the comments or abbreviations thereof, as one scrolls. The comments can also be semi-transparent and colored to contrast with the visual unit. Also along the scrollable band is shown information such as address and location map; followed by a menu to select sharing of the visual unit with other users. The unit's location and shared (out) users adds to the specification of 'situations' as previously described. So, for example, sharing this visual unit with a friend, might create a situation where this visual unit is activated and shown to the user when she is in this location (an environmental situation) or interested in 'cookies' (an activity situation) (as in the comments), or interacting with the user (a social situation).

The band scrolls, showing tools, pick-sets, messages, attributes such as address, map, and shares. The user can see and also set properties of the unit. The band of messages can wave-up as it scrolls, showing more messages in limited space. Situations can be set for the unit via the band.

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method actions can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors.

Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

One such type of computer includes a programmable processing system suitable for implementing or performing the apparatus or methods of the invention. The system includes a processor, a random access memory (RAM), a program memory (for example, a writable read-only memory such as a flash ROM), a hard drive controller and an input/output (I/O) controller coupled by a processor bus. The system can be preprogrammed, in ROM, for example, or it can be programmed (and reprogrammed) by loading a program from another source (for example, from a floppy disk, a CD-ROM, or another computer).

The system includes client devices and servers. The client devices and the servers are connected via a network that may include one or more networks, such as a local area network (LAN), a wide area network (WAN), and/or the Internet. One or more of the networks that make up network may be wireless, such as a cellular telephone network or a Wi-Fi network. The network in conjunction with one or more of the client devices and one or more servers, may form a cloud computing system.

An execution environment includes computers running an operating system and browsers. Other environments could of course be used.

A number of embodiments of the invention have been described. Nevertheless, it will be understood that various modifications may be made without departing from the spirit and scope of the invention. Accordingly, other embodiments are within the scope of the following claims.

What is claimed is:

1. A system comprising:
  a processor;
  a display;
  an engine to produce a plurality of visualized units that are produced from items collected by the system according to user-defined collection rules;
  a storage device storing plural sets of visualized units that are selected from the plurality of visualized units produced from the collected items; and
  a memory executing a computer program for dynamic display of visualized units, the computer program product comprises instructions to configure the processor to:
    retrieve a group of the visualized units, with the visualized units comprising thumbnail representations of the corresponding visualized units;
    render on the display device for a time period, an arrangement of the thumbnails corresponding to the retrieved visualized units;
    receive a user selection of one of the displayed thumbnails;
    produce an associative set of visualized units from two or more of the stored sets of visualized units, with the associative set comprising visualize units that are related to the visualized unit represented by user selected thumbnail, by execution by the system of:
      one or more sets of associative rules that determine commonality between the selected visualized unit corresponding to the displayed thumbnail and the two or more stored sets of the visualized units stored in the storage device of the system;
      wherein instructions to execute one or more sets of associative rules, executes a rule that determines common discussions about items, topics and interactions among visualized units with the common discussions derived from annotations stored in data structures that correspond to the visualized units; and
    display the associated set of visualized units.

2. The system of claim 1 wherein the processor is further configured to:
  schedule for display over a time period a set of the visualized units by the visualized units thumbnail images for display in the window in cells of a matrix display arrangement of rows and columns that form cells of the matrix;
  retrieve the scheduled visualized units;
  assign the retrieved scheduled visualized units to the cells in the matrix.

3. The system of claim 1 wherein the visualized units include in addition to thumbnail images that are displayed in the matrix, a data structure that includes a visualized unit ID, a description, an aspect, media, and annotations where additional information about the item is incrementally added during use of the visualized unit.

4. The system of claim 3 wherein the matrix is organized as a group of cells with the number and arrangement of cells being selected by the system based on the size of the display.

5. The system of claim 3 wherein the matrix is a time-changing matrix of the visualized units.

6. The system of claim 1 wherein the item represented by the visualized units includes one of more of images, combinations of text and image, text, and video.

7. The system of claim 1 wherein instructions to produce the associative set of visualized units further comprises instructions to:
  produce the associative sets without keyword tags.

8. The system of claim 1 wherein instructions to produce the associative set of visualized units further comprises instructions to:

determine selection space according to user defined limitations.

9. The system of claim 1 wherein instructions to produce the associative set of visualized units further comprises instructions to:

determine group memberships of a first visualized unit; and produce the associative set from selecting of other visualized units from groups of visualized units having a common group membership with the first visualized unit.

10. The system of claim 1 wherein the groups are produced by user interactions of picking and/or sharing.

11. The system of claim 1 wherein instructions to produce the associative set of visualized units further comprises instructions to:

apply feature processing to determine common features among visualized units;

include those visualized units having common features in the associative set.

\* \* \* \* \*